United States Patent
Cho et al.

(10) Patent No.: US 9,659,015 B2
(45) Date of Patent: May 23, 2017

(54) MOBILE TERMINAL AND CONTROLLING METHOD THEREOF

(75) Inventors: Heeyoung Cho, Seoul (KR); Kyesook Jeong, Seoul (KR); Jungok Cho, Seoul (KR); Seunghyun Yang, Seoul (KR); Hannah Na, Seoul (KR); Harim Jang, Seoul (KR); Sohoon Yi, Seoul (KR); Eunjeong Ryu, Seoul (KR); Seungheon Han, Seoul (KR); Eunsang Lee, Seoul (KR); Hyolin Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 40 days.

(21) Appl. No.: 13/159,123

(22) Filed: Jun. 13, 2011

(65) Prior Publication Data
US 2011/0307836 A1  Dec. 15, 2011

(30) Foreign Application Priority Data

Jun. 14, 2010 (KR) .................. 10-2010-0055859
Aug. 17, 2010 (KR) .................. 10-2010-0079200

(51) Int. Cl.
G06F 3/048  (2013.01)
G06F 17/30  (2006.01)
(Continued)

(52) U.S. Cl.
CPC ...... G06F 17/30058 (2013.01); G06F 3/0482 (2013.01); G06F 3/04847 (2013.01);
(Continued)

(58) Field of Classification Search
CPC .............. G06F 3/0482; G06F 3/04847; G06F 17/30058; G06F 3/0488; G06F 3/04883; G06F 2203/04806; G06F 2203/04808
(Continued)

(56) References Cited

U.S. PATENT DOCUMENTS 7,424,686 B2 * 9/2008 Beam .................. G06F 3/0481
                                              707/999.102
8,698,762 B2 * 4/2014 Wagner et al. ............... 345/173
(Continued)

FOREIGN PATENT DOCUMENTS

CN      101611373 A   12/2009
KR  10-2010-0038651 A    4/2010

OTHER PUBLICATIONS

"Get to grips with the 'Open With' menu," Oct. 11, 2008, http://web.archive.org/web/20081011190827/http://macosxtips.co.uk/index_files/get-to-grips-with-the-open-with-menu.html.*
(Continued)

*Primary Examiner* — Doon Chow
*Assistant Examiner* — Andrew T Chiusano
(74) *Attorney, Agent, or Firm* — Birch, Stewart, Kolasch & Birch, LLP

(57) ABSTRACT

According to one embodiment of the present invention, a mobile terminal includes a touchscreen configured to display a list including a plurality of categories and at least one content grouped for each of the plurality of categories, and a controller, if a command for a reduced display of the list is received, configured to generate summary information for each of the plurality of categories based on information of the grouped at least one content, to hide the grouped at least one content from the list, and then to control the touchscreen to display the plurality of categories and the generated summary information corresponding to the plurality of categories.

13 Claims, 47 Drawing Sheets

(51) Int. Cl.
  *G06F 3/0482* (2013.01)
  *G06F 3/0484* (2013.01)
  *G06F 3/0488* (2013.01)

(52) U.S. Cl.
  CPC ........ *G06F 3/04883* (2013.01); *G06F 3/0488* (2013.01); *G06F 2203/04806* (2013.01); *G06F 2203/04808* (2013.01)

(58) Field of Classification Search
  USPC .................. 715/855, 854, 863, 828, 838
  See application file for complete search history.

(56) References Cited

U.S. PATENT DOCUMENTS

| | | | |
|---|---|---|---|
| 2004/0193621 A1* | 9/2004 | Moore et al. | 707/100 |
| 2006/0242596 A1* | 10/2006 | Armstrong | 715/786 |
| 2008/0165141 A1* | 7/2008 | Christie | 345/173 |
| 2008/0201650 A1* | 8/2008 | Lemay et al. | 715/763 |
| 2009/0063972 A1* | 3/2009 | Ma et al. | 715/716 |
| 2009/0087104 A1* | 4/2009 | Nakate | G06F 17/30265 382/224 |
| 2009/0094554 A1* | 4/2009 | Karstens | 715/810 |
| 2009/0327961 A1* | 12/2009 | De Vorchik et al. | 715/825 |
| 2010/0088641 A1* | 4/2010 | Choi | 715/828 |
| 2010/0123734 A1* | 5/2010 | Ozawa | G06F 3/0488 345/619 |
| 2010/0283743 A1* | 11/2010 | Coddington | 345/173 |
| 2012/0192110 A1* | 7/2012 | Wu | 715/815 |
| 2013/0016127 A1* | 1/2013 | Takashima | 345/660 |
| 2014/0059492 A1* | 2/2014 | Hashida et al. | 715/835 |

OTHER PUBLICATIONS

Screenshots from "How to Save Battery for iPhone 3G/3Gs," Uploaded Oct. 2, 2009, available at <http://www.youtube.com/watch?v=d7vDiqP4NMA#t=7m50s>.*

* cited by examiner

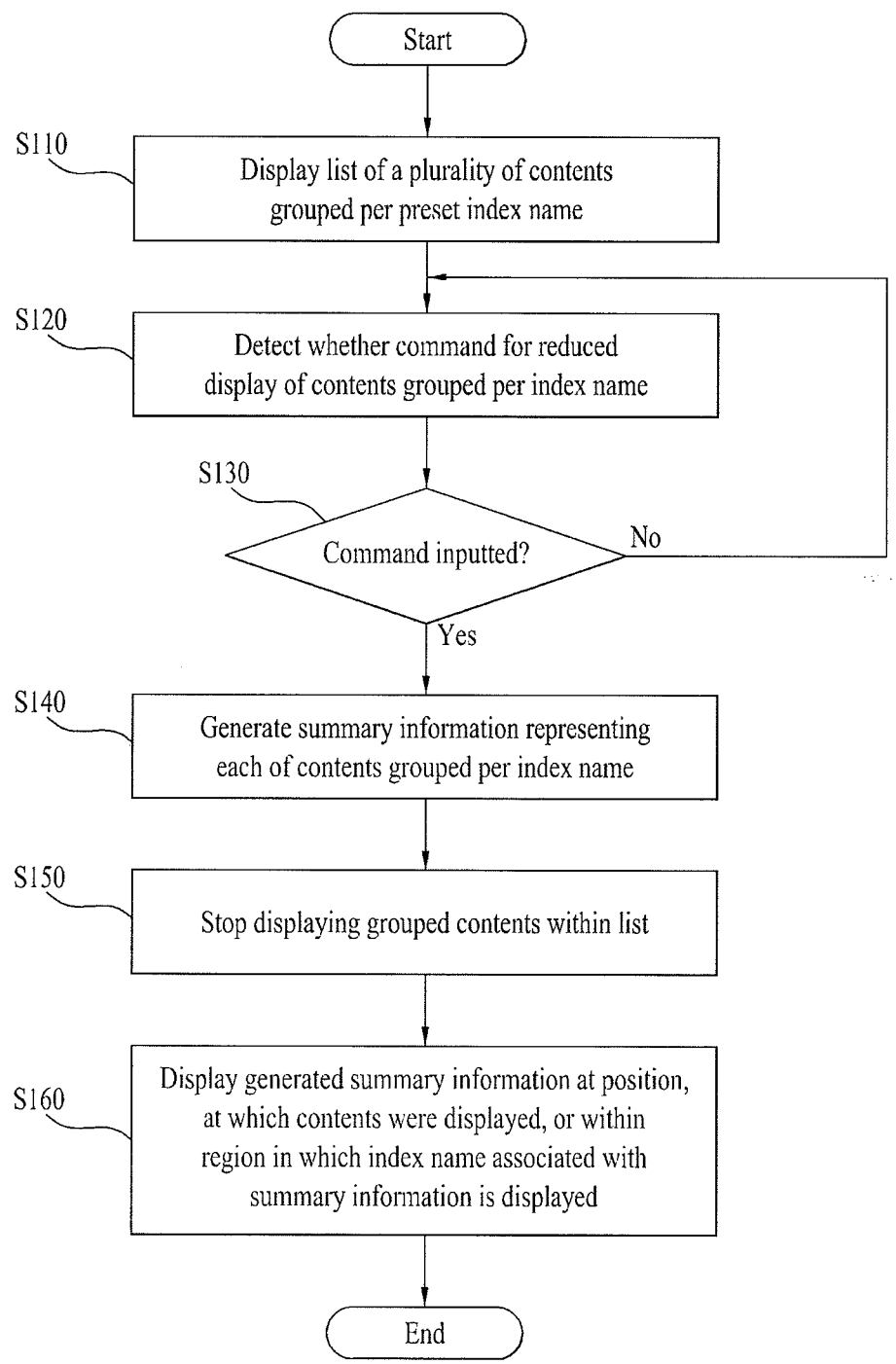

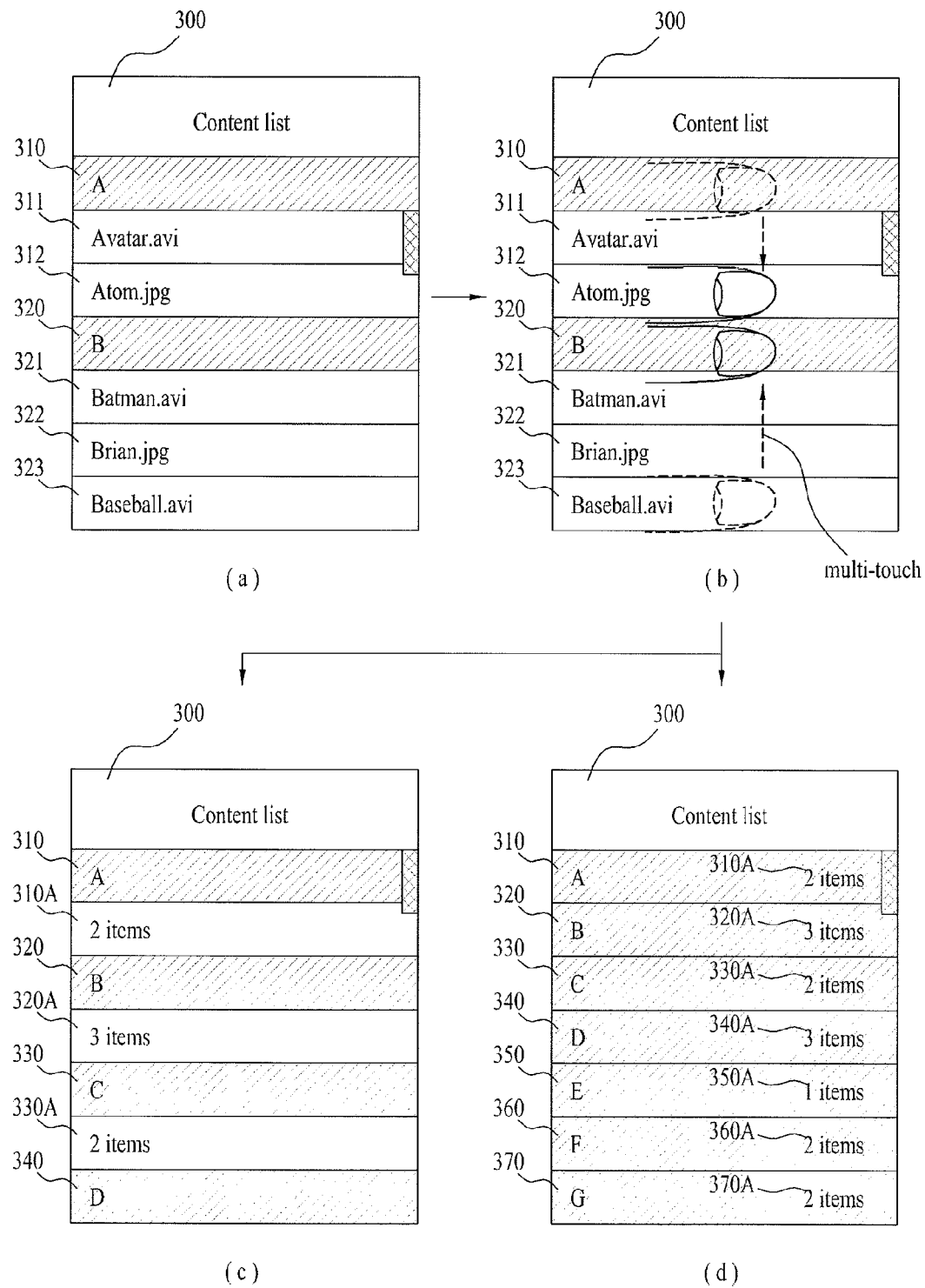

(a)   (b)

FIG. 26
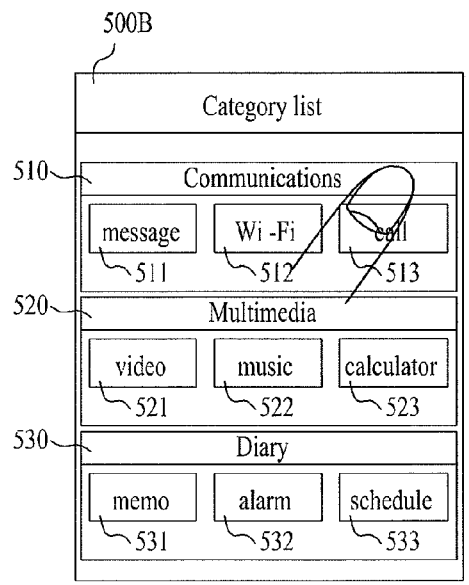
(a)
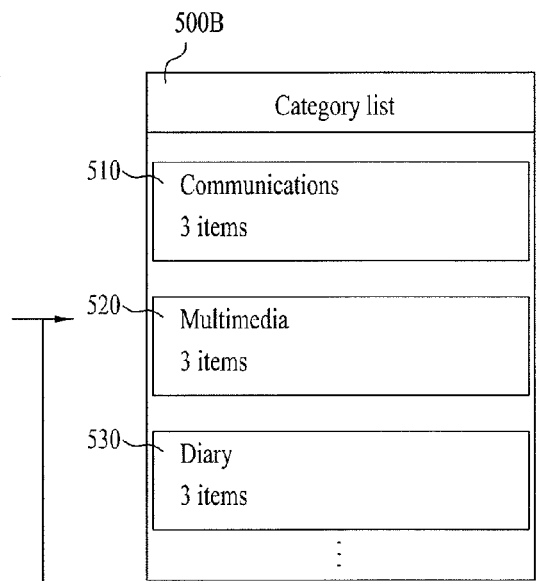
(b)
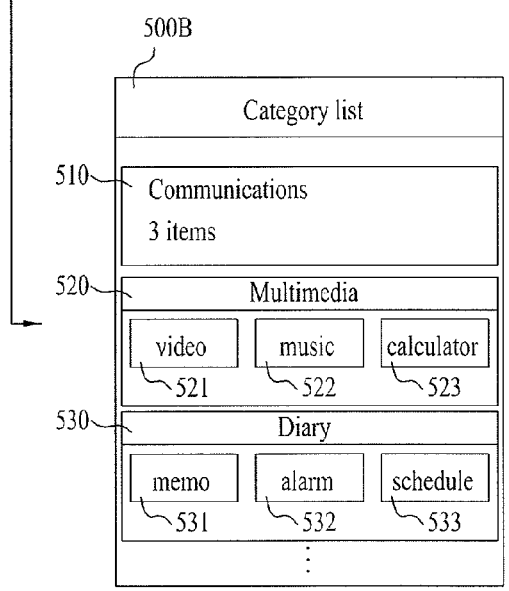
(c)

FIG. 40
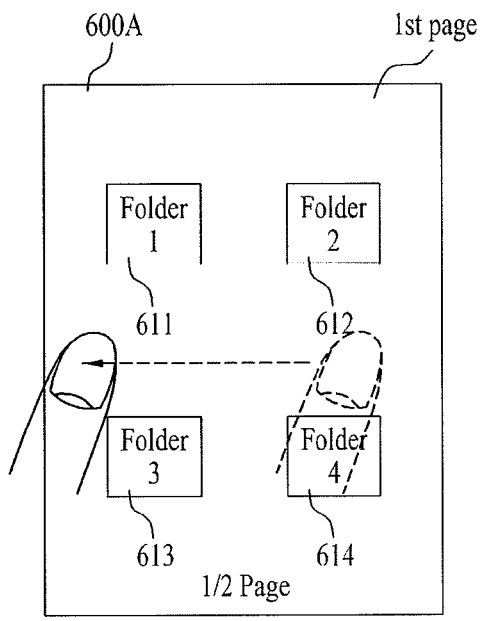
(a)
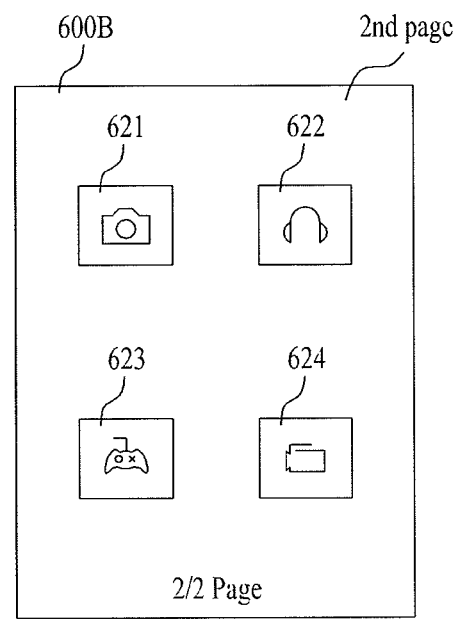
(b)

FIG. 42
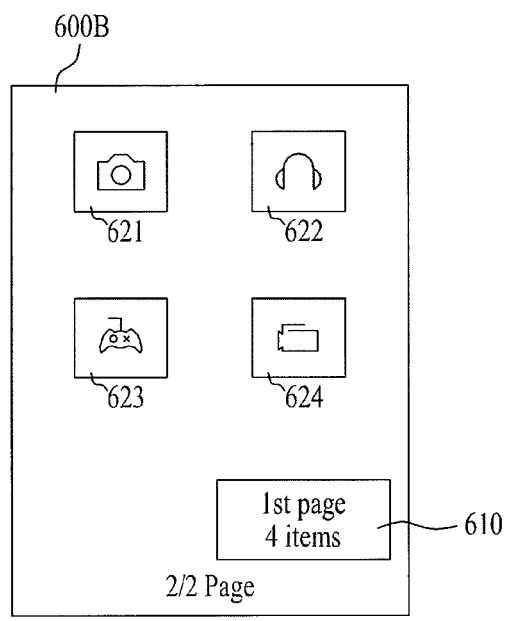
(a)
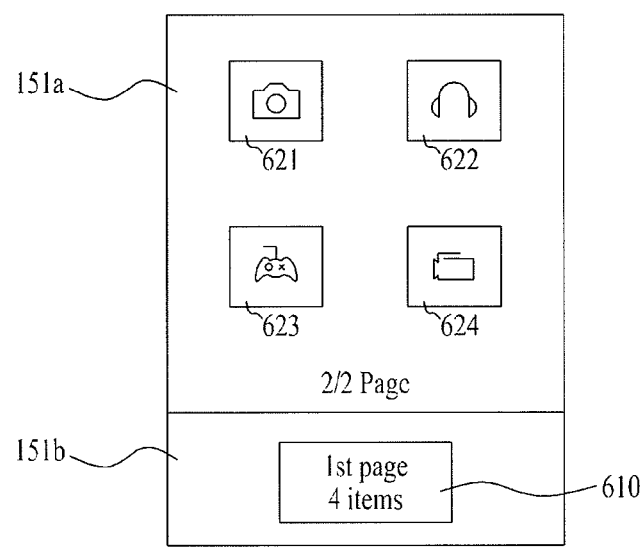
(b)

FIG. 43
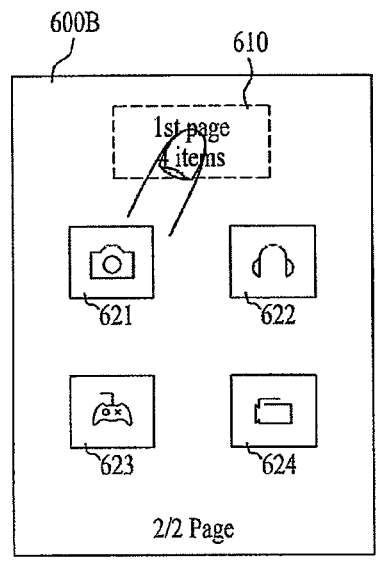
(a)
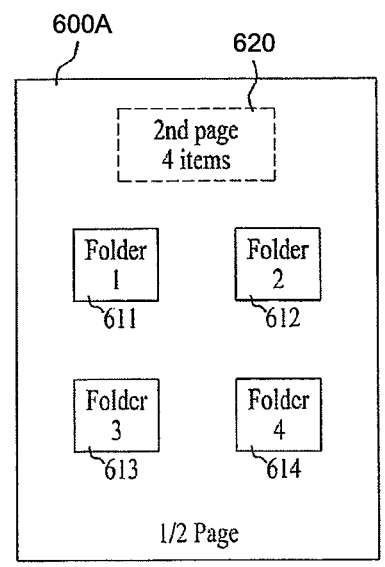
(b)

FIG. 44
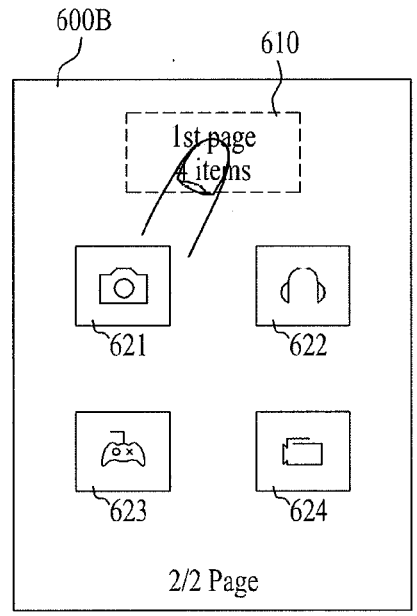
(a)
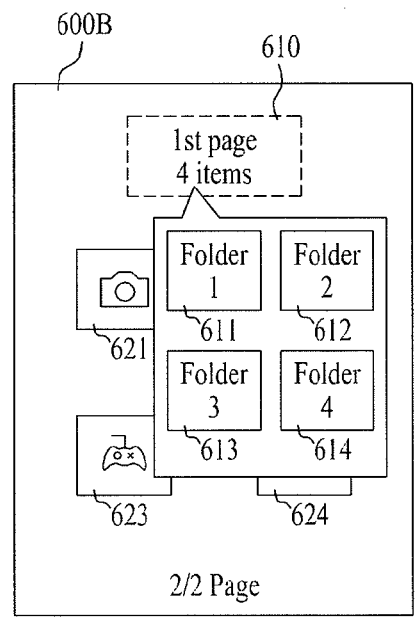
(b)

FIG. 45
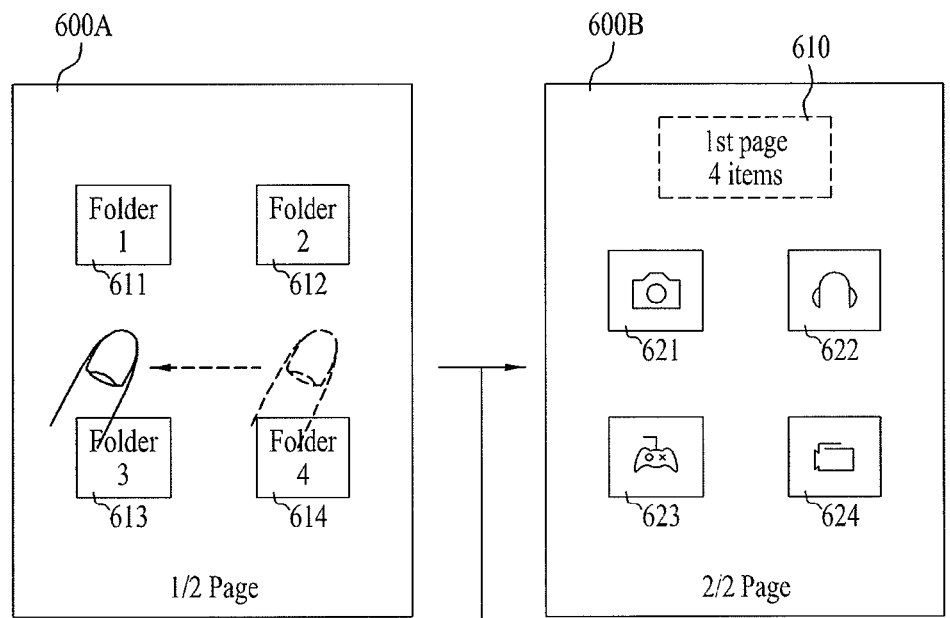
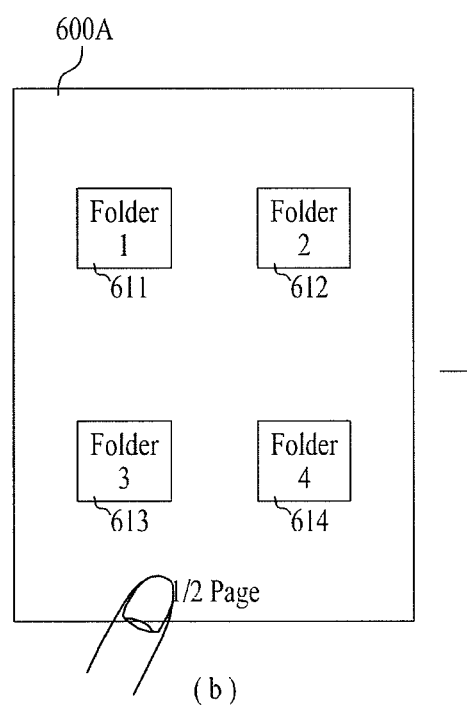

MOBILE TERMINAL AND CONTROLLING METHOD THEREOF

Pursuant to 35 U.S.C. §119(a), this application claims the benefit of earlier filing date and right of priority to Korean Application Nos. 10-2010-0055859 and 10-2010-0079200 filed on Jun. 14, 2010 and Aug. 17, 2010, respectively, the contents of which are hereby incorporated by reference herein in their entirety.

BACKGROUND OF THE INVENTION

Field of the Invention

The present invention relates to a mobile terminal, and more particularly, to a mobile terminal and controlling method thereof. Although the present invention is suitable for a wide scope of applications, it is particularly suitable for facilitating a user to use a terminal in further consideration of user's convenience.

Discussion of the Related Art

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to a presence or non-presence of mobility. And, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

As mentioned in the above description, since a terminal is implemented into a multimedia device, the capacity of an internal or external memory of the terminal is increased to enable a mass storage of various contents.

However, as an enormous volume of content data is stored in the terminal, a user should perform a number of key inputs when searching a content list for a desired content. Moreover, the search work consumes a considerable time.

SUMMARY OF THE INVENTION

Accordingly, the present invention is directed to a mobile terminal and controlling method thereof that substantially obviate one or more problems due to limitations and disadvantages of the related art.

An object of the present invention is to provide a mobile terminal and controlling method thereof, by which a whole list can be reduced and displayed. In particular, after a plurality of contents have been grouped per index name in a list, the grouped contents are displayed in the list by being reduced in accordance with a user's manipulation.

Another object of the present invention is to provide a mobile terminal and controlling method thereof, by which a whole list can be reduced and displayed. In particular, after a plurality of contents have been grouped per category name in a list, the category names except the contents are displayed only in the list in accordance with a user's manipulation.

Another object of the present invention is to provide a mobile terminal and controlling method thereof, by which a list can be reduced and displayed. In particular, after a plurality of contents included in the list have been grouped per associated function, summary information representing each of the grouped contents is displayed within the list only.

A further object of the present invention is to provide a mobile terminal and controlling method thereof, by which a whole page displayed on a screen can be reduced and displayed in a manner of reducing and displaying pages having a plurality of contents included therein, respectively.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention includes a touchscreen displaying a list of at least two contents grouped per name, a controller configured to control the display unit to display the name except the contents within the list if a command for a reduced display of the list is inputted, to generate a summary information on each of the contents grouped per the name, and to control the display unit to display the generated summary information.

In another aspect of the present invention, a method of controlling a mobile terminal according to the present invention includes the steps of displaying a list of at least two contents grouped per name, displaying the names except the contents within the list if a command for a reduced display of the list is inputted, generating a summary information on each of the contents grouped per the name, displaying the generated summary information.

In another aspect of the present invention, a mobile terminal includes a touchscreen displaying a first page on a screen of the touchscreen if there are the first page including at least two contents and a second page including at least two contents, a controller configured to generate a summary information on the contents included in the first page if a reduced display command for the first page is inputted, to switch the first page to the second page, and to control the display unit to display the generated summary information on the second page.

In another aspect of the present invention, a method of controlling a mobile terminal according to the present invention includes the steps of displaying a first page on a screen of the touchscreen if there are the first page including at least two contents and a second page including at least two contents, generating a summary information on the contents included in the first page if a reduced display command for the first page is inputted, switching the first page to the second page, displaying the generated summary information on the second page.

In another aspect of the present invention, a mobile terminal includes a touchscreen displaying a list including a plurality of contents, a controller configured to group the contents per associated function if a command for grouping the contents per associated function, to generate summary information on the grouped contents, respectively, and to control the display unit to display the generated summary information within the list.

In a further aspect of the present invention, a method of controlling a mobile terminal according to the present invention includes the steps of displaying a list including a plurality of contents on a screen, grouping the contents per the associated function if a command for grouping the contents per associated function is inputted, generating summary information on the grouped contents, respectively, displaying the generated summary information within the list.

In another aspect of the present invention, a mobile terminal includes a touchscreen configured to display a list including a plurality of categories and at least one content grouped for each of the plurality of categories, and a controller, if a command for a reduced display of the list is received, configured to generate summary information for each of the plurality of categories based on information of the grouped at least one content, to hide the grouped at least one content from the list, and then to control the touchscreen to display the plurality of categories and the generated summary information corresponding to the plurality of categories.

In another aspect of the present invention, a method of controlling a mobile terminal according to the present invention includes the steps of displaying, on a display unit of the mobile terminal, a list including categories and at least two contents grouped for each of the categories, hiding the at least two contents corresponding to each of the categories from the list, if a command for a reduced display of the list is received, generating summary information for each of the categories based on information of the at least two contents grouped for each of the categories according to the command for the reduced display, and displaying, on the display unit, the categories and the generated summary information, wherein each summary information is located within or near the corresponding categories.

In another aspect of the present invention, a mobile terminal includes a touchscreen configured to display a first page if there are the first page including at least one content and a second page including at least one content, and a controller, if a reduced display command for the first page is received, configured to generate summary information on the at least one content included in the first page, to switch from the first page to the second page, and to control the touchscreen to display the generated summary information of the first page on the second page and the at least one content included on the second page.

In another aspect of the present invention, a method of controlling a mobile terminal according to the present invention includes the steps of displaying, on a touchscreen of the mobile terminal, a first page if there are the first page including at least one content and a second page including at least one content, generating summary information on the at least one content included in the first page if a reduced display command for the first page is received, switching from the first page to the second page in response to the reduced display command for the first page, and displaying, on the touchscreen, the generated summary information of the first page on the second page and the at least one content included on the second page.

In another aspect of the present invention, a mobile terminal includes a touchscreen configured to display a list including a plurality of contents, and a controller configured to group the plurality of contents based on an associated function of the plurality of contents if a command for grouping the plurality of contents based on the associated function is received, to generate summary information for the grouped plurality of contents and to hide the grouped plurality of contents if a command for a reduced display of the plurality of contents is received, and to control the touchscreen to display the generated summary information within the list.

In another aspect of the present invention, a method of controlling a mobile terminal according to the present invention includes the steps of displaying, on a screen of the mobile terminal, a list including a plurality of contents, grouping the plurality of contents based on an associated function of the plurality of contents if a command for grouping the plurality of contents based on the associated function is received, generating summary information on the grouped plurality of contents and hiding the grouped plurality of contents if a command for a reduced display of the grouped plurality of contents is received, and displaying, on the screen, the generated summary information within the list.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings:

FIG. 3 is a first flowchart of a process for reducing and displaying a plurality of contents in a list having a plurality of the contents grouped per index name therein according to the present invention;

FIGS. 4 to 20 are diagrams of screen configurations of a process for reducing and displaying a plurality of contents in a list having a plurality of the contents grouped per index name according to a first embodiment of the present invention;

FIGS. 22 to 38 are diagrams of screen configurations of a process for reducing and displaying a plurality of contents in a list having a plurality of the contents grouped per category name according to a second embodiment of the present invention;

FIGS. 40 to 45 are diagrams of screen configurations of a process for reducing and displaying pages, each of which including a plurality of contents, on a screen according to a third embodiment of the present invention;

DETAILED DESCRIPTION OF THE INVENTION

In the following detailed description, reference is made to the accompanying drawing figures which form a part hereof, and which show by way of illustrating specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of terminals. Examples of such terminals include mobile as well as stationary terminals, such as mobile phones, user equipment, smart phones, DTV, computers, digital broadcast terminals, personal digital assistants, portable multimedia players (PMP) and navigators.

However, by way of non-limiting example only, further description will be with regard to a mobile terminal 100, and it should be noted that such teachings may apply equally to other types of terminals.

Figure 1:
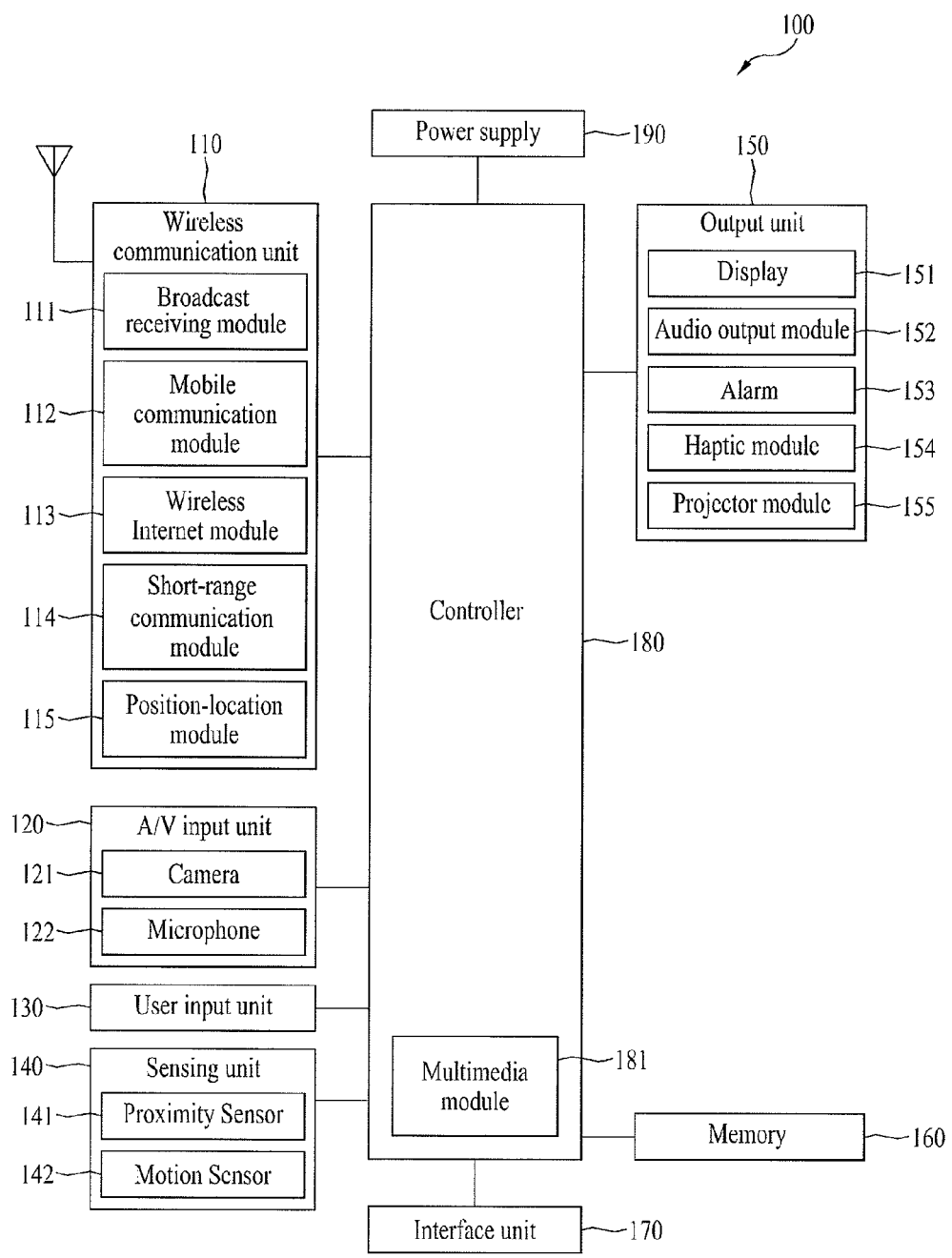
FIG. 1 is a block diagram of a mobile terminal according to one embodiment of the present invention.

FIG. 1 is a block diagram of the mobile terminal 100 in accordance with an embodiment of the present invention. The mobile terminal 100 may include a wireless communication unit 110, an A/V (audio/video) input unit 120, a user input unit 130, a sensing unit 140, an output unit 150, a memory 160, an interface unit 170, a controller 180, a power supply unit 190 and the like. Although FIG. 1 shows the mobile terminal 100 having various components, it is not required to include all of the illustrated components and the number of components may be varied to alternatively implement.

In the following description, the above elements of the mobile terminal 100 are explained in sequence.

First of all, the wireless communication unit 110 typically includes one or more components which permit wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like. The broadcast receiving module 111 receives a broadcast signal and/or broadcast associated information from an external broadcast managing server via a broadcast channel. The broadcast channel may include a satellite channel and a terrestrial channel.

The broadcast managing server generally refers to as a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

At least two broadcast receiving modules 111 can be provided to the mobile terminal 100 for simultaneous receptions of at least two broadcast channels or for facilitating a switch of a broadcast channel.

The broadcast associated information includes information associated with a broadcast channel, a broadcast program, a broadcast service provider, etc. Further, the broadcast associated information can be provided via a mobile communication network. In this case, the broadcast associated information can be received by the mobile communication module 112. The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), DVB-CBMS, OMA-BCAST, the data broadcasting system known as media forward link only (MediaFLO®) and integrated services digital broadcast-terrestrial (ISDB-T). Optionally, the broadcast receiving module 111 can be configured to be suitable for other broadcasting systems as well as the above-explained digital broadcasting systems. The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceivings, among others.

The wireless internet module 113 supports an Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), etc.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee.

The position-location module 115 identifies or otherwise obtains the location of the mobile terminal 100. If desired, this module may be implemented with a global positioning system (GPS) module.

Referring to FIG. 1, the audio/video (A/V) input unit 120 is configured to provide an audio or video signal input to the mobile terminal 100. As shown, the A/V input unit 120 includes a camera 121 and a microphone 122.

The camera 121 possesses a digital zoom and processes image frames of still pictures or video, which are obtained by an image sensor in a video call mode or a photographing mode. Further, the processed image frames can be displayed on the display 151. The image frames processed by the camera 121 can be stored in the memory 160 or can be externally transmitted via the wireless communication unit 110. Optionally, at least two cameras 121 can be provided to the mobile terminal 100 according to a desired usage.

The microphone 122 receives an external audio signal while the portable device is in a particular mode, such as a phone call mode, a recording mode and a voice recognition mode. This audio signal is processed and converted into electric audio data. The processed audio data is transformed into a format transmittable to a mobile communication base station via the mobile communication module 112 during a call mode. The microphone 122 typically includes assorted noise removing algorithms to remove noise generated when receiving the external audio signal.

The user input unit 130 generates input data responsive to a user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of a user contact with the mobile terminal 100, an orientation or acceleration/deceleration of the mobile terminal 100. As an example, if the mobile terminal 100 is configured as a slide-type mobile terminal, the sensing unit 140 may sense whether a sliding portion of the mobile terminal is open or closed. Other examples include the sensing unit 140 sensing the presence or absence of the power provided by the power supply 190, the presence or absence of a coupling or other connection between the interface unit 170 and an external device. Here, the sensing unit 140 can include a proximity sensor 141 and a motion sensor 142.

Next, the motion sensor 142 detects a body motion of the mobile terminal 100, and outputs a signal corresponding to the detected body motion to the controller 180. The output unit 150 generates outputs based on the senses of sight, hearing, touching and the like. Further, the output unit 150 includes the display 151, an audio output module 152, an alarm unit 153, a haptic module 154, a projector module 155 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As an example, if the mobile terminal 100 is in a video call mode or a photographing mode, the display 151 may additionally or alternatively display images which are associated with these modes, the UI or the GUI.

The display module 151 may be implemented using display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Above displays can be implemented in a transparent or optical transmittive type, which can be named a transparent display, such as a TOLED (transparent OLED) or the like. A rear configuration of the display 151 can be implemented in the optical transmittive type as well. In this configuration, the user is able to see an object in the rear of the terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 to be spaced apart from each other or be built in one body. Alternatively, a plurality of displays can be arranged on different faces of the mobile terminal 100.

When the display 151 and a sensor for detecting a touch action (hereinafter called 'touch sensor') configures to be a mutual layer structure (hereinafter called 'touchscreen'), the display 151 can be used as an input device as well as an output device. In this case, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, the touch sensor may be configured to detect a pressure of a touch as well as a touched position or size.

If the touch sensor includes the touch input, signal(s) corresponding to the touch is transferred to a touch controller. The touch controller processes the signal(s) and then transfers the processed signal(s) to the controller 180. Therefore, the controller 180 is able to detect whether a prescribed portion of the display 151 is touched.

Referring to FIG. 1, the mobile terminal may include a proximity sensor in an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or an infrared ray without mechanical contact. Hence, the proximity sensor has durability longer than that of a contact type sensor and also has a wider utility than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. If the touchscreen includes the electrostatic capacity proximity sensor, the touchscreen may be configured to detect the proximity of a pointer using a variation of an electric field according to the proximity of the pointer. In this case, the touchscreen (touch sensor) can be classified as the proximity sensor.

In the following description, for clarity, an action recognizing a location of the pointer approaches without contacting with the touchscreen will be called a 'proximity touch.' On the other hand, an action that a pointer actually touches the touchscreen will be called a 'contact touch.' The meaning of the position on the touchscreen proximity-touched by the pointer means the position of the pointer which vertically opposes the touchscreen when the pointer performs the proximity touch.

The proximity sensor detects the proximity touch and a proximity touch pattern (e.g., a proximity touch distance, a proximity touch duration, a proximity touch position, a proximity touch shift state, etc.). Further, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like. The audio output module 152 outputs audio data which is received from the wireless communication unit 110 or is stored in the memory 160. During an operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 outputs a signal for announcing the occurrence of a particular event associated with the mobile terminal 100. Typical events include a call received event, a message received event and a touch input received event. The alarm unit 153 may output a signal for announcing the event occurrence by outputting vibrations as well as video or audio signals. The video or audio signals can be outputted via the display 151 or the audio output unit 152. Hence, the display 151 or the audio output module 152 can be regarded as a part of the alarm unit 153.

The haptic module 154 generates various tactile effects that can be sensed by the user. One of the tactile effects generated by the haptic module 154 would be a vibration. Strengths and patterns of the vibration generated by the haptic module 154 can be controlled. For instance, different vibrations can be outputted by being synthesized together or can be outputted in sequence.

The haptic module 154 may generate various tactile effects as well as the vibration. For instance, the haptic module 154 generates the effect attributed to the arrangement of pins vertically moving against a contact skin surface, to the injection/suction power of the air though an injection/suction hole, to the skin over a skin surface, the effect attributed to the contact with an electrode, to the electrostatic force, to the representation of hold/cold sense using an endothermic or exothermic device and the like.

The haptic module 154 may enable the user to sense the tactile effect through a muscle sense of a finger, an arm or the like as well as to transfer the tactile effect through a direct contact. Optionally, at least two haptic modules 154 can be provided to the mobile terminal 100 in accordance with the corresponding configuration type of the mobile terminal 100.

The projector module 155 performs an image projector function using the mobile terminal 100. Here, the projector module 155 may display an image, which is identical to or only partially different from the image displayed on the display 151, on an external screen or a wall according to a control signal of the controller 180.

In particular, the projector module 155 can include a light source configured to generate light (e.g., laser) for projecting an image externally, an image producing means for producing an image to output externally using the light generated from the light source, and a lens for enlarging to output the image externally in a predetermined focus distance. And, the projector module 155 can further include a device for adjusting an image to a projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism to enable the light generated from the light source to reflect on a DMD (digital micro-mirror device) chip and can be advantageous for the downsizing of the projector module 151. Preferably, the projector module 155 can be provided in a length direction of a lateral, front or backside direction of the mobile terminal 100. Further, the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. Further, a recent use history or a cumulative use frequency of each data (e.g., use frequency for each phonebook, each message or each multimedia) can be stored in the memory unit 160. Moreover, data for various patterns of vibration and/or sound outputted through the touch input to the touchscreen can be stored in the memory unit 160.

The memory 160 may be implemented using any type or combination of suitable volatile and non-volatile memory or storage devices including a hard disk, a random access memory (RAM), a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk, a multimedia card micro type memory, a card-type memory (e.g., SD memory, XD memory, etc.), or other similar memories or data storage devices. Further, the mobile terminal 100 may operate in association with a web storage for performing a storage function of the memory 160 on Internet.

The interface unit 170 may be implemented to couple the mobile terminal 100 with external devices. The interface unit 170 receives data from the external devices or is supplied with the power, and then transfers the data or power to the respective elements of the mobile terminal 100 or enables data within the mobile terminal 100 to be transferred to the external devices. The interface unit 170 may use a wired/wireless headset port, an external charger port, a wired/wireless data port, a memory card port, a port for coupling to a device having an identity module, audio input/output ports, video input/output ports, an earphone port and/or the like.

The identity module is the chip for storing information for authenticating a use authority of the mobile terminal 100 and can include a User Identify Module (UIM), a Subscriber Identify Module (SIM), a Universal Subscriber Identity Module (USIM) and/or the like. A device having the identity module (hereinafter called 'identity device') can be manufactured as a smart card. Therefore, the identity device may be connected to the mobile terminal 100 via the corresponding port.

When the mobile terminal 110 is connected to an external cradle, the interface unit 170 becomes a passage for supplying the mobile terminal 100 with the power from the cradle or a passage for delivering various command signals inputted from the cradle by the user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component. Moreover, the controller 180 is able to perform a pattern recognizing process for recognizing a writing input and a picture drawing input carried out on the touchscreen as characters or images, respectively.

The power supply unit 190 provides power required by the various components for the mobile terminal 100. The power may be an internal power, an external power, or combinations thereof.

Various embodiments described herein may be implemented in a computer-readable medium using, for example, a computer software, a hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

A software implementation may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2A:
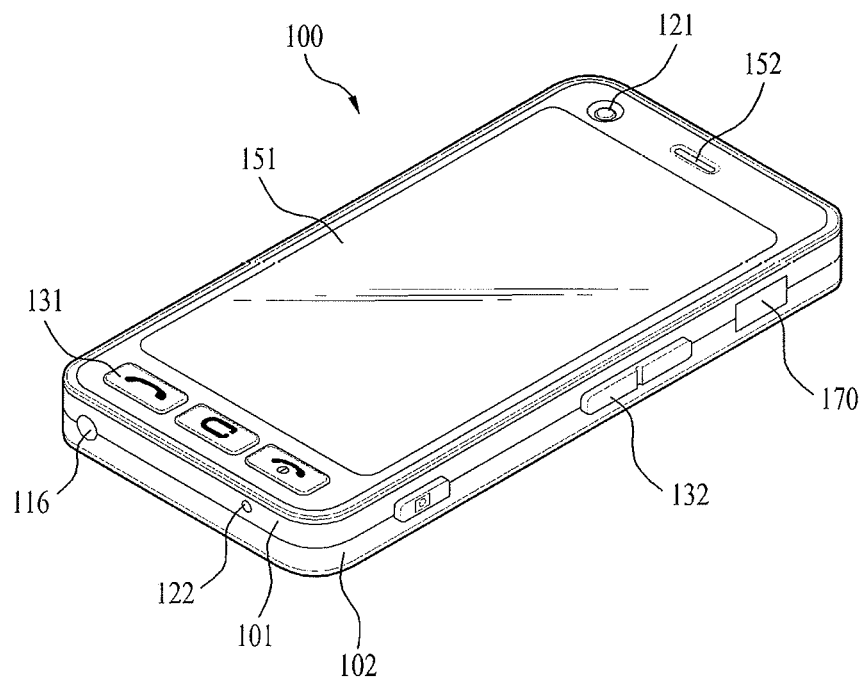
FIG. 2A is a front perspective diagram of a mobile terminal according to one embodiment of the present invention.

FIG. 2A is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include a folder-type, a slide-type, a rotational-type, a swing-type and combinations thereof. For clarity, the following disclosure will described using a bar-type mobile terminal 100. However, such teachings apply equally to other types of mobile terminals.

Referring to FIG. 2A, the mobile terminal 100 includes a case (casing, housing, cover, etc.) to house an exterior of the mobile terminal 100. In one embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102. The cases 101 and 102 are formed by injection molding of synthetic resin or can be formed of metal substance such as stainless steel (STS), titanium (Ti) or the like for example.

The display 151, the audio output unit 152, the camera 121, user input unit 130, which includes a plurality of manipulation units 131 and 132, the microphone 122, the interface 180 and the like can be provided to the terminal body, and more particularly, to the front case 101. The display 151 occupies most of the main face of the front case 101. The audio output unit 151 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. The manipulating units 131 and 132 can be named a manipulating portion and may adopt any mechanism of a tactile manner that enables a user to perform a manipulation action by experiencing a tactile feeling.

A content inputted by the first or second manipulating unit 131 or 132 can be diversely set. For instance, a command such as a start, an end, a scroll and the like is inputted to the first manipulating unit 131. Further, a command for adjusting the volume of a sound outputted from the audio output unit 152, a command for switching to a touch to recognize a mode of the display 151 or the like can be inputted to the second manipulating unit 132.

Figure 2B:
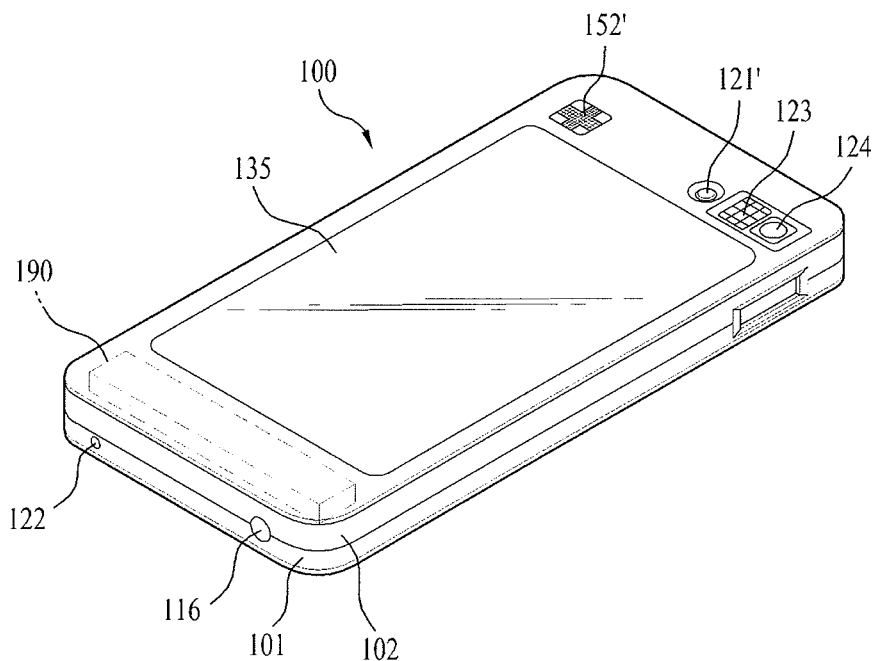
FIG. 2B is a rear perspective diagram of a mobile terminal according to one embodiment of the present invention.

FIG. 2B is a perspective diagram of a backside of the terminal shown in FIG. 2A. Referring to FIG. 2B, a camera 121' can be additionally provided to the backside of the terminal body, and more particularly, to the rear case 102. The camera 121 has a photographing direction that is substantially opposite to that of the former camera 121 shown in FIG. 2A and may have pixels differing from those of the camera 121.

Preferably, for instance, the camera 121 has low enough pixels to capture and transmit a picture of the user's face for a video call, while the camera 121' has higher pixels for capturing a general subject without transmitting the captured subject. Each of the cameras 121 and 121' can be installed at the terminal body to be rotated or popped up. A flash 123 and a mirror 124 are additionally provided adjacent to the camera 121'. The flash 123 projects a light toward a subject for photographing the subject using the camera 121'. When the user attempts to take a picture of herself (self-photography) using the camera 121', the mirror 124 enables the user to view her face reflected on the mirror 124.

An additional audio output unit 152' can be provided to the backside of the terminal body. The additional audio output unit 152' is able to implement a stereo function together with the audio output unit 152 shown in FIG. 2A, and may be used for implementing a speakerphone mode in talking over the terminal.

A broadcast signal receiving antenna 116 can be additionally provided to the lateral side of the terminal body as well as an antenna for communications or the like. The antenna 116 attached on a portion of the broadcast receiving module 111 shown in FIG. 1 can be retractably provided to the terminal body.

A power supply unit 190 for supplying power to the terminal 100 is also provided to the terminal body and can be built within the terminal body. Alternatively, the power supply unit 190 can be detachably connected to the terminal body.

A touchpad 135 for detecting a touch can be additionally provided to the rear case 102. The touchpad 135 can be a light transmittive type such as the display 151. In this case, if the display 151 outputs visual information from its both faces, it is able to recognize the visual information via the touchpad 135. The information outputted from both faces can be entirely controlled by the touchpad 135. Alternatively, a display is further provided to the touchpad 135 so that the touchscreen can be provided to the rear case 102 as well. The touchpad 135 is activated by interconnecting with the display 151 of the front case 101. The touchpad 135 can be provided in the rear of the display 151 in parallel. The touchpad 135 can have a size equal to or smaller than that of the display 151.

In the following description, a process for reducing and displaying a plurality of contents in a list having a plurality of the contents grouped per specific name according to the present invention is explained in detail with reference to FIGS. 3 to 47.

First of all, if the specific name is an index name, a process for reducing and displaying the grouped contents in the list having the contents grouped per index name according to a first embodiment of the present invention is explained in detail with reference to FIGS. 3 to 20 as follows.

[First Embodiment]

FIG. 3 is a first flowchart of a process for reducing and displaying a plurality of contents in a list having a plurality of the contents grouped per index name therein according to the present invention. FIGS. 4 to 20 are diagrams of screen configurations of a process for reducing and displaying a plurality of contents in a list having a plurality of the contents grouped per index name according to a first embodiment of the present invention.

Referring to FIGS. 3 to 20, the controller 180 of the mobile terminal 100 displays a list 300, which includes preset index names and a plurality of contents grouped for each of preset index names, on the touchscreen 151 (S110), and then monitors whether a command for a reduced display of the contents associated with the index names is inputted by a user (S120).

In this case, referring to FIGS. 4 to 20, the list 300 is displayed in a following manner. First, a plurality of index names is arranged on a plurality of lines, respectively. And, contents belonging to each of the index names are grouped and displayed subordinate lines of the corresponding index name. In particular, the grouped contents are displayed as a tree structure of the corresponding index name.

Moreover, the contents may correspond to data provided to the mobile terminal 100 as contact information in a phonebook, an incoming/outgoing call history, an email, a music file, a video file, an image file, schedule information, a document file, a game file, a webpage address file, an application and the like. Occasionally, the contents can include a menu as well. The contents included in the list 300 can include the contents of the same type or the contents of different types.

As a result of the monitoring step, if the command for the reduced display of the contents is inputted to the list 300 (S130), the controller 180 generates summary information for each index names which includes the grouped contents associated with each index names (S140). In this case, the summary information can include information indicating the total number of the grouped contents, information indicating names of the grouped contents, or a thumbnail image for identifying types of the contents.

Once the summary information is generated, the controller 180 stops displaying all of the contents grouped for each of the index names within the list 300 (S150), and displays the index names only. Further, the controller 180 displays the corresponding summary information at the position where the contents were displayed, or within the corresponding index name (S160).

In the following description, a process for reducing and displaying the contents within the list 300 in accordance with various reduced display commands is explained with reference to FIGS. 4 to 13.

FIGS. 4 to 7 are diagrams of screen configurations for reducing and displaying contents within the list in accordance with a user's pinching multi-touch gesture according to a first embodiment of the present invention.

First of all, FIG. 4 shows that the list 300 includes alphabet index names 310 where the contents are grouped in order of the alphabets. Referring to FIG. 4(a), on the display 151, an index name 310 includes contents 311 and 312 grouped into the index name 310 and an index name 320 includes contents 321, 322 and 323 grouped into the index name 320. While the list 300 is displayed, if a multi-touch corresponding to the user's pinching action is inputted to the list 300 as the reduced display command in the step S120, the controller 180 generates summary information 310A to 370A respectively representing the grouped contents associated with the corresponding index name and then displays the generated summary information 310A to 370A.

While a first point and a second point are multi-touched on the list 300, if a distance between the multi-touched first and second points is within a preset distance, the controller 180 generates the summary information 310A to 370A and displays the same. On the other hand, as the distance between the multi-touched first and second points gradually decreases, the controller 180 is able to generate and display the summary information on each of the grouped contents between the first and second points within the list 300 gradually.

The preset distance is compared to the distance between the multi-touched first and second points, and the preset distance can be divided into plural distances. For instance, the preset distance can be divided into reference values D1, D2 (D1>D2), D3 (D2>D3), D4 (D3>D4) and D5 (D4>D5).

Here, the D1 is a reference value for generating the summary information corresponding to 20% of the content groups in the list 300, the D2 is a reference value for generating the summary information corresponding to 40% of the content groups in the list 300, the D3 is a reference value for generating the summary information corresponding to 60% of the content groups in the list 300, the D4 is a reference value for generating the summary information corresponding to 80% of the content groups in the list 300, and the D5 is a reference value for generating the summary information corresponding to 100% of the content groups in the list 300. In particular, if the distance between the multi-touched first and second points decreases in order of D1→D2→D3→D4→D5, the controller 180 generates and displays the summary information on the content groups in order of 20%→40%→60%→80%→100% of the content groups.

In the following description, a touch for decreasing the distance between the multi-touched first and second points shall be named a 'pinching-in multi-touch' and a touch for increasing the distance between the multi-touched first and second points shall be named a 'pinching-out multi-touch.'

Figure 5:
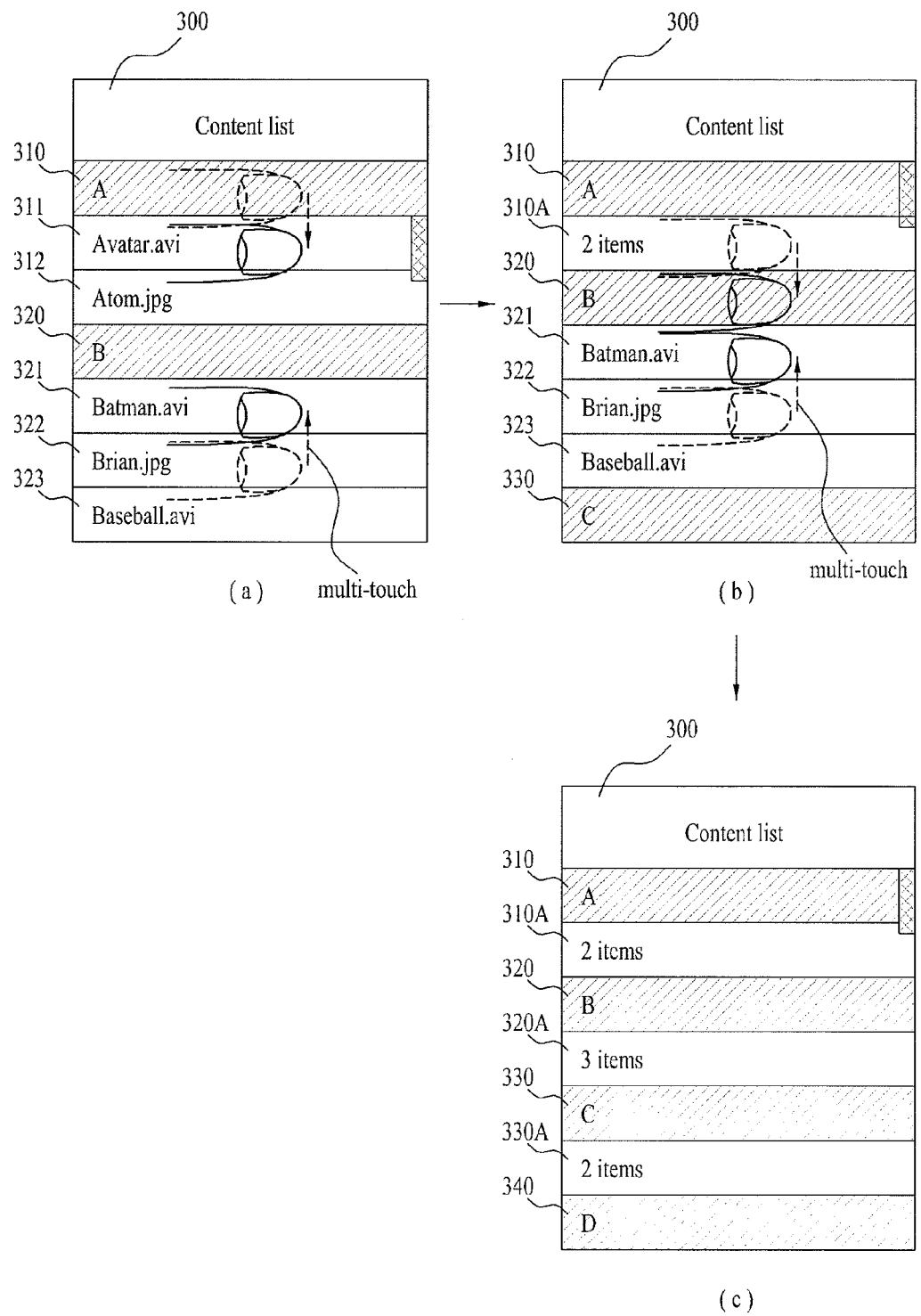
Figure 6:
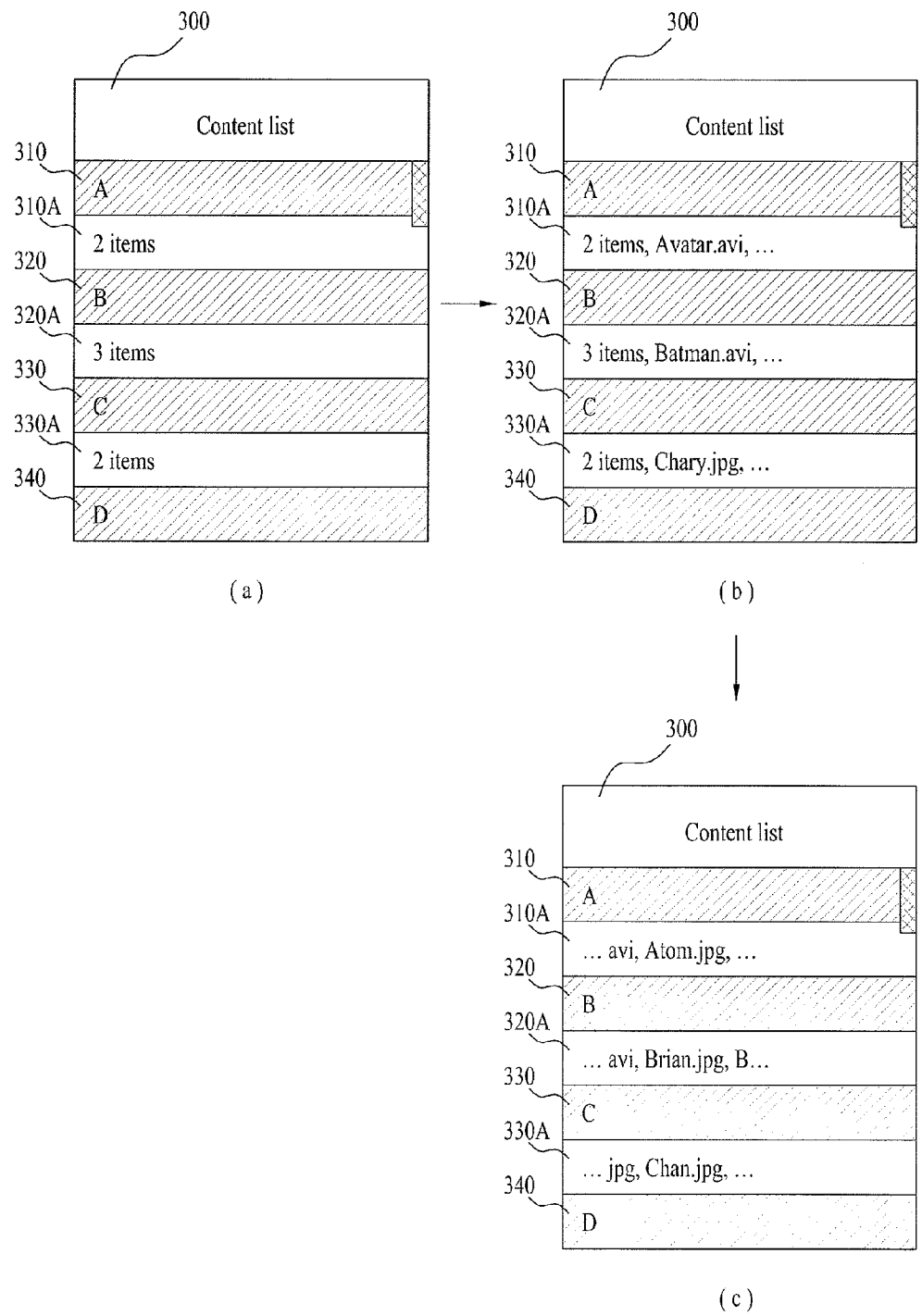
Figure 7:
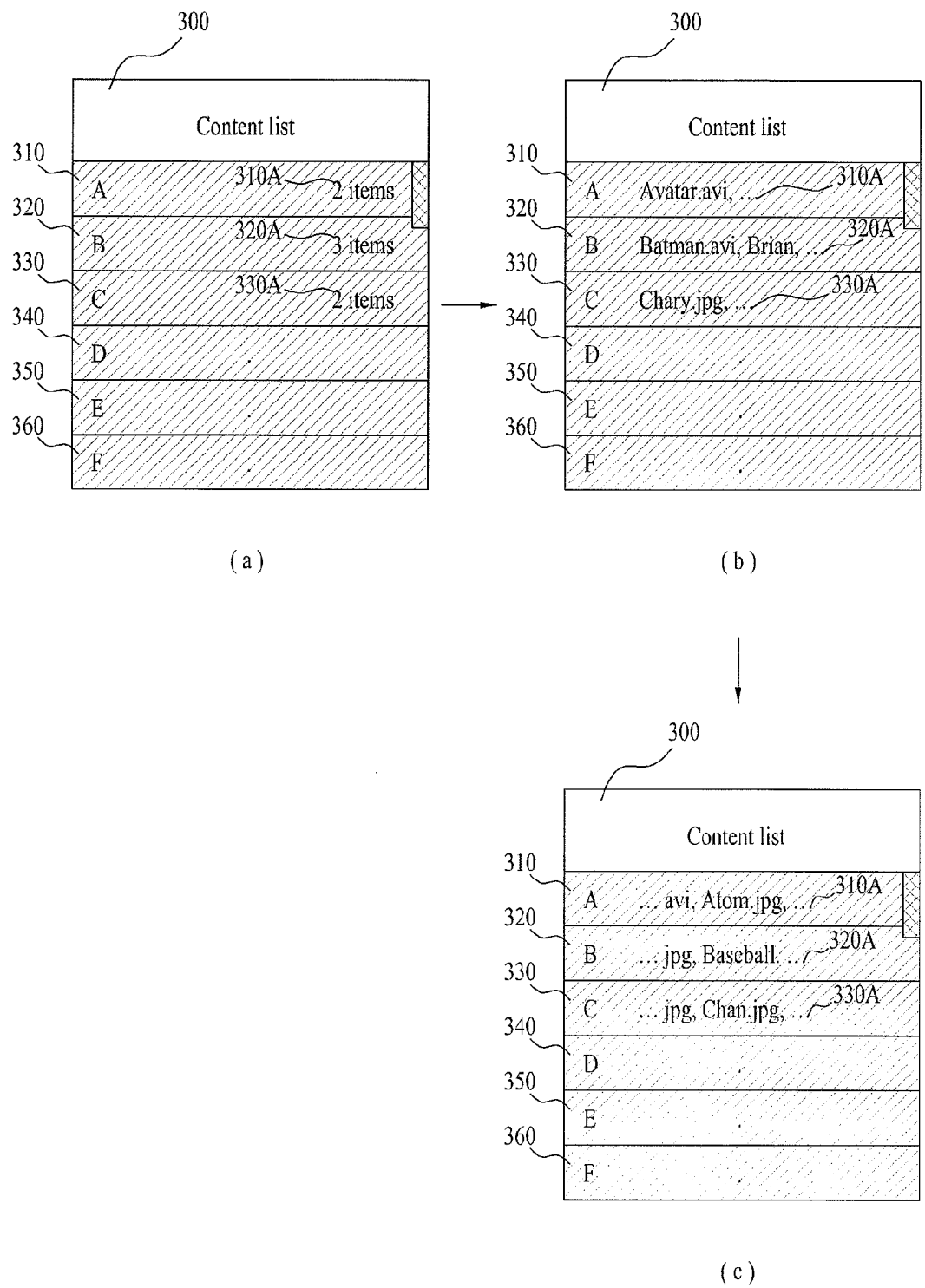

Referring to FIG. 5, if a multi-touch holding distance between the first and second points gradually decreases, the summary information on each of the grouped contents is gradually generated within the list 300. In particular, if the distance between the multi-touched first and second points is in the range of the D1 as shown in FIG. 5(a), the controller 180 generates and displays the summary information 310A on the contents belonging to the index name 310 among the entire content groups only, as shown in FIG. 5(b). On the other hand, the distance between the multi-touched first and second points is decreased into the range of the D5 from the range of the D1, the controller generates and displays the summary information 310A to 370A on the contents belonging to the whole index names 310 to 370, respectively, as shown in FIG. 5(c).

Here, the controller 180 does not display the contents grouped for each of the index names 310 to 370 within the list 300 but is able to display the summary information 310A, 320A and 330A at the positions where the contents were displayed, respectively, as shown in FIG. 4(c). In particular, referring to FIG. 4(c), the controller 180 reduces a plurality of the lines, on which the contents grouped per index name 310, 320, 330, 340, 350, 360 or 370 were displayed, into one line and then displays each of the summary information 310A to 370A on the reduced one line. In other words, the controller 180 does not display the contents and, for example, displays only the summary information 310A of the index name 310 on one line below the index name 310, where the summary information 310A merely indicates a number of contents included in the index name 310.

Referring to FIG. 4(d), the controller 180 does not display the contents, rearranges the index names 310 to 370 on the lines of the list 300 in order, displays the rearranged index names 310 to 370, and then displays the generated summary information 310A to 370A within the corresponding index names, respectively. In other words, the controller 180 is able to display substances of the summary information 310A to 370A within the same line as the corresponding index names 310 to 370 in a manner of scrolling them in order.

In particular, referring to FIG. 6(a), the summary information 310A, 320A and 330A are displayed at the positions under the corresponding index names 310 to 330. Here, the summary information 310A, 320A and 330A indicates the number of the grouped contents. When the user scrolls the summary information 310A-3330A in a left direction within the lines having the summary information 310A-330A, the controller 180 is able to display substances of the summary information 310A, 320A and 330A on the lines where the number of contents included under the index names 310-330 was initially displayed, as shown in FIG. 6(b) and FIG. 6(c).

Referring to FIG. 7(a), the summary information 310A, 320A and 330A are displayed within the corresponding index names. When the user scrolls the summary information 310A-330A in a left direction within the lines having the summary information 310A-330A, the controller 180 is able to display substances of the summary information 310A, 320A and 330A next to the index names 310-330 where the number of contents included under the index names 310-330 was initially displayed, as shown in FIG. 7(b) and FIG. 7(c).

Figure 8:
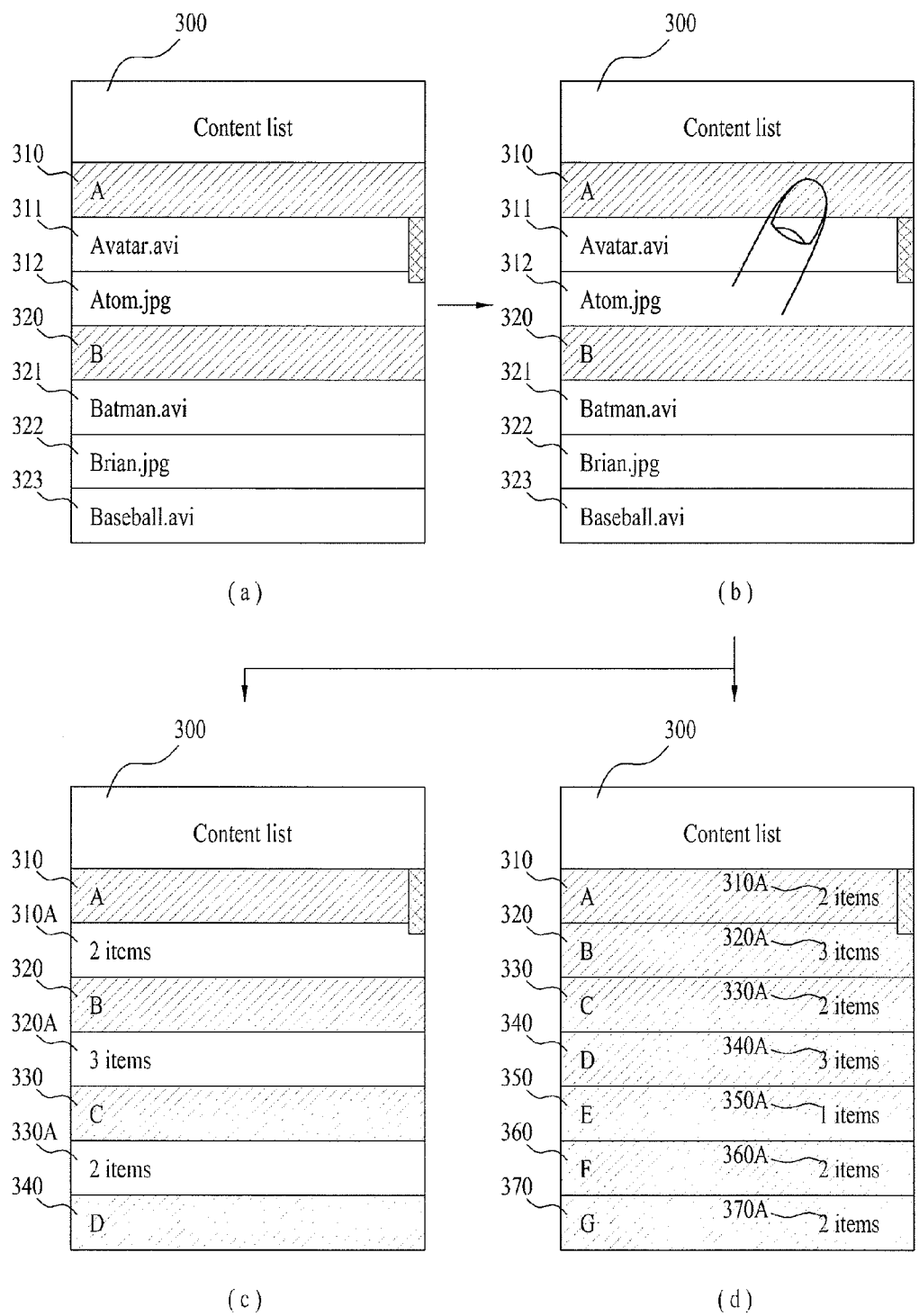
Figure 9:
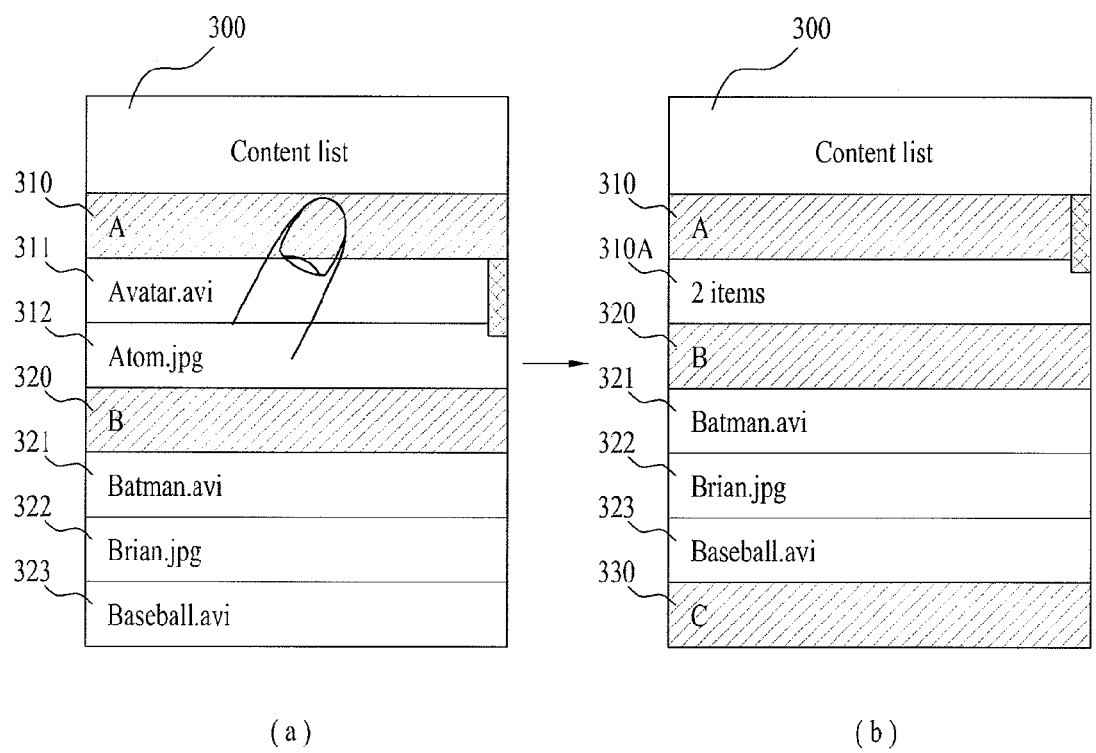
Figure 10:
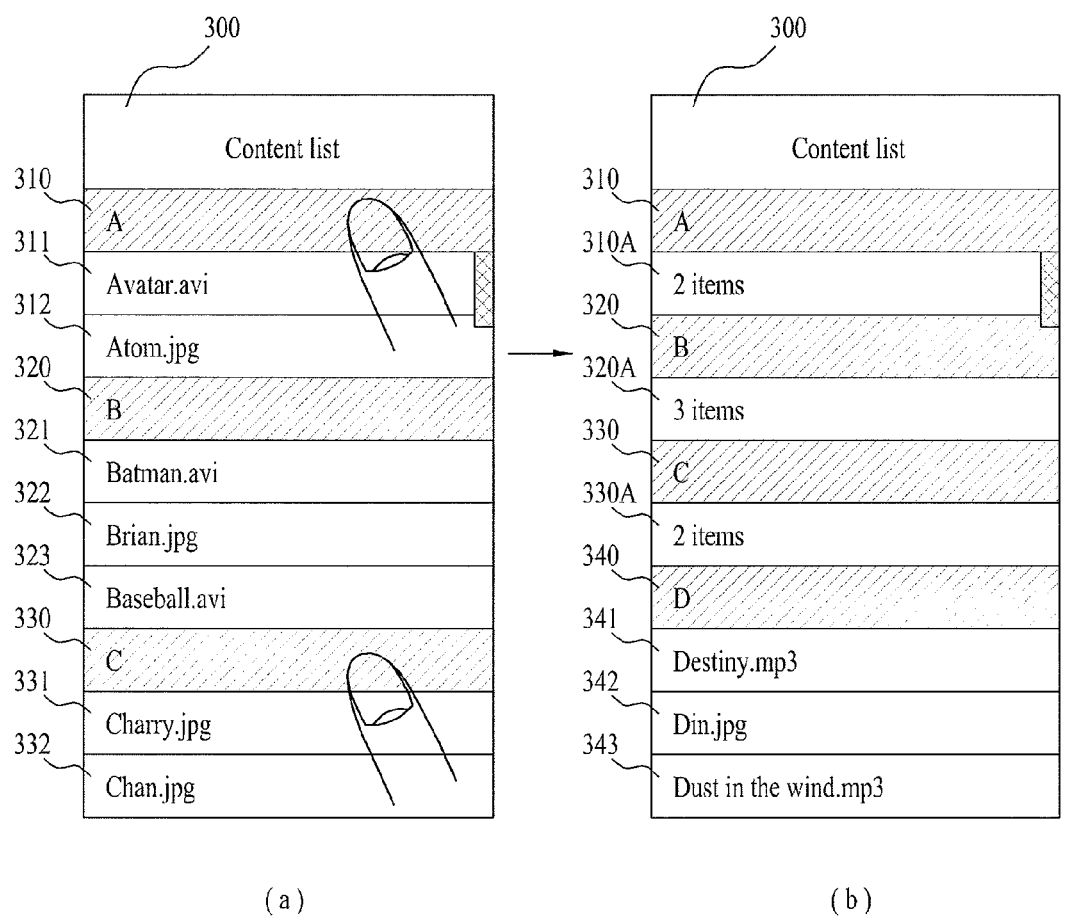

FIGS. 8 to 10 are diagrams of screen configurations of a process for reducing and displaying contents within a list in accordance with a user's index command touch according to a first embodiment of the present invention.

Referring to FIG. 8, if a specific index name 310 is touched within the list 300 as the reduced display command in the step S120, as shown in FIG. 8(a) and FIG. 8(b), the controller 180 generates summary information 310A to 370A for the grouped contents for each of the index names, and then displays the generated summary information 310A to 370A, as shown in FIG. 8(c) and FIG. 8(d). In this case, the touch shown in FIG. 8(b) can include a single touch for touching one point or a multi-touch for touching at least two points.

If the index name 310 is touched within the list 300, as shown in FIG. 9(a), the controller 180 generates and displays the summary information 310A on the contents belonging to the touched index name 310 only. Referring to FIG. 10, if the index name 310 and the index name 330 are multi-touched within the list 300, the controller 180 generates and displays the summary information 310A, 320A and 330A for the contents belonging to the index names 310, 320 and 330, where the index names 310, 320 and 330 are located within the multi-touched points.

Figure 11:
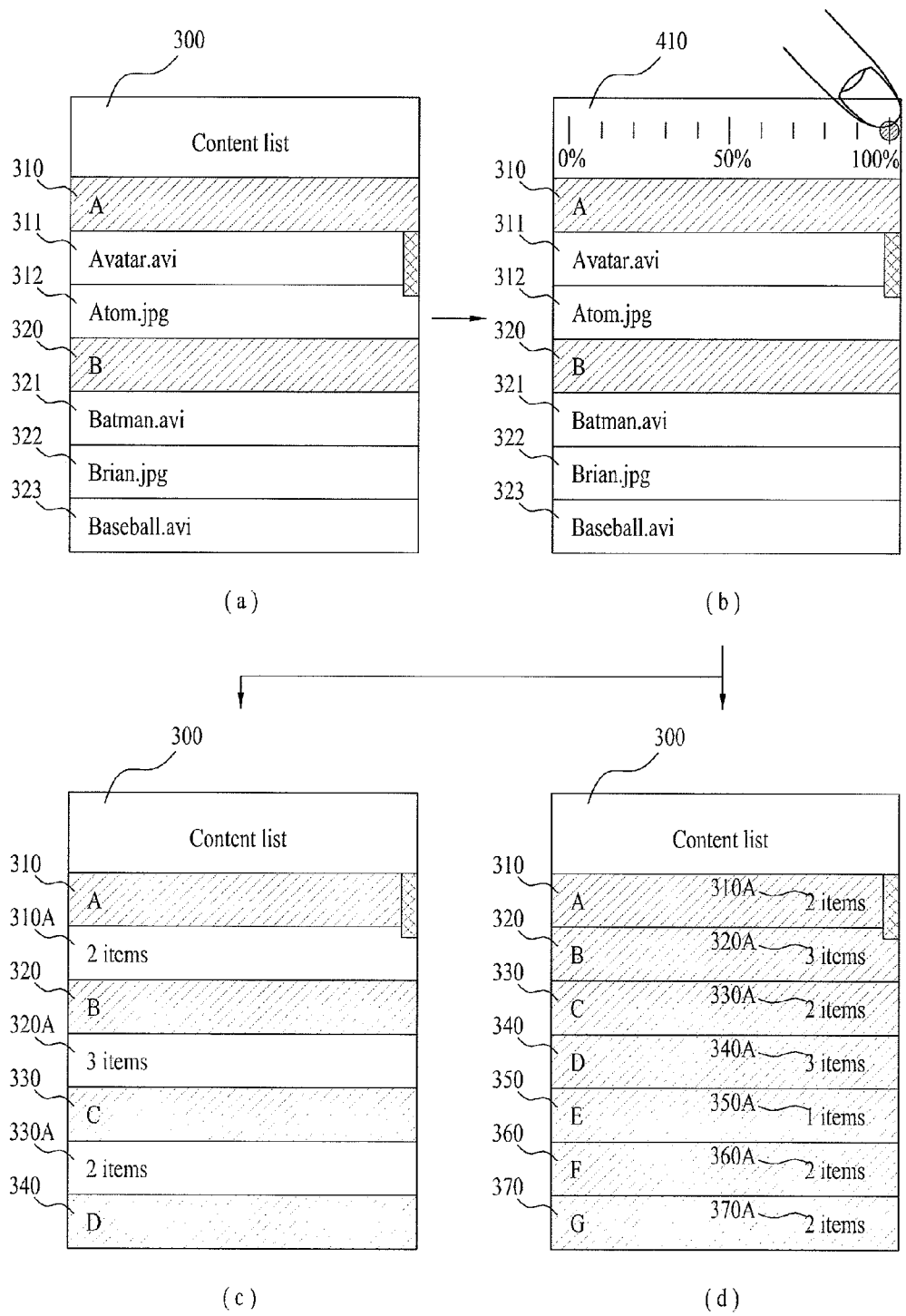

FIG. 11 is a diagram of screen configurations of a process for reducing and displaying contents within a list using a bar for a reduced display adjustment of the contents according to a first embodiment of the present invention. Referring to FIG. 11, if the controller 180 displays a bar 410 for the reduced display adjustment of the grouped contents outside or inside the list 300 and the user then adjusts the bar 410, the controller 180 generates and displays the summary information 310A to 370A of the grouped contents for each of the index names to correspond to the adjustment of the bar 410. For instance, if the 20% section is touched on the bar 410, the controller 180 is able to generate and display the summary information on 20% of the content groups within the list 300. For another instance, if the 100% section is touched on the bar 410, the controller 180 is able to generate and display the summary information on 100% of the content groups within the list 300.

Figure 12:
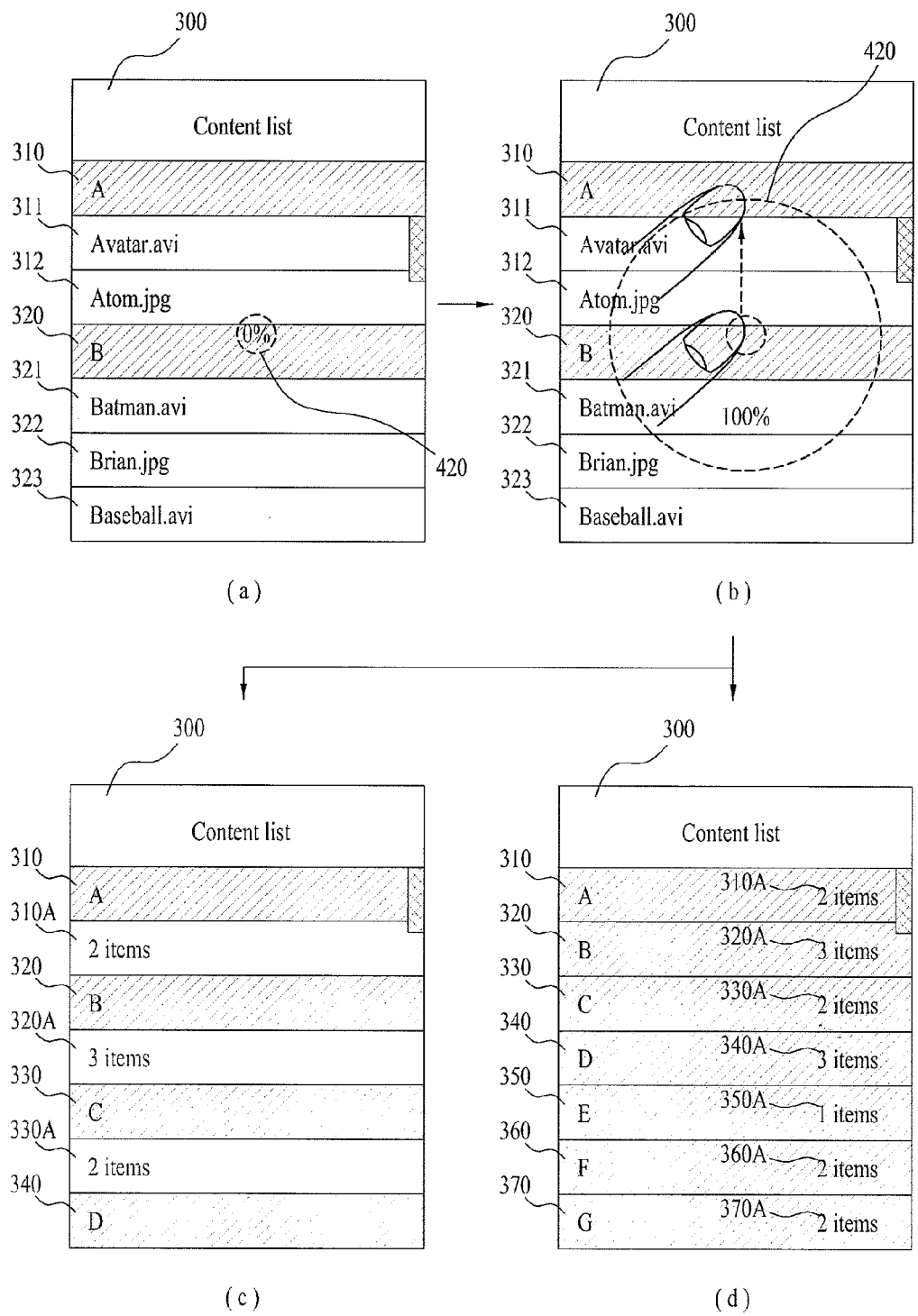

FIG. 12 is a diagram of screen configurations of a process for reducing and displaying contents within a list using a circle shape for a reduced display adjustment of the contents according to a first embodiment of the present invention. Referring to FIG. 12(a), the controller 180 displays a circle shape 420 for the reduced display adjustment of the contents inside or outside the list 300. In this case, a size of the circle shape 420 may be changed in accordance with a user's touch. In particular, referring to FIG. 12(b), if the size of the circle shape 420 is changed by the user, the controller 180 generates and displays summary information on the content groups to correspond to the changed size, respectively. For instance, if the size of the circle shape 420 is increased by 50% from an initial size, the controller 180 is able to generate and display the summary information of 50% of the content groups in the list 300. For another instance, if the size of the circle shape 420 is increased by 100% from an initial size, the controller 180 is able to generate and display the summary information of 100% of the content groups in the list 300.

Figure 13:
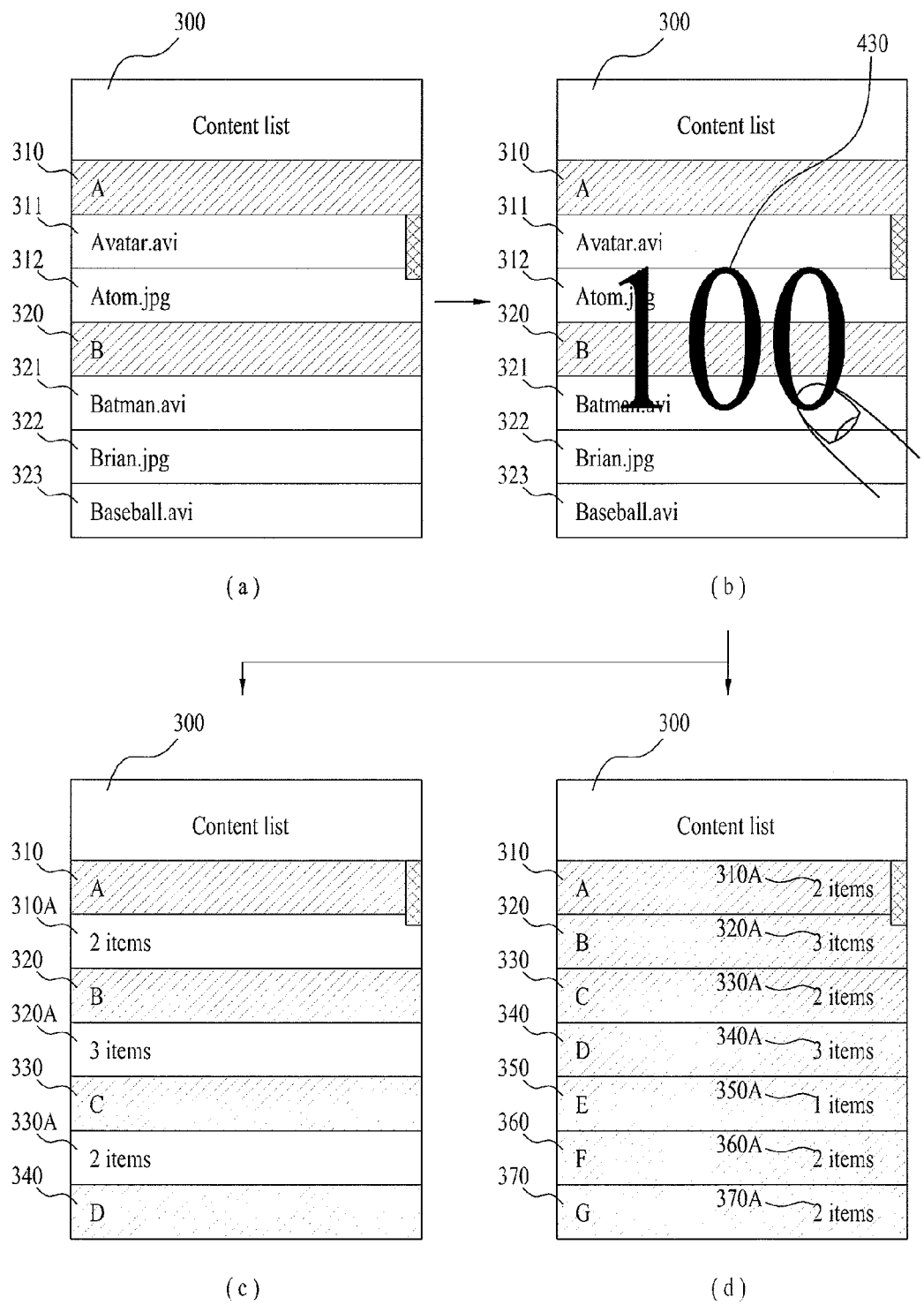

FIG. 13 is a diagram of screen configurations of a process for reducing and displaying contents within a list using a touch gesture for a reduced display adjustment of the contents according to a first embodiment of the present invention.

Referring to FIG. 13, if a touch gesture 430 previously set for a reduced display of the contents is inputted to the list 300, as shown in FIG. 13(a) and FIG. 13(b), the controller 180 generates and displays summary information on the contents to correspond to the inputted touch gesture 430, as shown in FIG. 13(c) and FIG. 13(d). In doing so, the touch gesture 430 can include a gesture having a pattern of a numeral figure. For instance, referring to FIG. 13(b), if the touch gesture 430 corresponding to a numeral '100' is inputted to the list 300, the controller 180 is able to generate and display summary information on the entire content groups within the list 300. Further, if the touch gesture 430 corresponding to a numeral '50' is inputted to the list 300, the controller 180 is able to generate and display summary information on 50% of the entire content groups within the list 300. Moreover, if a motion gesture of a preset pattern having a reduced display function of the contents is inputted via the motion sensor 142, the controller 180 generates and displays summary information on the contents to correspond to the inputted motion gesture.

For example, if the motion gesture corresponding to a figure of a numeral '100' for the body of the mobile terminal 100 is inputted via the motion sensor 142, the controller 180 is able to generate and display summary information on the entire content groups within the list 300. In addition, if the motion gesture corresponding to a figure of a numeral '50' for the body of the mobile terminal 100 is inputted via the motion sensor 142, the controller 180 is able to generate and display summary information on 50% of the entire content groups within the list 300.

Figure 14:
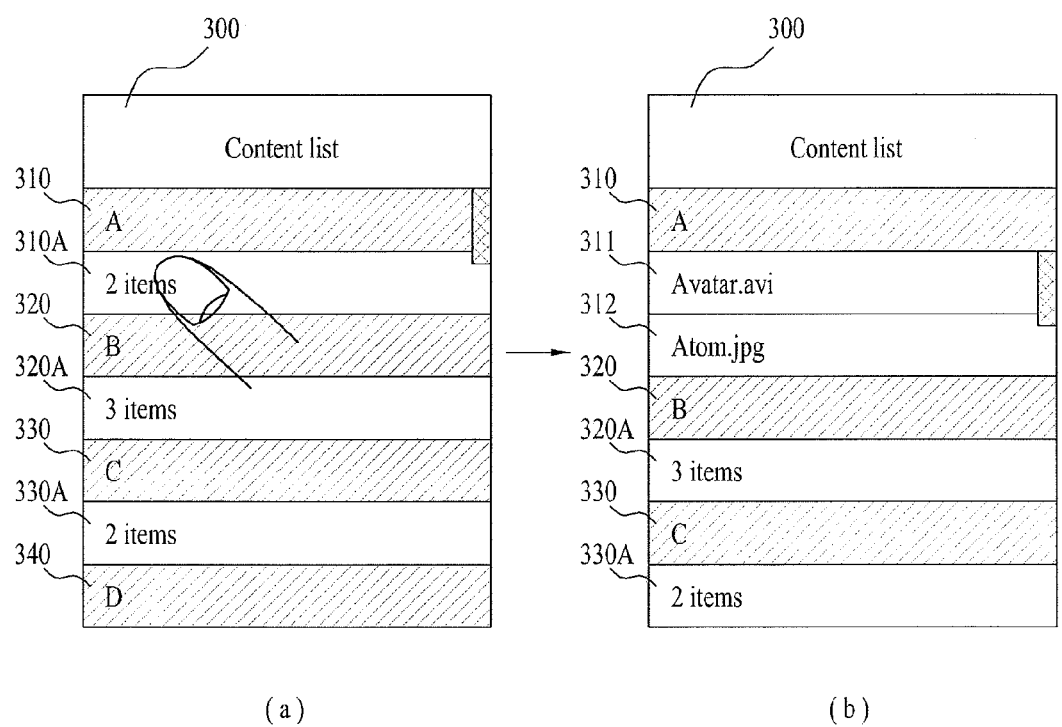

Referring to FIG. 14, summary information 310A, 320A and 330A of the contents grouped for each of the index names are displayed within the list 300. If the specific summary information 301A is touched by the user, as shown in FIG. 14(a), the controller 180 displays the contents 311 and 312 represented by the touched summary information 310A, as shown in FIG. 14(b).

Figure 15:
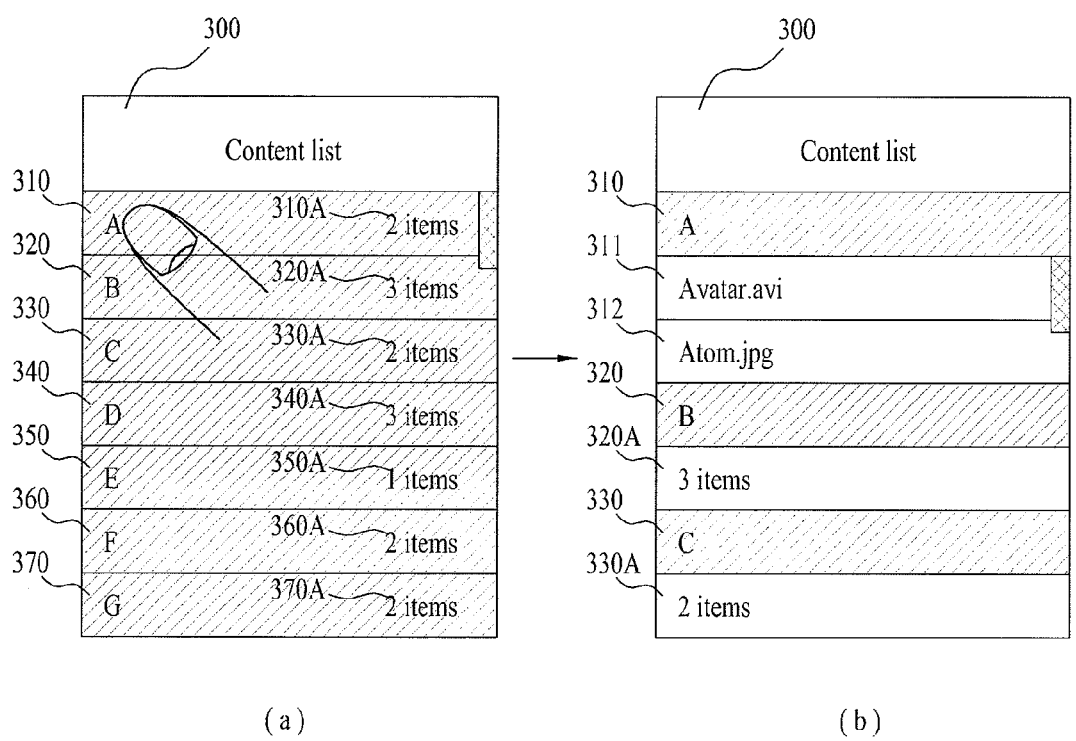

Referring to FIG. 15, summary information 310A, 320A and 330A of the contents grouped for each of the index names are displayed within the list 300. If a specific index name 310 is touched by a user, as shown in FIG. 15(a), the controller 180 displays the contents 311 and 312 represented by the summary information 310A displayed within the touched index name 310, as shown in FIG. 15(b).

FIGS. 16 to 19 show the processes for editing the summary information while the summary information on the contents is displayed within the list 300.

Figure 16:
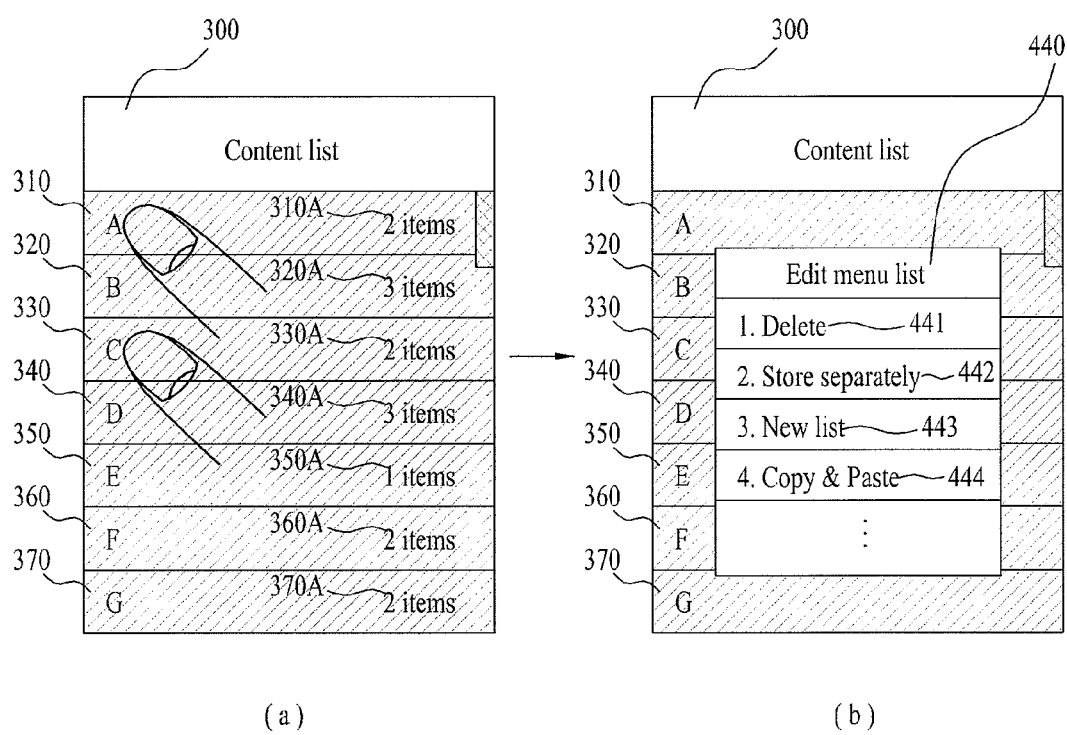

Referring to FIG. 16, if at least two or more summary information 310A and 330A or index names 310 and 330 including the summary information 310A and 330A are touched on the list 300, as shown in FIG. 16(a), the controller 180 displays a menu list 440 for editing the touched summary information 310A and 330A. In this case, referring to FIG. 16(b), the menu list 440 is able to include at least one of a delete menu 441 for deleting the touched summary information 310A and 330A from the list 300, a store menu 442 for storing the touched summary information 310A and 330A separately, a new list menu 443 for displaying a list including the touched summary information 310A and 330A only, and a menu 444 for copying & pasting the touched summary information 310A and 330A.

Figure 17:
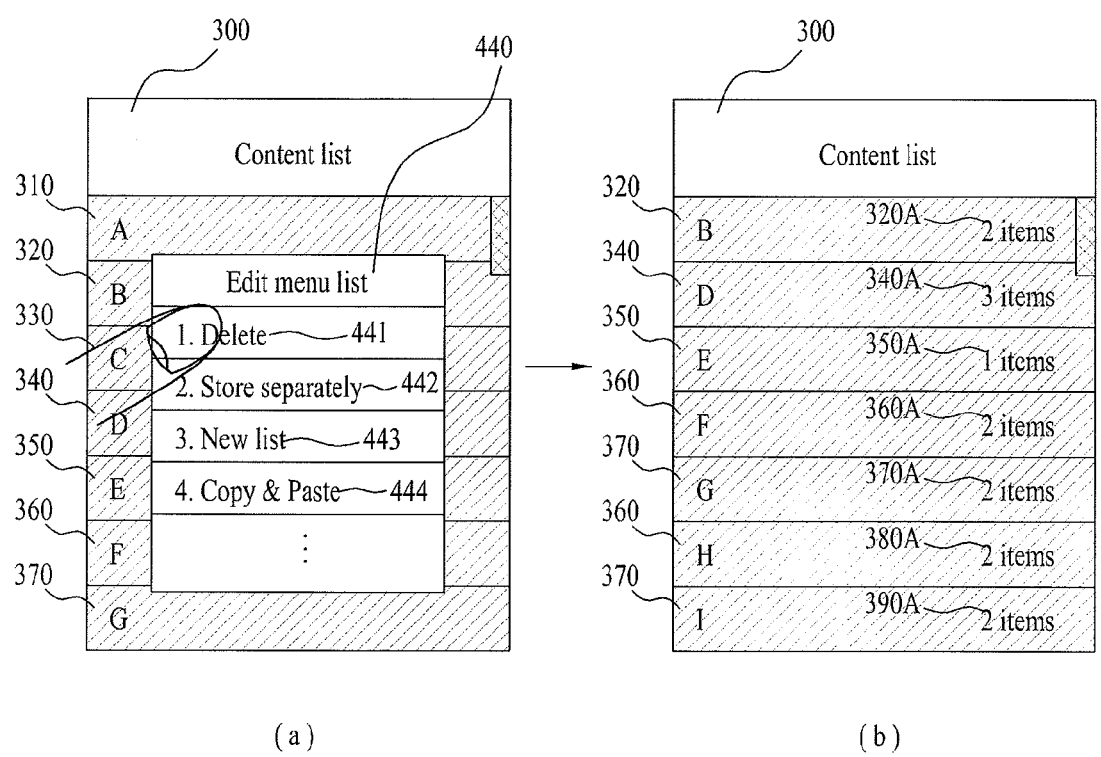
Figure 18:
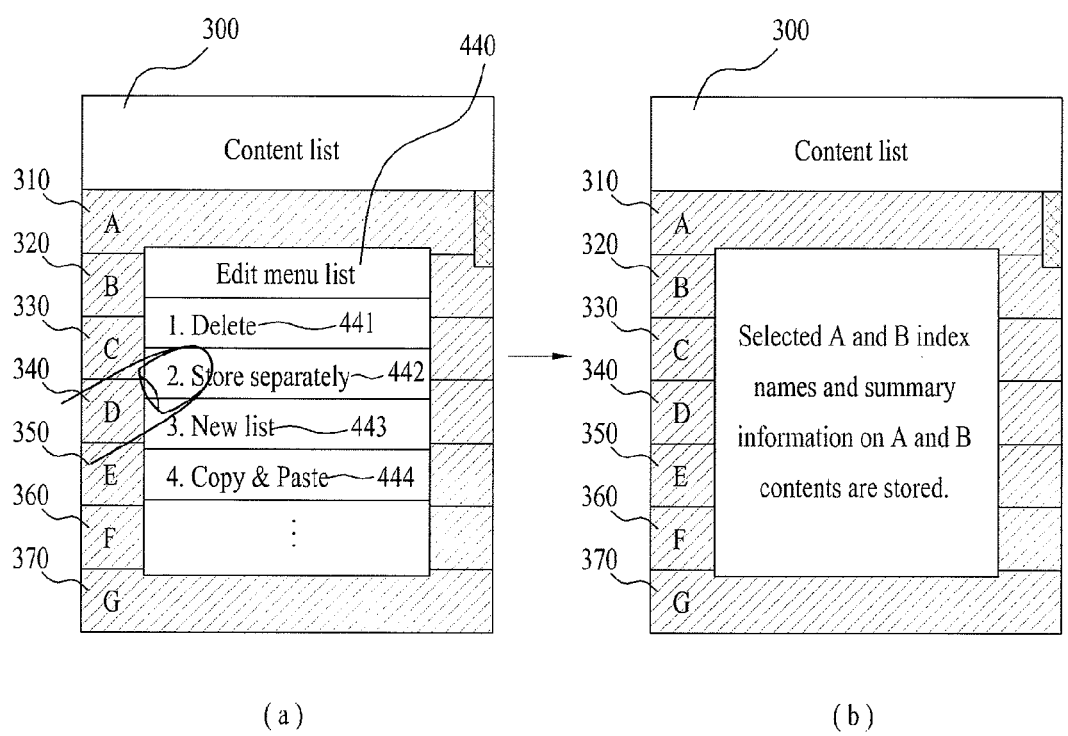
Figure 19:
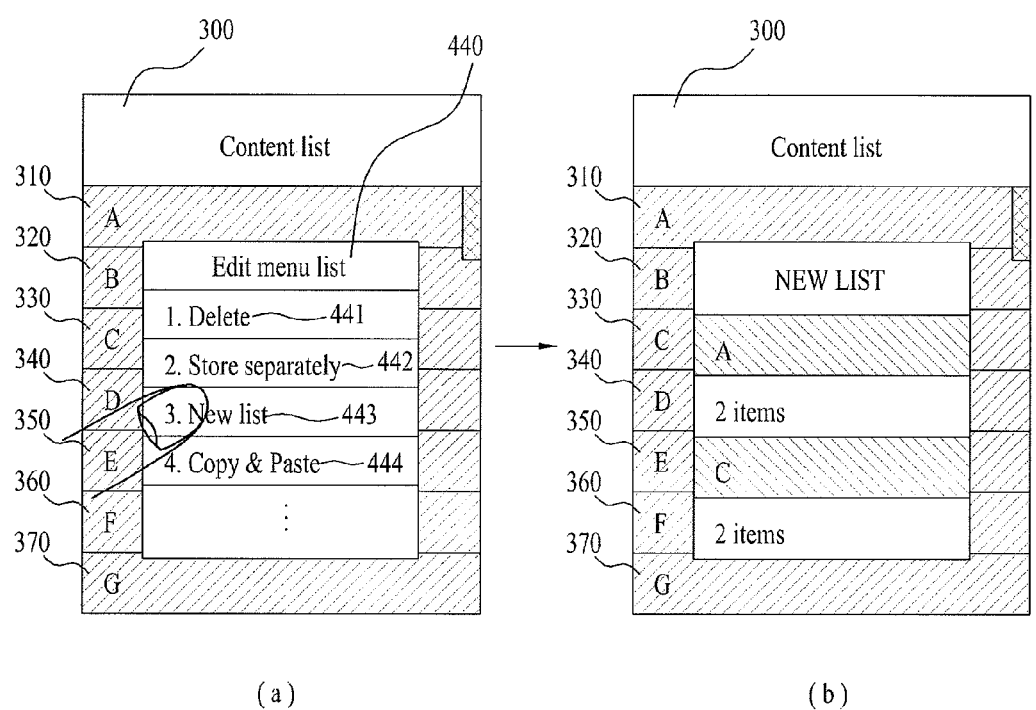

Referring to FIG. 17, if the delete menu 441 is selected from the menu list 440, the controller 180 deletes the touched summary information 310A and 330A from the list 300. Referring to FIG. 18, if the store menu 442 is selected from the menu list 440, the controller 180 stores the touched summary information 310A and 330A and the corresponding index names 310 and 330 separately within the list 300. Referring to FIG. 19, if the new list menu 443 is selected from the menu list 440, the controller 180 displays a list including the touched summary information 310A and 330A and the corresponding index names 310 and 330 within the list 300.

Figure 20:
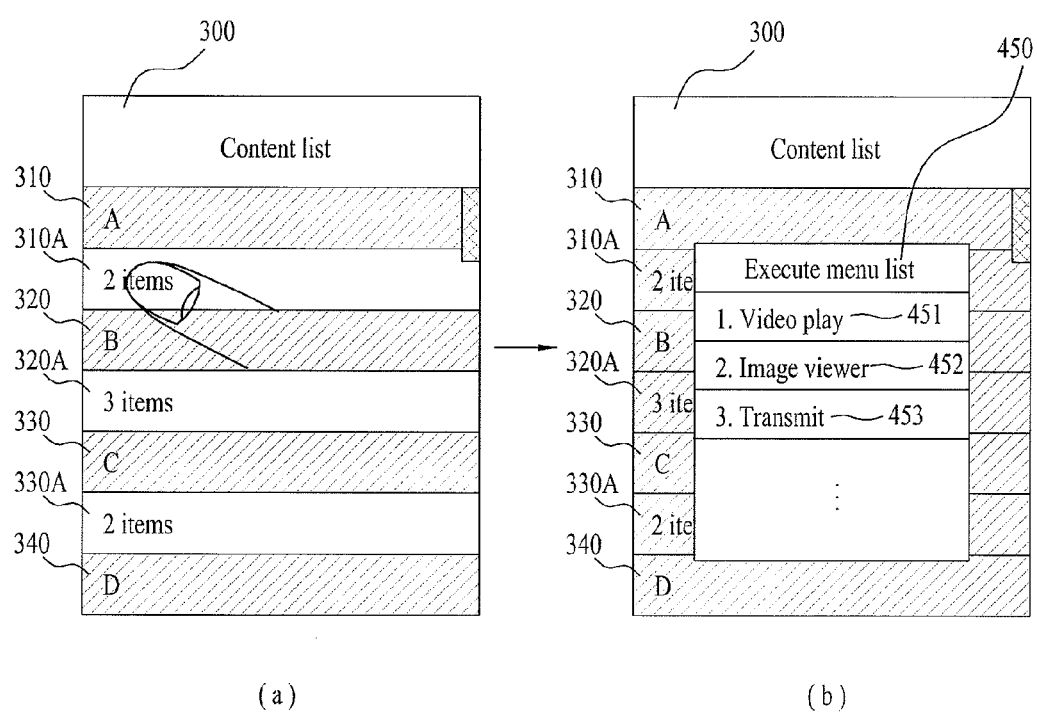

Meanwhile, referring to FIG. 20, if specific summary information is selected from the list 300, the controller 180 searches for a menu function related to contents associated with the selected summary information and is then able to display the found menu function. If the specific summary information 310A is selected from the list 300 including a plurality of summary information 310A, 320A and 330A, the controller 180 obtains menu functions for executing the contents 311 and 312 corresponding to the summary information 310A and then displays a list 450 of the obtained menu functions.

In particular, since the contents 311 and 312 represented by the summary information 310A are a video file of 'Avatar.avi' 311 and an image file of 'Atom.jpg' 312, the controller 180 is able to display a video play menu 451, an image viewer 452 and a menu 453 for transmitting the contents 311 and 312 within the menu list 450.

So far, the first embodiment of the present invention has been described in detail with reference to FIGS. 3 to 20.

In the following description, if the specific name is a category name and the contents are grouped per category name within a list, a method of reducing and displaying the grouped contents within the list according to a second embodiment of the present invention is described in detail with reference to FIGS. 21 to 38.

[Second Embodiment]

Figure 21:
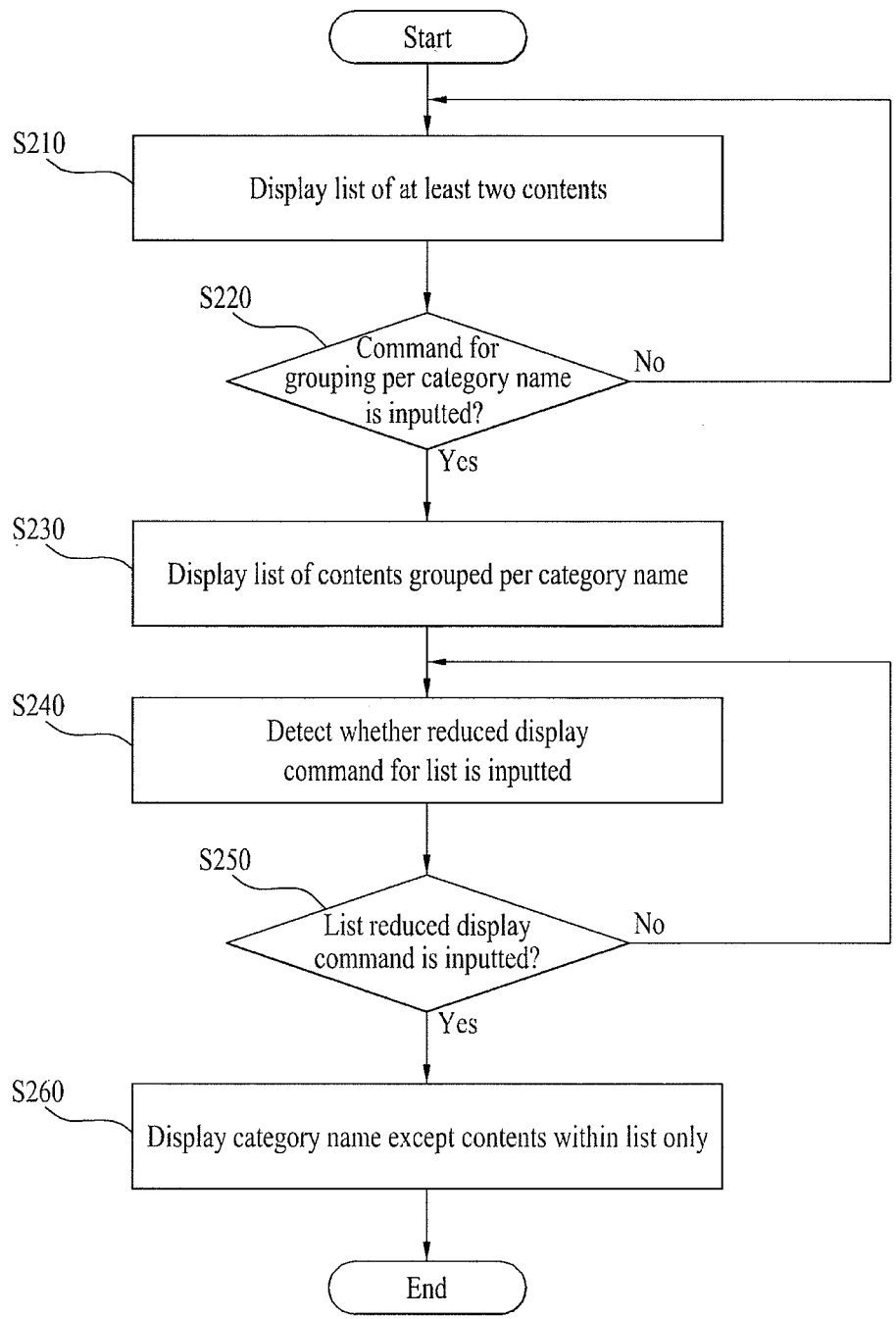
FIG. 21 is a first flowchart of a process for reducing and displaying a plurality of contents in a list having a plurality of the contents grouped per category name therein according to a second embodiment of the present invention.

FIG. 21 is a flowchart of a process for reducing and displaying a plurality of contents in a list having a plurality of the contents grouped per category name therein according to a second embodiment of the present invention.

FIGS. 22 to 38 are diagrams of screen configurations of a process for reducing and displaying a plurality of contents in a list having a plurality of the contents grouped per category name according to a second embodiment of the present invention.

Referring to FIGS. 21 to 38, while a list 500A including at least two or more contents 511 to 513, 521 to 523, and 531 to 533 is displayed on the touchscreen 151 (S210), if a user inputs a command for grouping the contents 511 to 513, 521 to 523 and 531 to 533 within the list 500A into preset category names (S220), the controller 180 groups the contents 511 to 513, 521 to 523 and 531 to 533 into the preset category names and then displays a category list 500B including the contents 511 to 513, 521 to 523 and 531 to 533 grouped into different category names 510, 520 and 530, respectively (S230).

Figure 22:
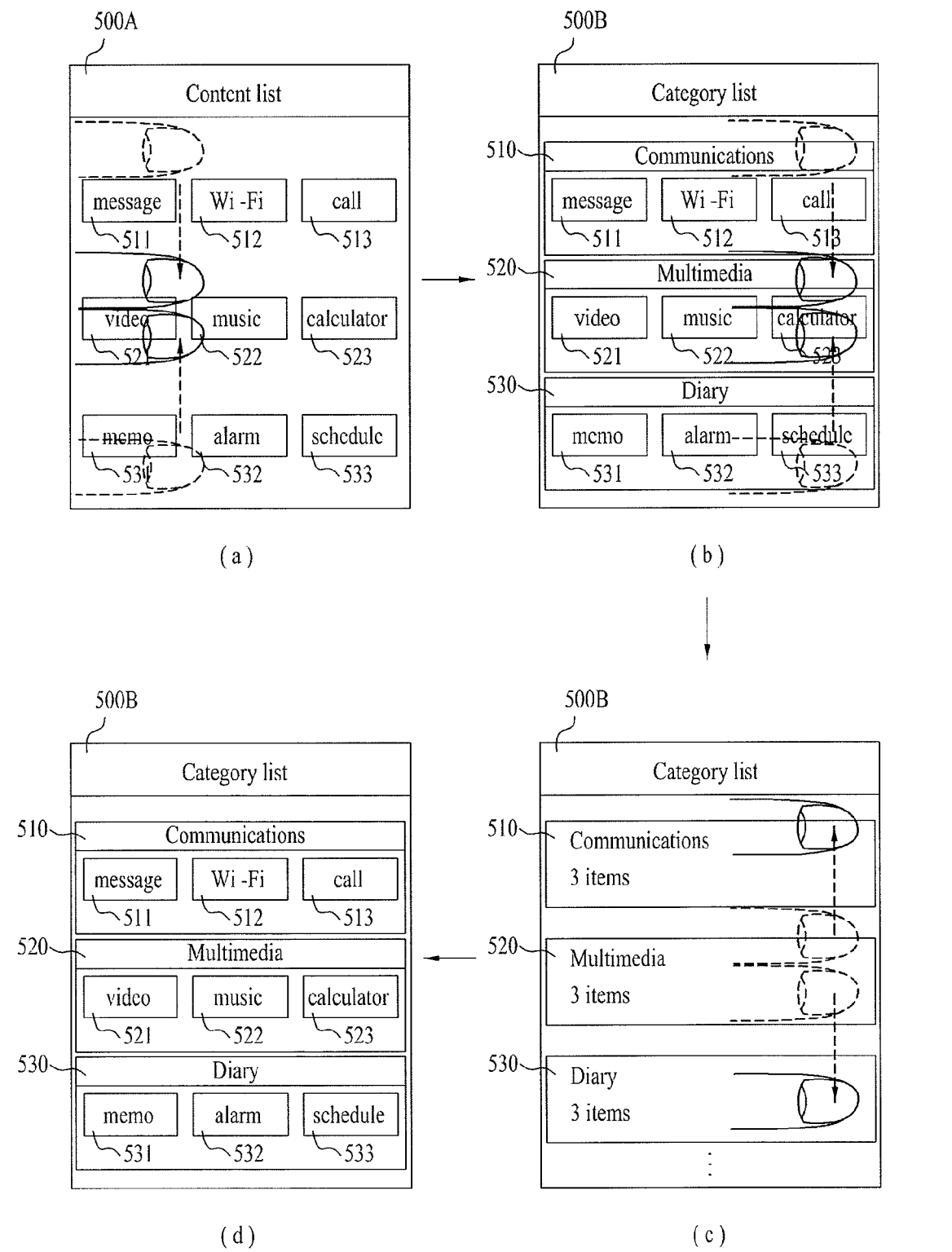

Referring to FIG. 22, the command inputted in the step 5220 can include the pinching-in multi-touch described with reference to the first embodiment of the present invention. If the pinching-in multi-touch is detected on the list 500A as shown in FIG. 22(a), the controller 180 displays the category list 500B in which the contents 511 to 513, 521 to 523 and 531 to 533 are grouped into the category names 510, 520 and 530, respectively, based on the pinching-in multi-touch as shown in FIG. 22(b).

In doing so, the contents 511 to 513, 521 to 523 and 531 to 533 are included in a box structure corresponding to the category names 510, 520 and 530 within the category list 500B as shown in FIG. 22(b), or can be displayed as a tree structure within the category list 500B. As mentioned in the above description, while the category list 500B is displayed, the controller 180 detects whether a reduced display command for the category list 500B is inputted (S240).

If the reduced display command is inputted (S250), the controller displays only the category names 510, 520 and 530 within the category list 500B and hides the contents 511 to 513, 521 to 523 and 531 to 533 (S260). In other words, if the reduced display command is inputted, the controller 180 does not display the contents 511 to 513, 521 to 523 and 531 to 533 within the category list 500B, but only displays the category names 510, 520 and 530 in a manner of filling the positions, at which the contents 511 to 513, 521 to 523 and 531 to 533 used to be displayed, with the category names 510, 520 and 530.

In the following description, a process for reducing and displaying the category list 500B in accordance with various reduced display commands is described with reference to FIGS. 22 to 30.

Figure 23:
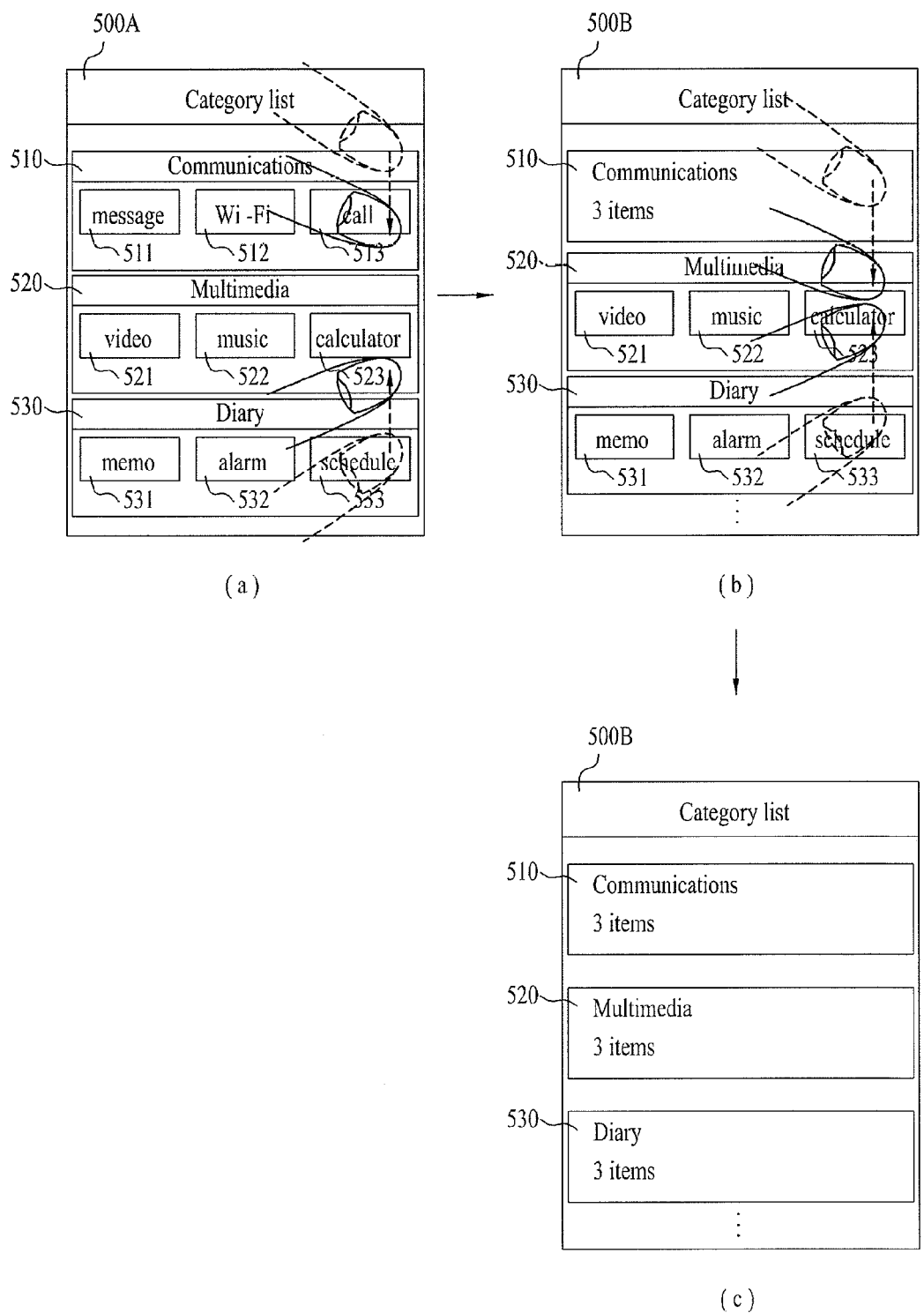
Figure 24:
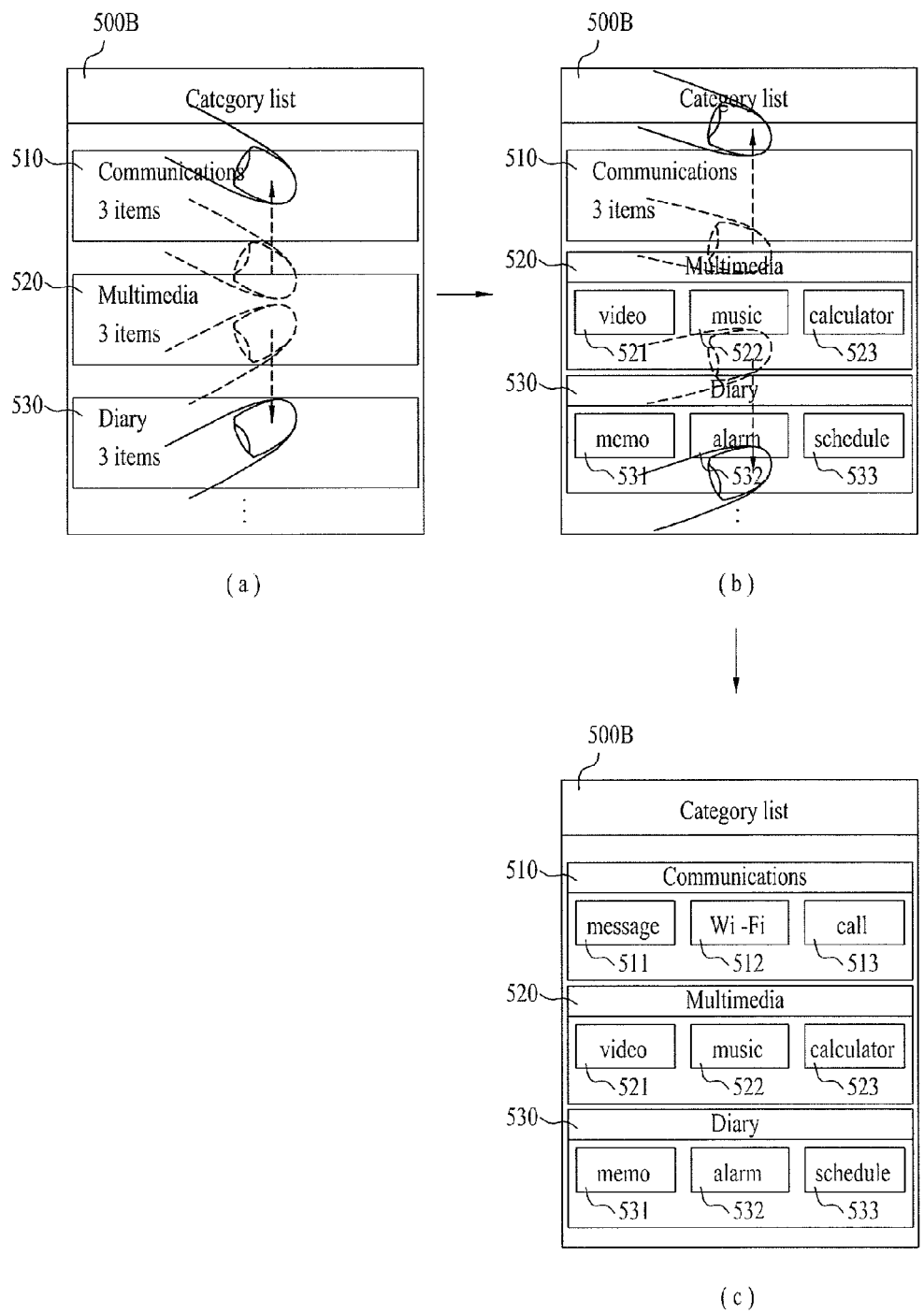

FIGS. 22 to 24 are diagrams of screen configurations of a process for reducing and displaying a category list in accordance with a user's pinching-in multi-touch according to a second embodiment of the present invention.

Referring to FIG. 22, if the user inputs the pinching-in multi-touch to the category list 500B as the reduced display command in the step 5250 as shown in FIG. 22(*b*), the controller 180 stops displaying the contents 511 to 513, 521 to 523 and 531 to 533 under the category names 510, 520 and 530. Thereafter, the controller 180 displays the category names 510, 520 and 530 in a manner of filling the positions, at which the contents 511 to 513, 521 to 523 and 531 to 533 used to be displayed as shown in FIG. 22(*c*). In particular, while first and second points are multi-touched on the category list 500B, if a distance between the first point and the second point is within a range of a previously set first reference distance, the controller 180 stops displaying the contents 511 to 513, 521 to 523 and 531 to 533 in the category list 500B.

Subsequently, as shown in FIG. 22(*c*), the category list 550B is reduced and displayed. Here, the controller 180 is able to generate and display summary information representing the contents corresponding to the category names 510, 520 and 530, respectively. In this case, the summary information can include names of the contents grouped into the corresponding category name and the number of the grouped contents. While the category list 500B is reduced and displayed, if a pinching-out multi-touch is inputted to the category list 500B as shown in FIG. 22(*c*), the controller 180 displays the corresponding contents 511 to 513, 521 to 523 and 531 to 533 on the category names 510, 520 and 530 within the category list 500B again as shown in FIG. 22(*d*).

Meanwhile, referring to FIG. 23, if the multi-touched distance between the first point and the second point gradually decreases, the controller 180 may gradually hide the contents 511 to 513, 521 to 523 and 531 to 533 within the category list 500B. The reference distance is compared to the multi-touch distance between the first point and the second point and the reference distance can be divided into a plurality of distances. For instance, the reference distance can be divided into reference values D1, D2 (D1>D2), and D3 (D2>D3).

For example, at the reference value D1, the controller 180 stops displaying 30% of total contents within the category list 500B, at the reference value D2, the controller 180 stops displaying 60% of total contents within the category list 500B, and at the reference value D3, the controller 180 stops displaying 100% of total contents within the category list 500B. In particular, if the multi-touched distance between the first point and the second point sequentially decreases in order of D1→D2→D3, the controller 180 reduces and displays the category list 500B where the controller 180 sequentially stops displaying the contents in order of 30%→60%→100% of the entire contents. FIG. 23 shows that the contents gradually stop being displayed within the category list 500B if the multi-touched distance between the first point and the second point gradually decreases.

Meanwhile, referring to FIG. 24, if the multi-touched distance between the first point and the second point gradually increases, the controller 180 can gradually display the contents 511 to 513, 521 to 523 and 531 to 533 within the category list 500B again. The reference distance is compared to the multi-touch maintained distance between the first point and the second point, and the reference distance can be divided into a plurality of distances. For instance, the reference distance can be divided into reference values D1, D2 (D1<D2), and D3 (D2<D3).

For example, at the reference value D1, the controller 180 re-displays 30% of total contents within the category list 500B, at the reference value D2, the controller 180 re-displays 60% of total contents within the category list 500B, and at the reference value D3, the controller 180 re-displays 100% of total contents within the category list 500B.

In particular, if the multi-touched distance between the first point and the second point sequentially increases in order of D1→D2→D3, the controller 180 restores the initial category list 500B before the reduction by sequentially re-displaying the contents in order of 30%→60%→100% of the entire contents. FIG. 24 shows that the contents are gradually re-displayed within the category list 500B if the multi-touched distance between the first point and the second point gradually increases.

Figure 25:
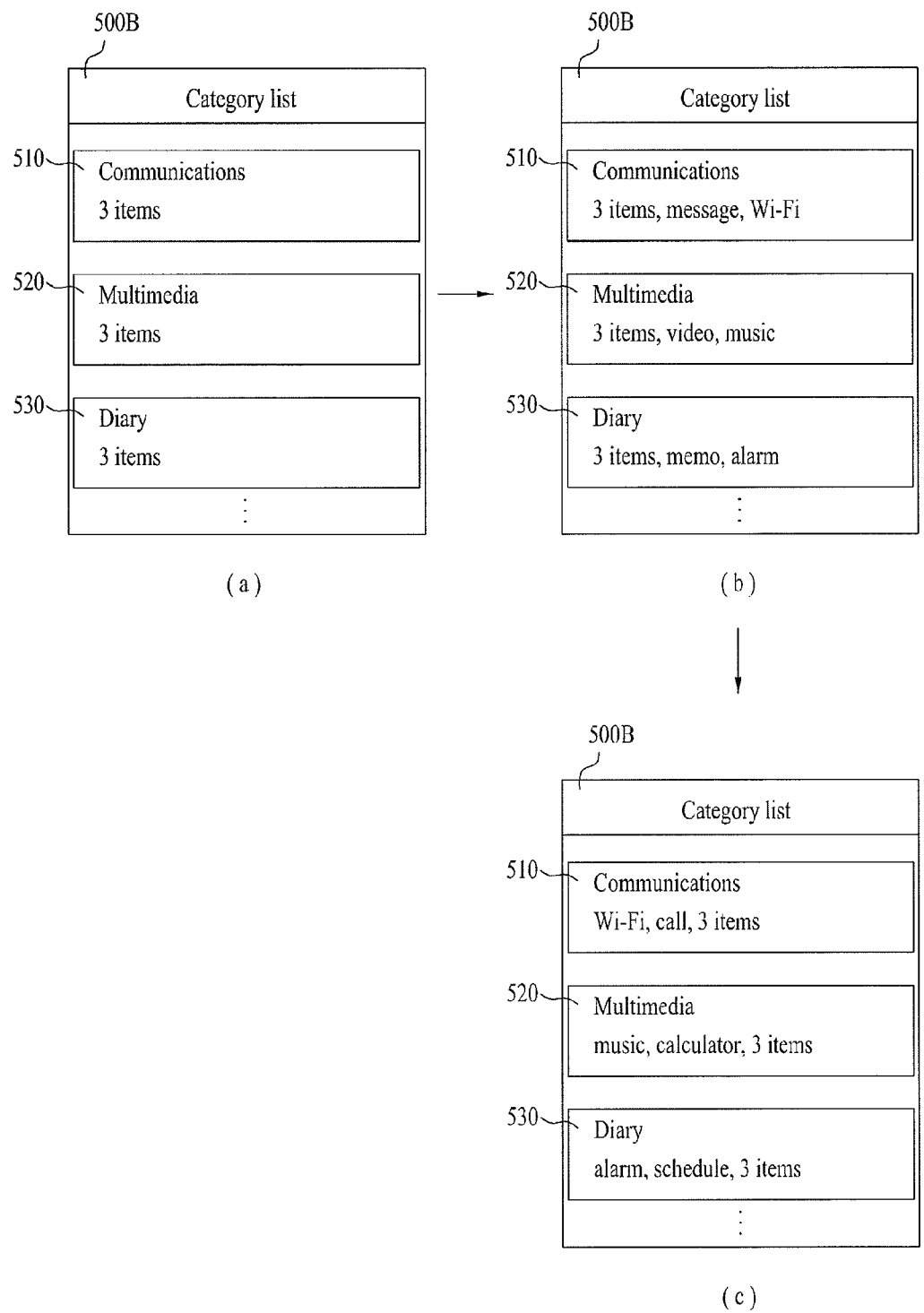

Meanwhile, referring to FIG. 25, the controller 180 is able to scroll and display the summary information of the corresponding contents on the corresponding category names 510, 520 and 530 within the reduced and displayed category list 500B, respectively. In particular, if the category list 500B is reduced and displayed due to the display interruption of the contents as shown in FIG. 25(*a*), the controller 180 scrolls an displays the summary information on the corresponding contents within the category names 510, 520 and 530, respectively as shown in FIGS. 25(*b*) and 25(*c*).

Thus, even if the contents are not displayed within the reduced and displayed category list 500B, the user is able to check the contents respectively grouped into the category names 510, 520 and 530 by looking at the summary information scrolled and displayed within the category names 510, 520 and 530 into which the contents were grouped, respectively. In doing so, the controller 180 is able to automatically scroll and display the summary information of the entire contents within the corresponding category names 510, 520 and 530 when reducing and displaying the category list 500B, respectively.

While the category list 500B is reduced and displayed, if a specific one of the category names is selected, the controller 180 is able to scroll and display the contents grouped into the selected category name only.

Figure 27:
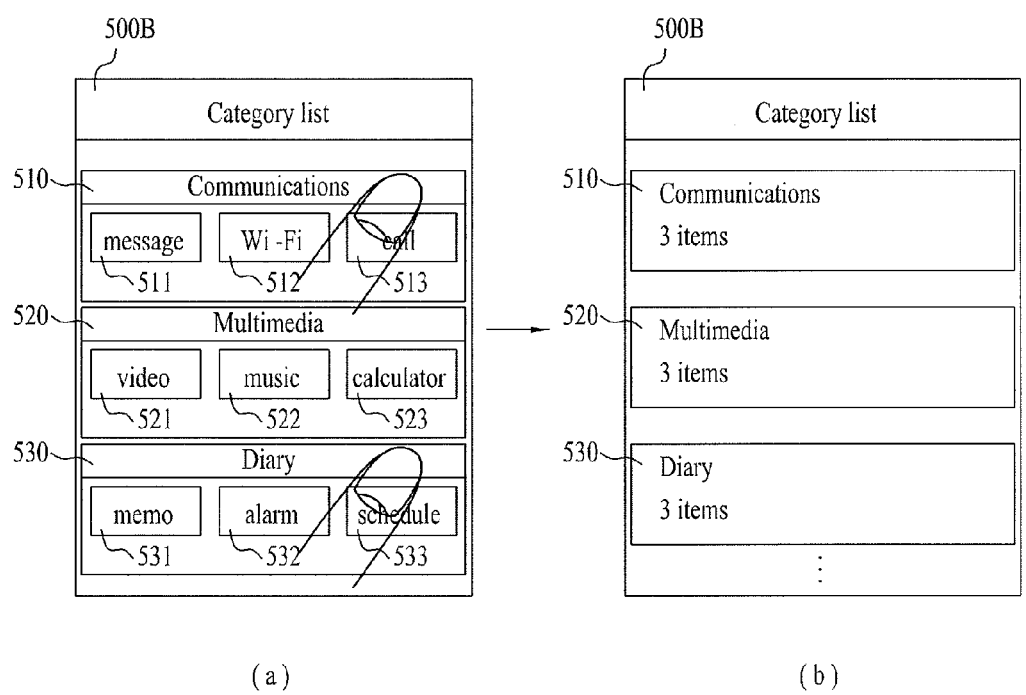

FIG. 26 and FIG. 27 are diagrams of screen configurations of a process for reducing and displaying a category list in accordance with a user's category name touch according to a second embodiment of the present invention.

Referring to FIG. 26, if a specific category name 510 is touched within the category list 500B as the reduced display command in the step 5250 as shown in FIG. 26(*a*), the controller 180 is able to reduce and display the category list 500B as shown in FIG. 26(*b*). On the other hand, referring to FIG. 26(*c*), if the specific category name 510 is touched within the category list 500B, the controller 180 is able to stop displaying only the contents 511 to 513 corresponding to the selected specific category name 510 within the specific category name 510.

Referring to FIG. 27, if at least two category names, for example, category names 510 and 530, are multi-touched within the category list 500B as shown in FIG. 27(*a*), the controller 180 is able to reduce and display the category list 500B and to stop displaying the contents respectively grouped into the category names 510, 520 and 530, which exist between the category name 510 and the category name 530.

Figure 28:
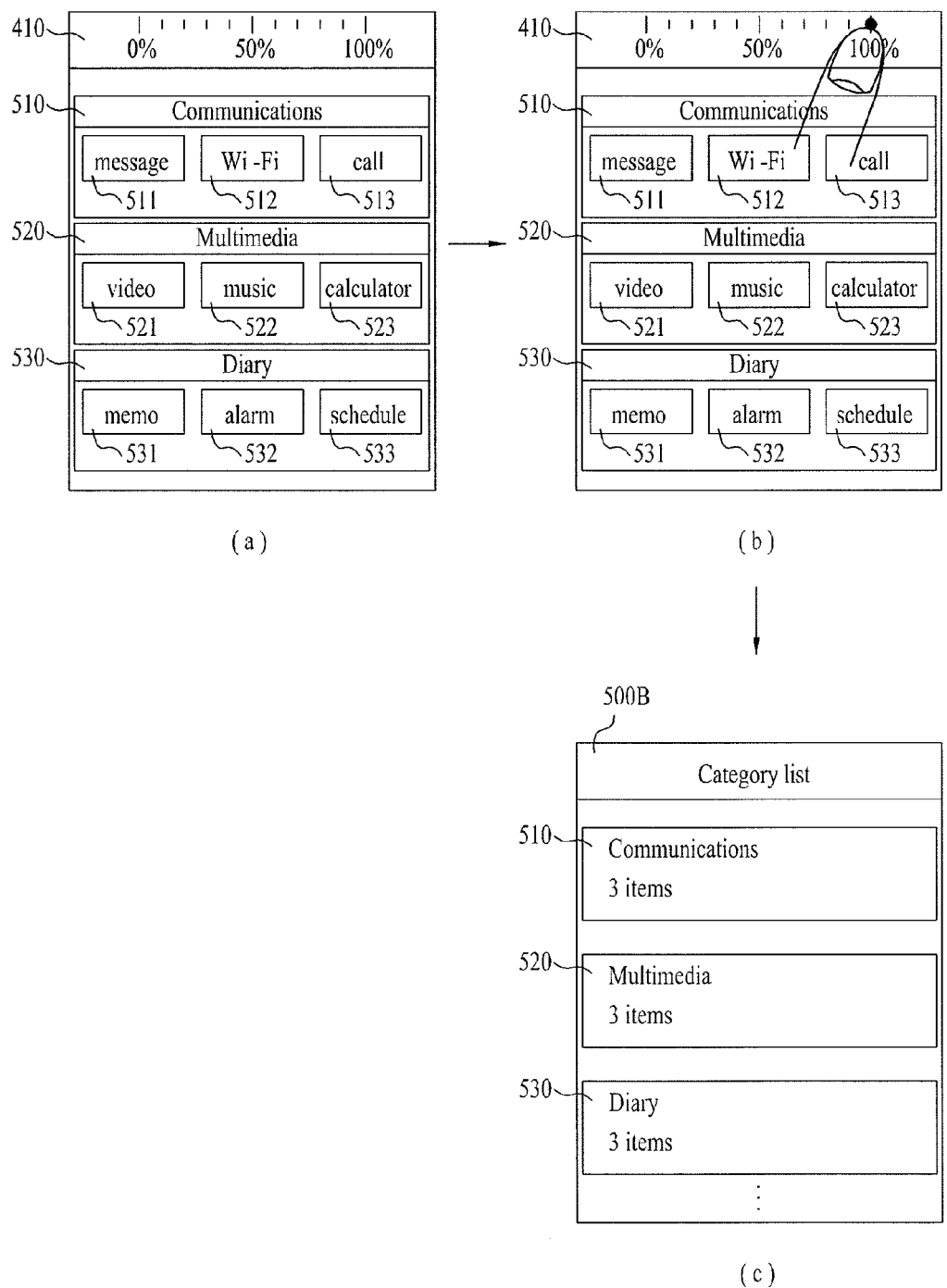

FIG. 28 is a diagram of screen configurations of a process for reducing and displaying a category list using a bar for a reduced display adjustment of the category list according to a second embodiment of the present invention.

Referring to FIG. 28, the controller 180 displays the bar 410 for a reduced display adjustment of the category list 500B on the category list 500B. If the user adjusts the bar 410 as shown in FIG. 28(b), the controller 180 is able to reduce and display the category list 500B and to stop displaying the contents to correspond to the adjustment of the bar 410. For instance, if a 20% position of the bar 410 is touched, the controller 180 is able to reduce and display the category list 500B and to stop displaying 20% of the entire contents within the category list 500B. For another instance, referring to FIG. 28(c), if a 100% position of the bar 410 is touched, the controller 180 is able to reduce and display the category list 500B and to stop displaying the entire contents within the category list 500B.

Figure 29:
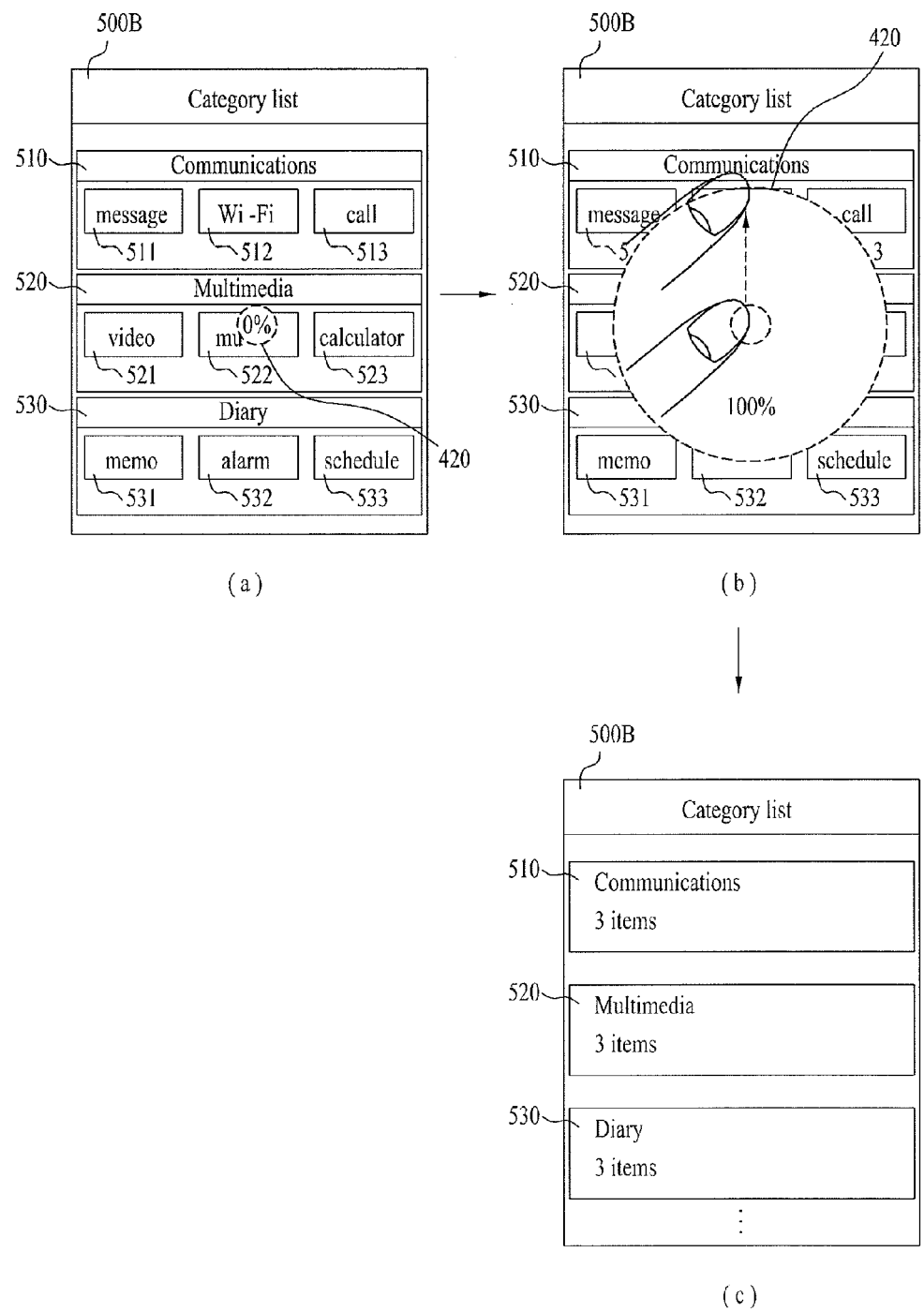

FIG. 29 is a diagram of screen configurations of a process for reducing and displaying a category list using a circle shape for a reduced display adjustment of the category list according to a second embodiment of the present invention.

Referring to FIG. 29(a), the controller 180 displays the circle shape 420 for the reduced display adjustment of the contents on the category list 500B. In this case, a size of the circle shape 420 can be changed in accordance with a user's touch. In particular, referring to FIG. 29(b), if the size of the circle shape 420 is changed by the user, the controller 180 reduces and displays category list 500B and stops displaying the contents within the category list 500B to correspond to the changed size. For instance, if the size of the circle shape 420 is increased by 50% from an initial size, the controller 180 is able to reduce and display the category list 500B and to stop displaying 50% of the entire contents in the category list 500B. On the other hand, if the size of the circle shape 420 is increased by 100% from the initial size, the controller 180 is able to reduce and display the category list 500B and to stop displaying 100% of the entire contents in the category list 500B.

Figure 30:
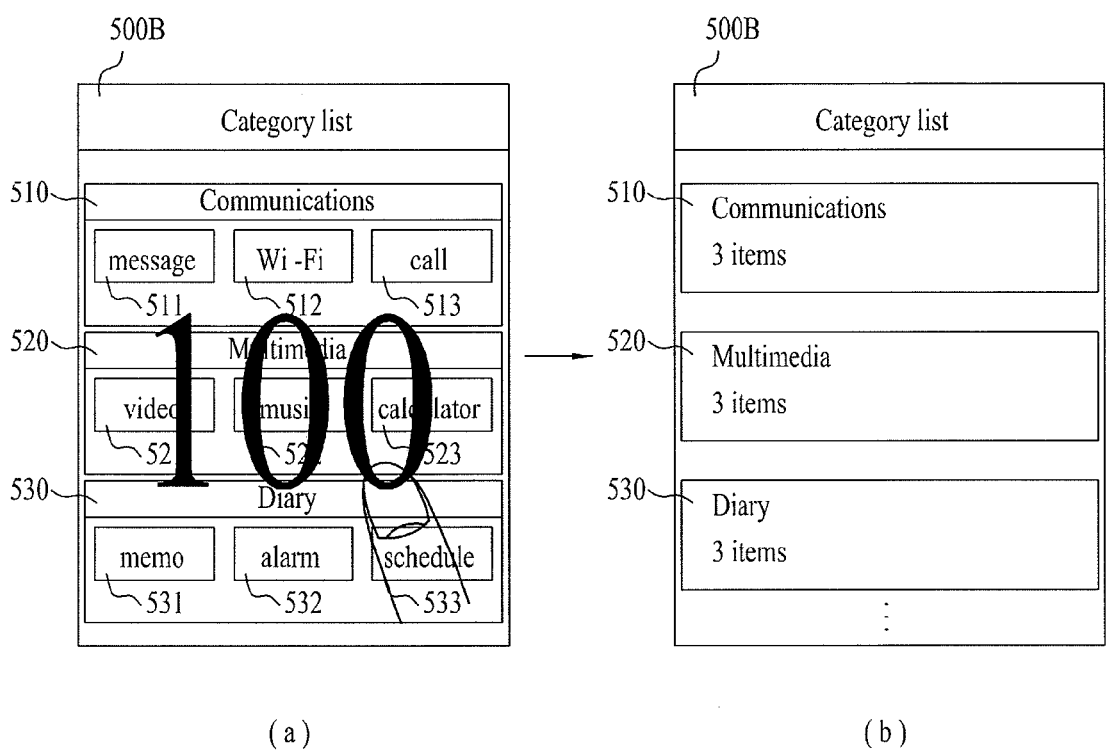

FIG. 30 is a diagram of screen configurations of a process for reducing and displaying a category list 500B using a touch gesture for a reduced display adjustment of the category list 500B according to a second embodiment of the present invention.

Referring to FIG. 30, if a touch gesture previously set for a reduced display of the category list 500B is inputted to the category list 500B [FIG. 30(a)], the controller 180 is able to reduce and display the category list 500B and to stop displaying the contents in the category list 500B to correspond to the inputted touch gesture. In doing so, the touch gesture can include a gesture having a pattern of a numeral figure.

For instance, referring to FIG. 30(a), if the touch gesture corresponding to a numeral '100' is inputted to the category list 500B, the controller 180 is able to reduce and display the category list 500B and to stop displaying the entire contents within the category list 500B. On the other hand, if the touch gesture corresponding to a numeral '50' is inputted to the category list 500B, the controller 180 is able to reduce and display the category list 500B and to stop displaying 50% of the entire content groups within the category list 500B.

Moreover, if a motion gesture of a preset pattern for the reduced display of the category list 500B is inputted via the motion sensor 142, the controller 180 is able to reduce and display the category list 500B and to stop displaying the contents within the category list 500B to correspond to the inputted motion gesture. For instance, if the motion gesture corresponding to a figure of a numeral '100' for the body of the mobile terminal 100 is inputted via the motion sensor 142, the controller 180 is able to reduce and display the category list 500B and to stop displaying the entire contents within the category list 500B. For another instance, if the motion gesture corresponding to a figure of a numeral '50' for the body of the mobile terminal 100 is inputted via the motion sensor 142, the controller 180 is able to reduce and display the category list 500B and to stop displaying 50% of the entire contents within the category list 500B.

Figure 31:
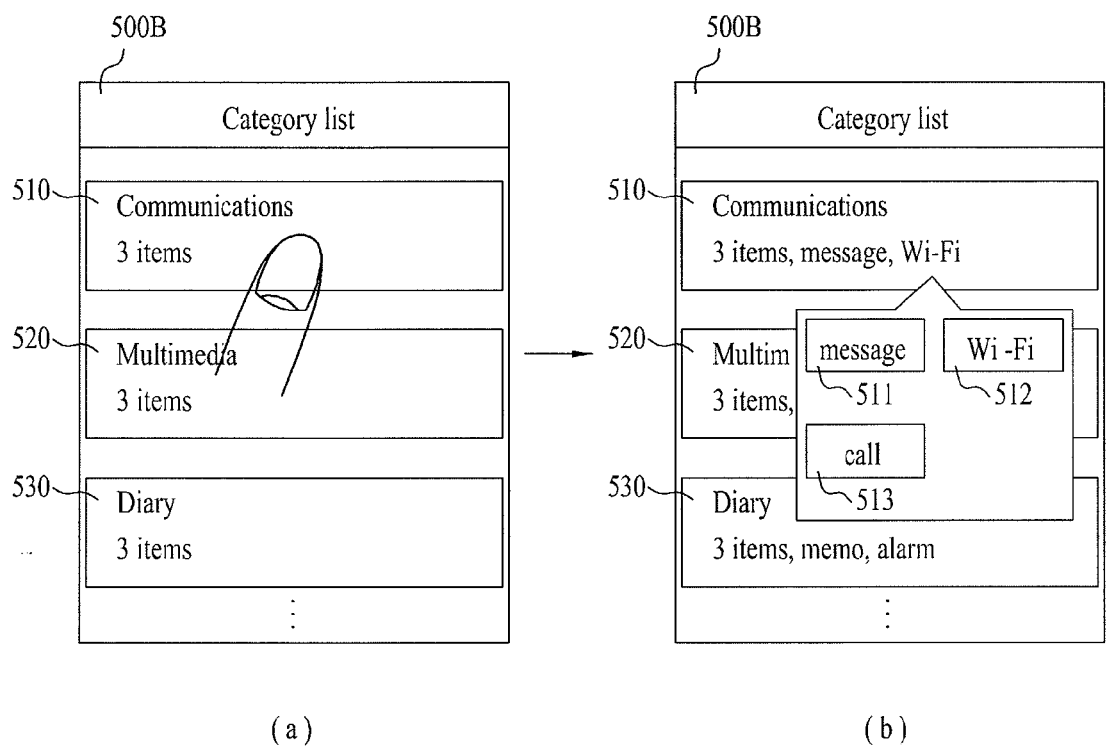

Referring to FIG. 31, if the category list 500B is reduced and displayed, when a specific category name 510 is selected as shown in FIG. 31(a), the controller 180 is able to re-display the contents 511 to 513 associated with the selected category name 510 as shown in FIG. 31(b).

Figure 32:
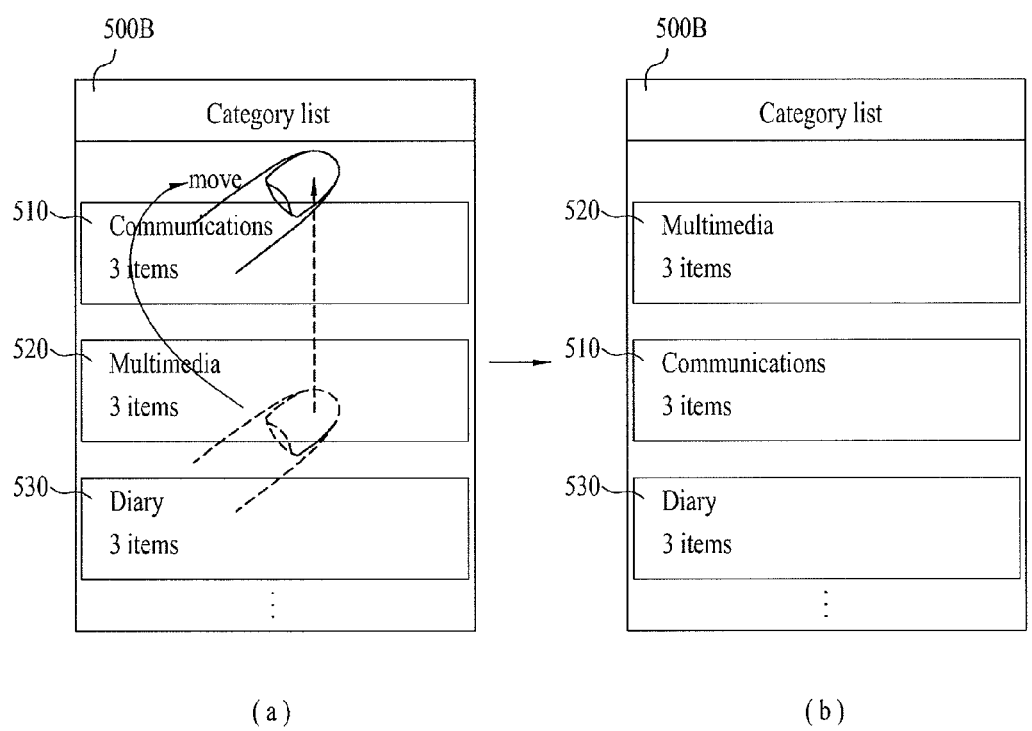

Referring to FIG. 32, if the category list 500B is reduced and displayed, when the specific category name 510 is dragged and dropped to a specific position within the category list 500B as shown in FIG. 32(a), the controller 180 is able to change the position of the category name 510 into the dragged and dropped position as shown in FIG. 32(b). In particular, while the category list 500B is reduced and displayed, a position of each of the category names 510, 520 and 530 can be changed in accordance with a user's drag and drop touch.

FIGS. 33 to 37 show a process for editing a category name and contents grouped into the category name while the category list 500B is reduced and displayed.

Figure 33:
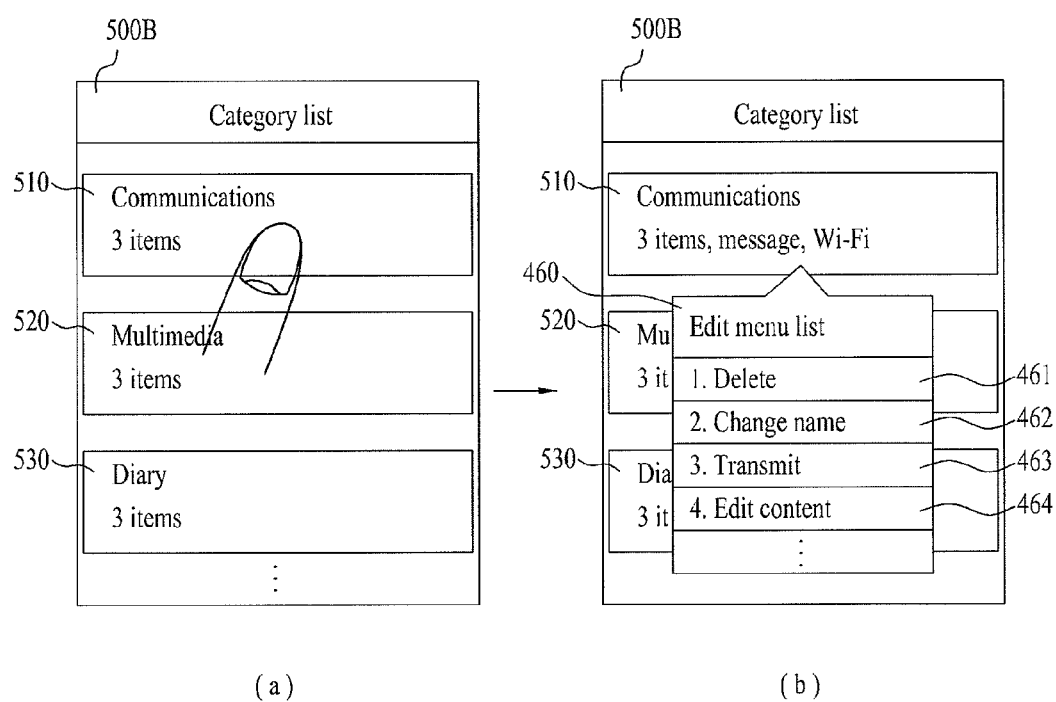

Referring to FIG. 33, while the category list 500B is reduced and displayed, if a specific category name 510 is selected as shown in FIG. 33(a), the controller 180 displays an edit menu list 460 for editing the selected category name 510 and the contents associated with the category name 510 by at least one scheme as shown in FIG. 33(b). In this case, referring to FIG. 33(b), the edit menu list 460 can include a delete menu 461 for deleting the selected category name 510 and the contents 511 to 513 associated with the category name 510, a menu for changing a name of the selected category name 510, a transmit menu 463 for transmitting the contents associated with the selected category name 510, and a content edit menu 464 for editing the contents associated with the selected category name 510 by at least one scheme.

Figure 34:
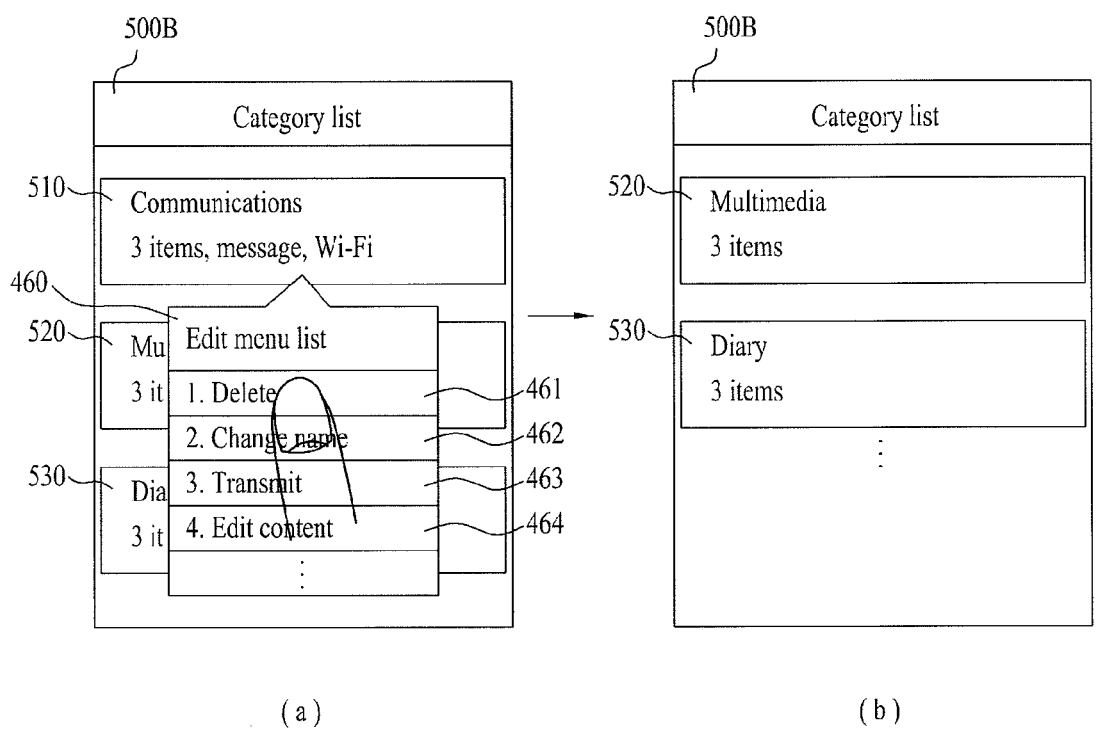

Referring to FIG. 34, if a delete menu 461 is selected from the edit menu list 460, the controller 180 is able to delete the selected category name 510 and the contents associated with the selected category name 510 from the category list 500B.

Figure 35:
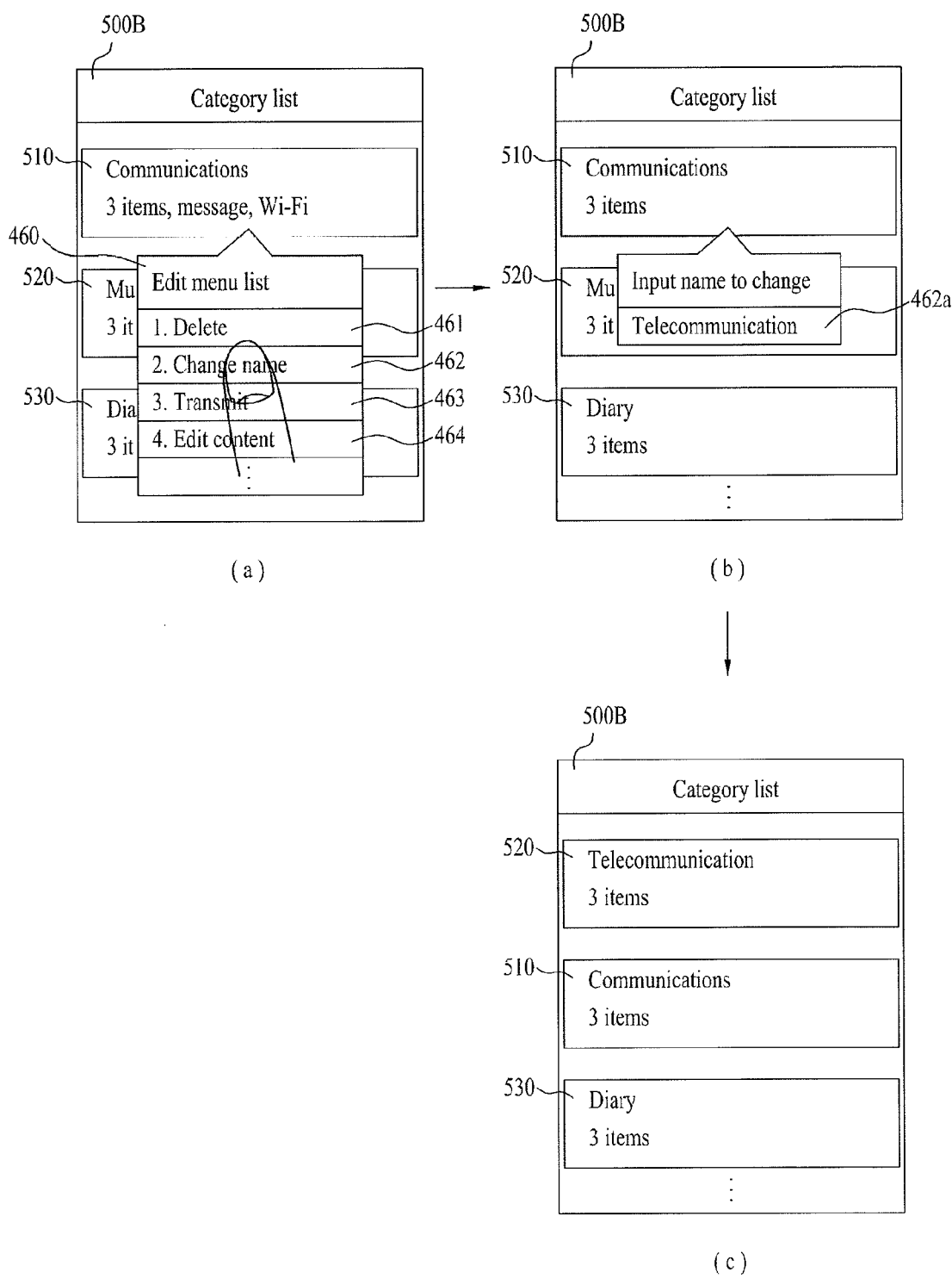

Referring to FIG. 35, if a name change menu 462 is selected from the edit menu list 460, the controller 180 displays a name input window for changing the selected category name 510 within the category list 500B. Subsequently, if a new name 462a is inputted via the name input window, referring to FIG. 35(c), the controller 180 changes the selected category name 510 into the inputted new name 462a.

Figure 36:
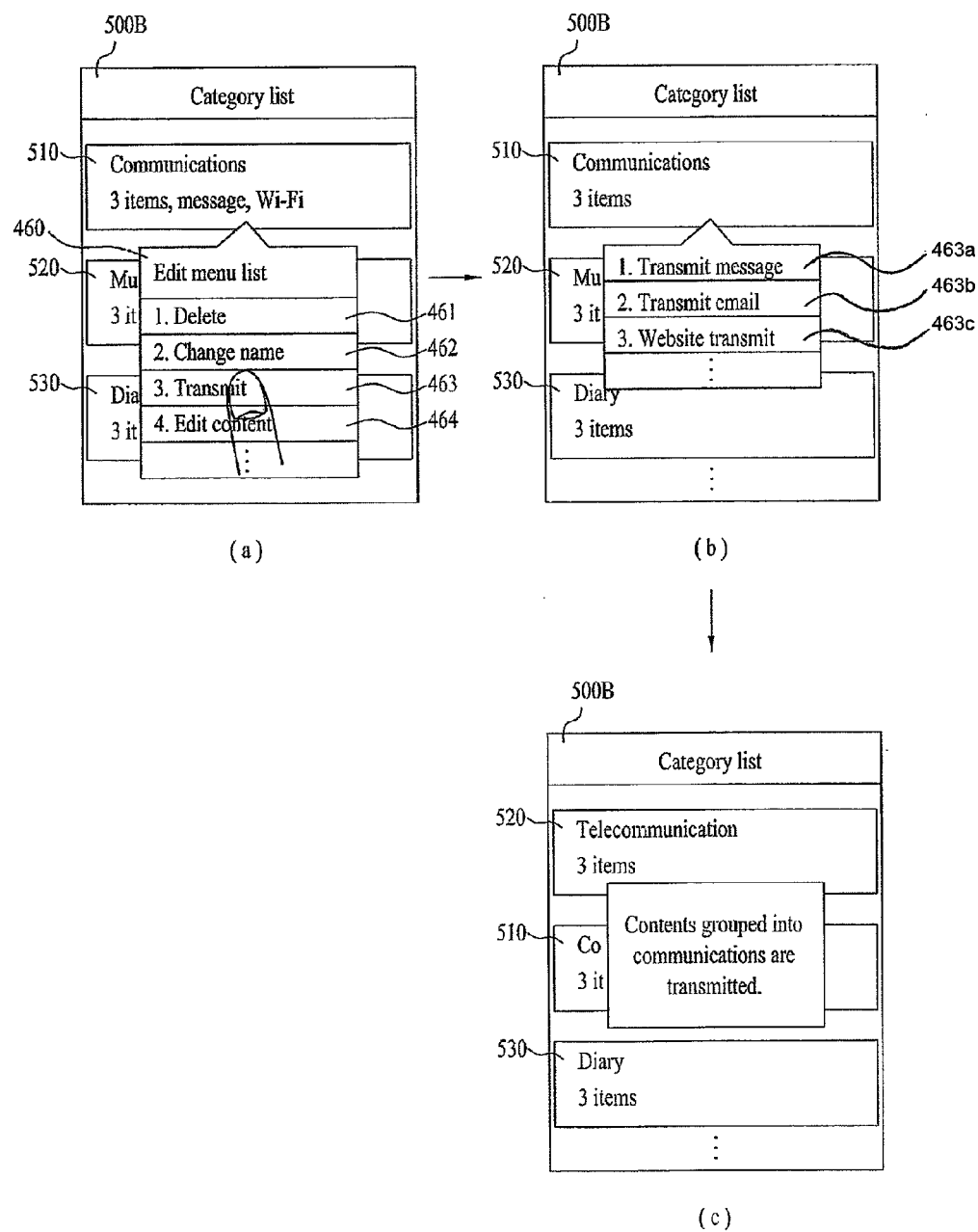

Referring to FIG. 36, if a transmit menu 463 is selected from the edit menu list 460, the controller 180 displays a transmit menu list for transmitting the contents 511 to 513 associated with the selected category name 510 within the category list 500B. In this case, for example, the transmit menu list can include a message transmit menu 463a, an email transmit menu 463b, and a website transmit menu 463c. In particular, referring to FIG. 36(c), if one of the transmit menus is selected from the transmit menu list, the controller 180 transmits the contents 511 to 513 associated with the selected category name 510 by the transmission scheme of the selected transmit menu via the wireless communication unit 110.

For instance, if the message transmit menu 463a is selected, the controller 180 displays a message write window and then attaches the contents 511 to 513 associated with the selected category name 510 to the message write window. Afterwards, if the user selects a recipient of the message, the controller 180 transmits the message including the contents 511 to 513 to the selected recipient via the wireless communication unit 110. If the email transmit menu 463*b* is selected, the controller 180 displays an email write window and then attaches the contents 511 to 513 associated with the selected category name 510 to the email write window. Afterwards, if the user selects a recipient of the email, the controller 180 transmits the email including the contents 511 to 513 to the selected recipient via the wireless communication unit 110. If the website transmit menu 463*c* is selected, the controller 180 displays a website access window and then attaches the contents 511 to 513 associated with the selected category name 510 to the website access window. Afterwards, if the user inputs an address of a website that she wishes to access, the controller 180 accesses the website via the wireless communication unit 110 and then uploads the contents 511 to 513 to the accessed website. In this case, the website can include one of a personal homepage, a blog, a twitter, and the like.

Figure 37:
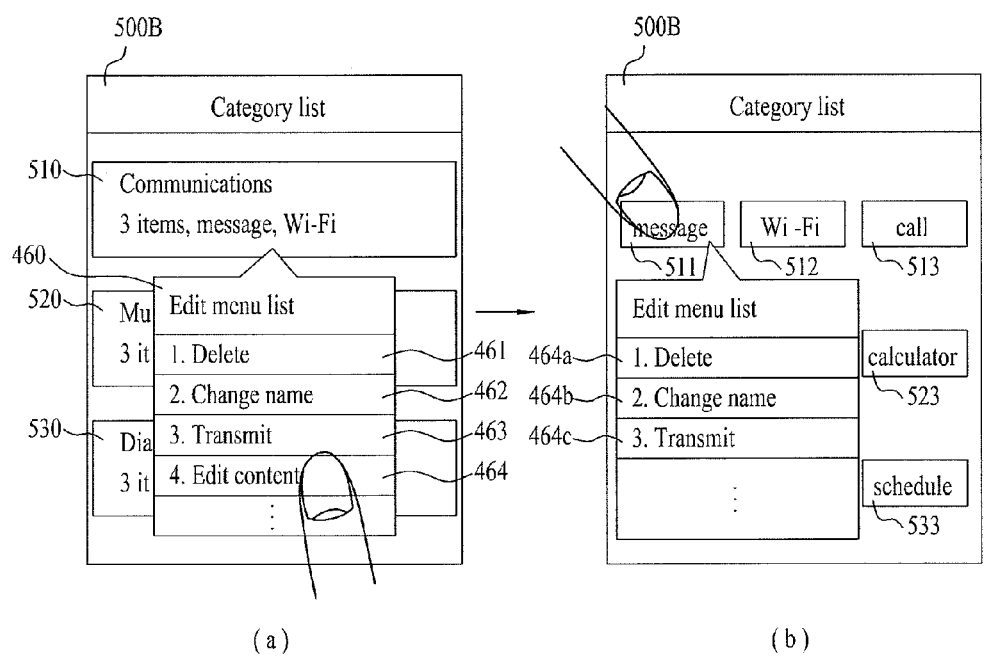

Referring to FIG. 37, if the content edit menu 464 is selected from the edit menu list 460, the controller 180 displays a content edit menu list 460 for editing the contents 511 to 513 associated with the selected category name 510 by at least one scheme. In this case, the content edit menu list 460 can include a delete menu 464*a* for deleting the contents 511 to 513, a menu 464*b* for changing names of the contents 511 to 513, and a transmit menu 464*c* for transmitting the contents 511 to 513.

Figure 38:
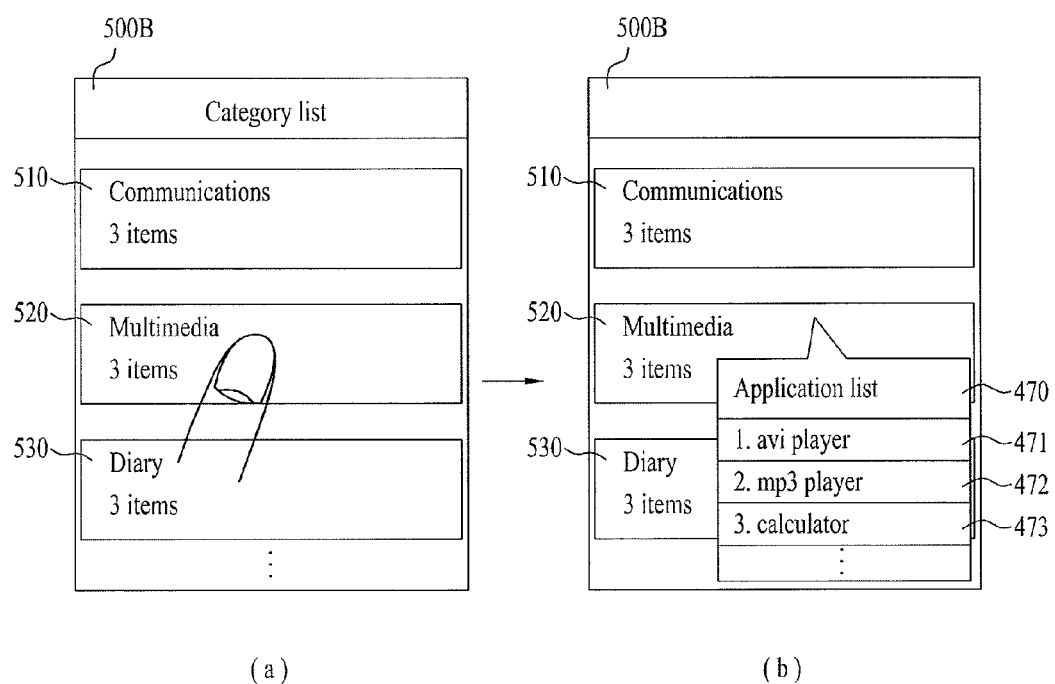

Referring to FIG. 38, if a specific category name 520 is selected from the reduced and displayed category list 500B, the controller 180 searches for application(s) associated with the contents associated with the selected category list 500B. Also, the controller 180 is then able to display a list of the found applications. In particular, if the category list 500B is displayed, when a specific category name 520 is selected as shown in FIG. 38(*a*), the controller 180 obtains the contents 521 to 523 associated with the selected category name 520 from the memory 160, searches and obtains applications 471 to 473 for executing functions of the contents 521 to 523, and then displays a list 470 of the obtained applications 471 to 473 as shown in FIG. 38(*b*). In this case, if a specific application is selected from the application list 470, the controller 180 executes the content corresponding to the selected application among the contents 521 to 523. For instance, if 'avi player' 471 is selected, the controller 180 executes a 'video' content 521 of the category name 'Multimedia' 520 using the 'avi player' 471.

So far, the second embodiment of the present invention is explained in detail with reference to FIGS. 21 to 38. In the following description, a process for reducing and displaying entire pages displayed on a screen in a manner of reducing and displaying pages each of which includes a plurality of contents according to a third embodiment of the present invention is explained in detail with reference to FIGS. 39 to 45.

[Third Embodiment]

Figure 39:
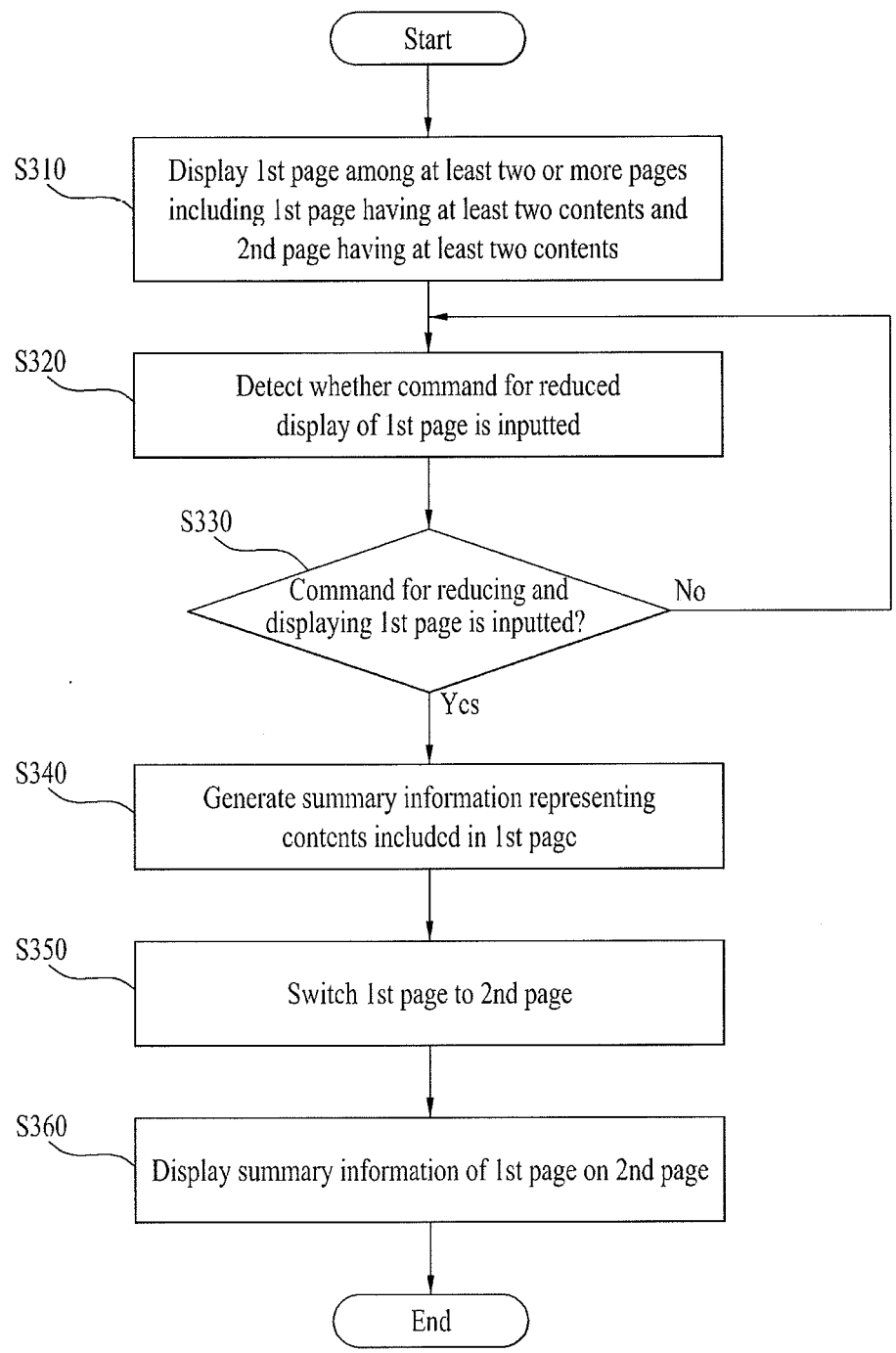
FIG. 39 is a flowchart of a process for reducing and displaying pages, each of which including a plurality of contents, on a screen according to a third embodiment of the present invention.

FIG. 39 is a flowchart of a process for reducing and displaying pages, each of which including a plurality of contents, on a screen according to a third embodiment of the present invention, FIGS. 40 to 45 are diagrams of screen configurations of a process for reducing and displaying pages, each of which including a plurality of contents, on a screen according to a third embodiment of the present invention.

Referring to FIGS. 39 to 45, when a first page 600A includes at least two or more contents and a second page 500B includes at least two or more contents, the controller 180 initially displays the first page 600A on the touchscreen 151 (S310).

Referring to FIG. 40, if it is currently impossible to display all of the contents on a screen of the touchscreen 151, the mobile terminal 100 divides the contents into at least two pages. According to a third embodiment of the present invention, for clarity of the following description of the present invention, the contents are divided into two pages 600A and 600B and displayed as such. Yet, the number of the pages is not limited to 2. Referring to FIG. 40(*a*), if a flicking touch is inputted to the first page 600A, the controller 180 is able to switch the first page 600A to the second page 600B and to display the second page 600B.

Referring to FIG. 39, the controller 180 monitors whether a reduced display command for the first page 600A is inputted to the first page 600A (S320). If the reduced display command for the first page 600A is inputted (S330), the controller 180 generates summary information 610 representing the first page 600A using the contents 611 to 614 included in the first page 600A (S340). Thereafter, the controller 180 displays the second page 600B switched from the first page 600A (S350). Subsequently, the controller 180 enables the summary information 610 of the first page 600A to be displayed on the second page 600B. Meanwhile, if a reduced display command for all pages is inputted in the step S330, the controller 180 generates a first summary information 610 representing the first page 600A using the contents 611 to 614 using the first page 600A and a second summary information 620 representing the second page 600B using the contents 621 to 624 of the second page 600B. Then, the controller 180 is able to display the generated first and second summary information 610 and 620 (S360).

In the following description, a process for reducing and displaying pages on a screen in accordance with various reduced display commands is explained with reference to FIG. 41 and FIG. 42.

Figure 41:
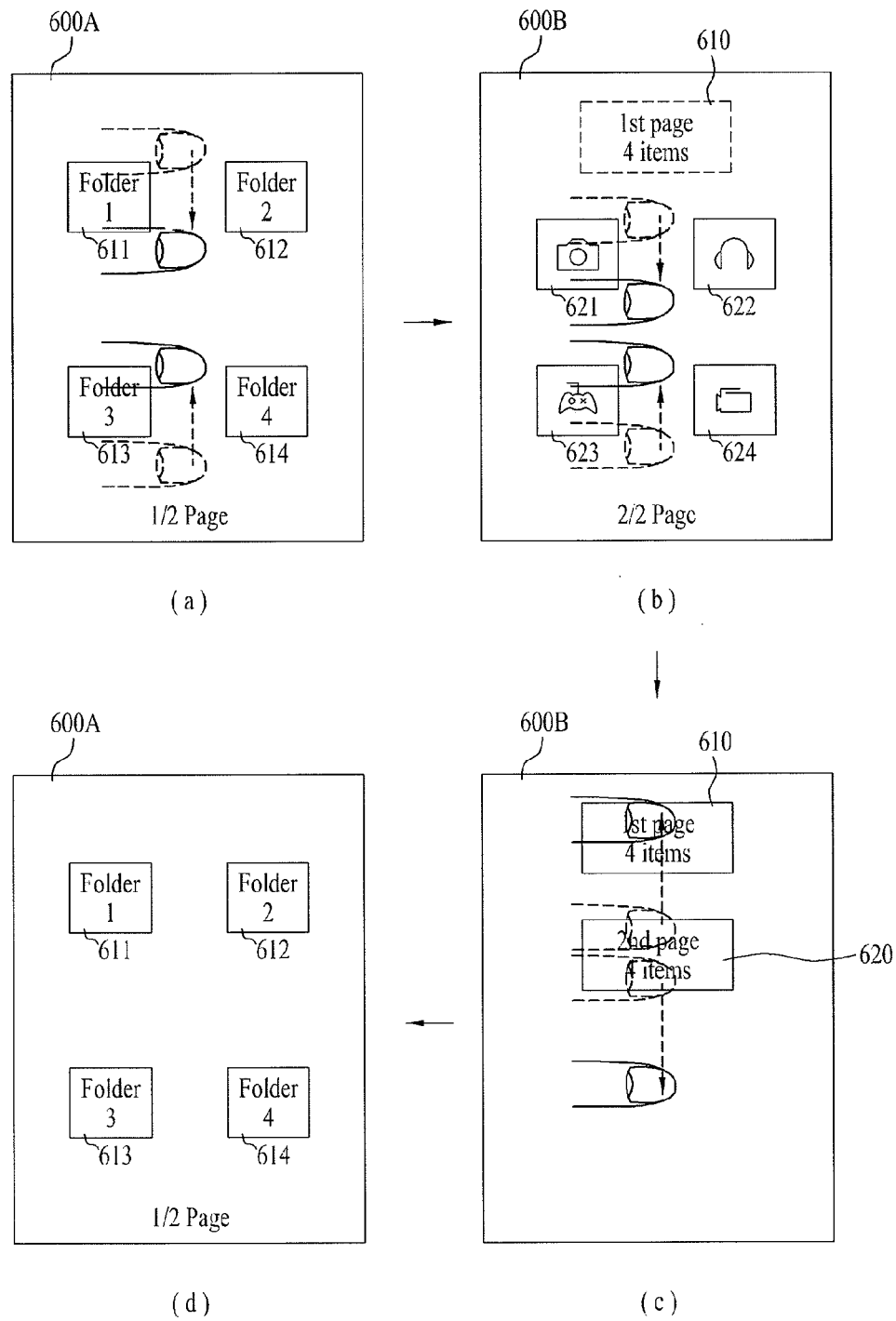

FIG. 41 is a diagram of screen configurations of a process for reducing and displaying a page on a screen in accordance with a user's pinching-in multi-touch according to a third embodiment of the present invention. Referring to FIG. 41, if the user's pinching-in multi-touch is inputted to the first page 600A as the reduced display command in the step S330 as shown in FIG. 41(*a*), the controller 180 generates a summary information 610 representing the first page 600A including contents 611 to 614. The controller 180 switches the first page 600A to the second page 600B and then displays the generated summary information 610 on the second page 600B. In this case, the summary information 610 includes a name of the first page 600A, names of the contents 611 to 614 included in the first page 600A, and the total number of the contents 611 to 614 included in the first page 600A. Meanwhile, the controller 180 is able to display the summary information 610 transparently to enable a substance of the second page 600B to be identified. Here, similar to the second embodiment of the present invention shown in FIG. 25, the controller 180 is able to sequentially scroll and display information indicating the names of the contents 611 to 614 and information indicating the total number of the contents 611 to 614 within the summary information 610.

Referring to FIG. 42, the controller 180 is able to display the summary information 610 of the first page 600A as a thumbnail within the second page 600B. Alternatively, the controller 180 can partition the screen of the touchscreen 151 into a first region 151a and a second region 151b and then enables the generated summary information 610 to be displayed on the second region 151b while displaying contents 621-624 on the first region 151a.

Referring to FIG. 43, if the summary information 610 of the first page 600A is displayed on the second page 600B, when the summary information 610 is selected, the controller 180 switches the second page 100B to the first page 600A, displays the first page 600A, generates a summary information 620 on the second page 600, and displays the generated summary information 620 on the first page 600A as shown in FIG. 43(b).

Referring to FIG. 44, if the summary information 610 on the first page 600A is displayed on the second page 600B, when the summary information 610 is selected, the controller 180 is able to display the contents 611 to 614 corresponding to the summary information 610 as shown in FIG. 44(b).

Referring to FIG. 41, if the user's pinching-in multi-touch is inputted to the second page 600A again, the controller 180 generates the summary information 620 on the second page 600B and then displays the generated summary information 620. Subsequently, if the controller 180 detects a user's pinching-out multi-touch to the screen having the first and second summary information 610 and 620 displayed thereon, the controller cancels the reduced display of the first and second pages 600A and 600B and then displays the initial first page 600A as shown in FIG. 41(d).

Meanwhile, as mentioned in the foregoing description of the second embodiment of the present invention, the reduced display command in the step 5330 can include one of the bar 410, the circle shape 420, the touch gesture and the motion gesture.

Moreover, referring to FIG. 45, if a flicking touch in a preset direction is inputted to the first page 600A, the controller 180 switches the first page 600A to the second page 600B, generates the summary information 610 of the first page 600, and then enables the generated summary information 610 to be displayed on the second page 600B as shown in FIG. 45(c). If an information '1' indicating the first page 600A is selected from the first page 600A as shown FIG. 45(b), the controller 180 switches the first page 600A to the second page 600B, generates the summary information 610 of the first page 600, and then enables the generated summary information 610 to be displayed on the second page 600B as shown in FIG. 45(c).

Further, the summary information 610 may be shifted in accordance with the user's drag and drop touch, as mentioned in the second embodiment of the present invention with reference to FIG. 32. Moreover, the summary information 610 can be edited by at least one scheme with reference to FIGS. 33 to 37. Also, the user can be provided with a list of applications associated with the contents 611 to 614 included in the summary information 610, with reference to FIG. 38.

So far, the third embodiment of the present invention is described in detail with reference to FIGS. 39 to 45. In the following description, by grouping contents per associated function within a list including a plurality of contents and by displaying a summary information representing each of the content groups within the list only, a process for reducing and displaying the list according to a fourth embodiment of the present invention is explained in detail.

[Fourth Embodiment]

Figure 46:
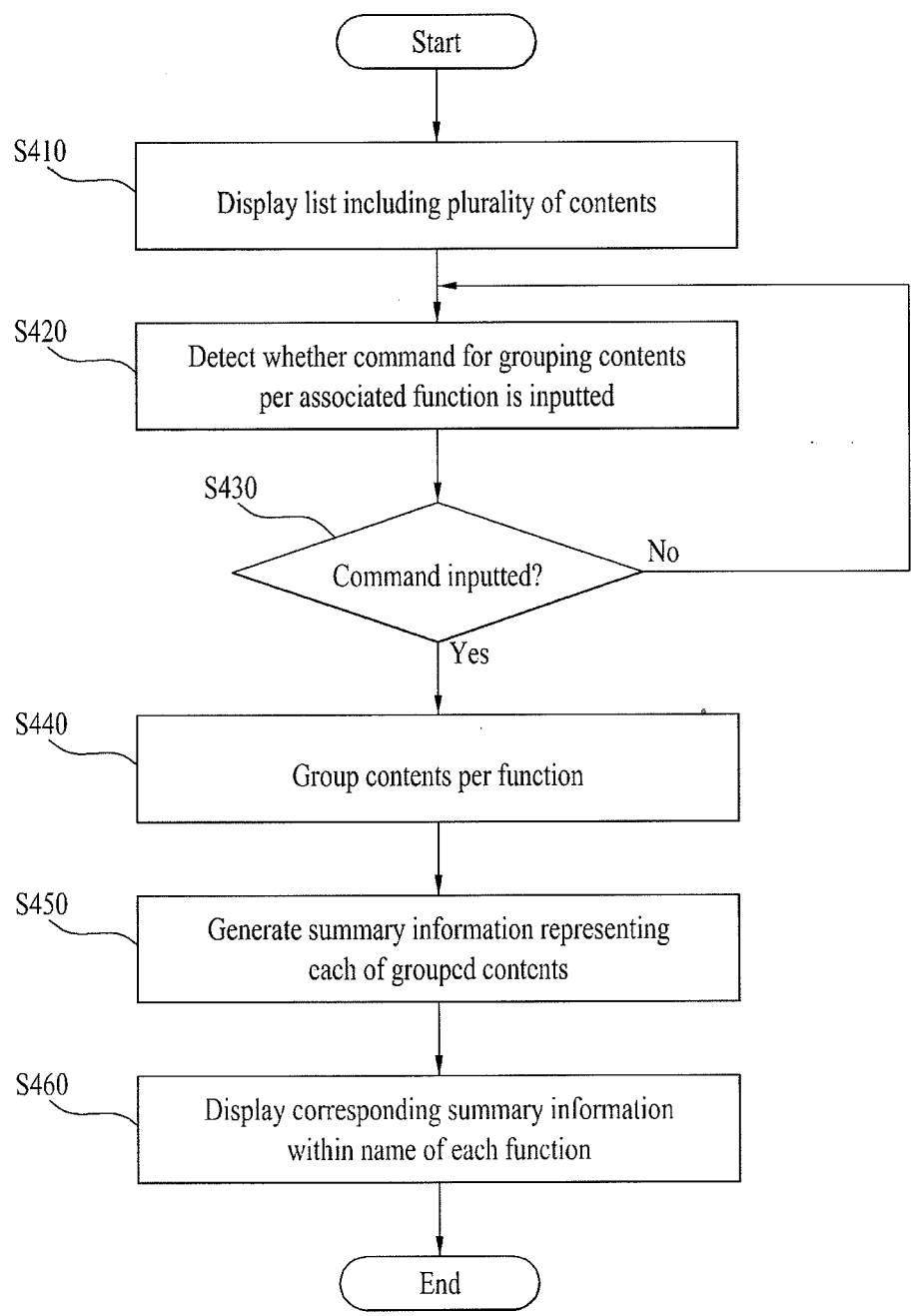
FIG. 46 is a flowchart of a process for reducing and displaying a list including a plurality of contents according to a fourth embodiment of the present invention.
Figure 47:
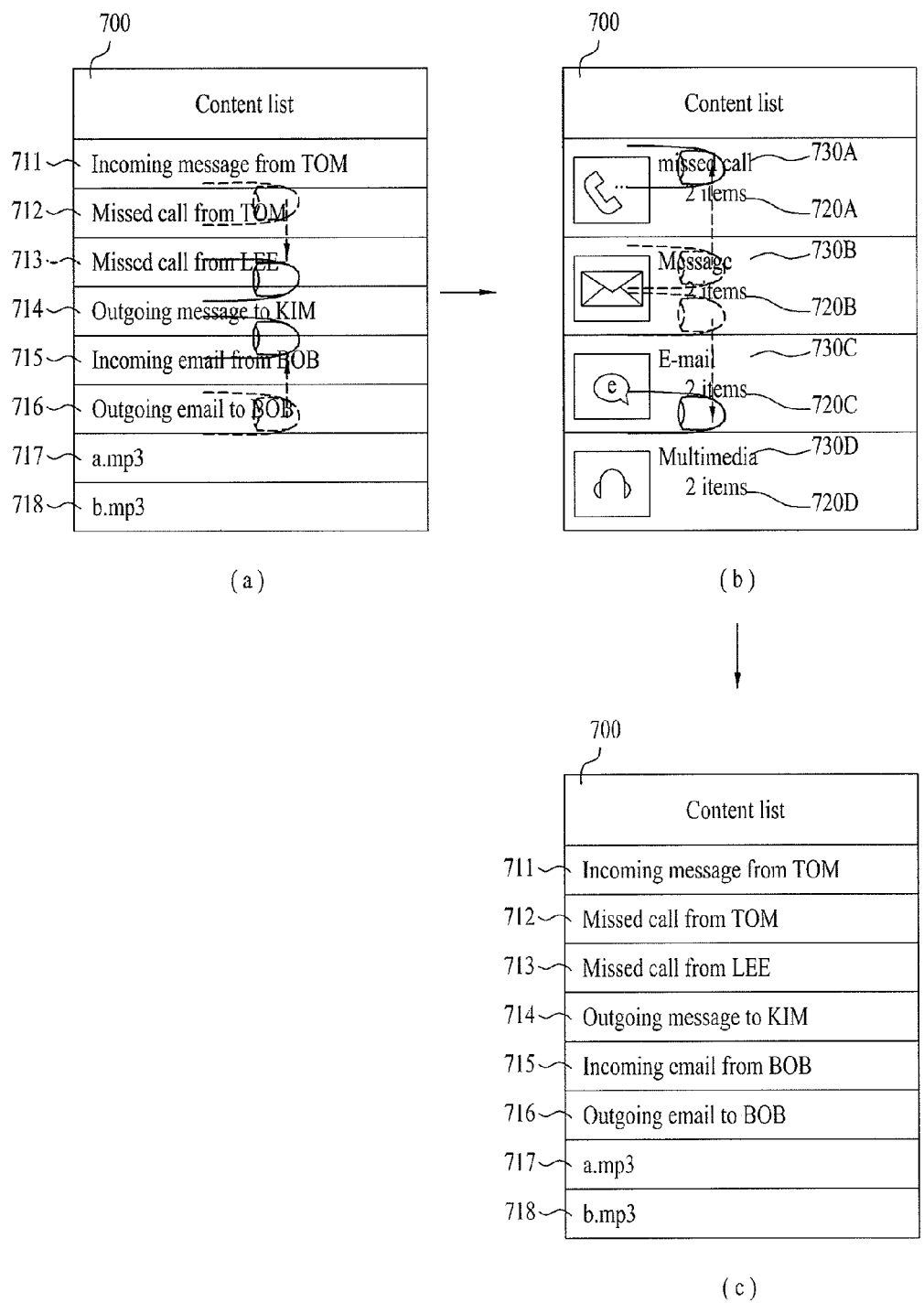
FIG. 47 is a diagram of a screen configuration of a process for reducing and displaying a list including a plurality of contents according to a fourth embodiment of the present invention.

FIG. 46 is a flowchart of a process for reducing and displaying a list including a plurality of contents according to a fourth embodiment of the present invention. FIG. 47 is a diagram of a screen configuration of a process for reducing and displaying a list including a plurality of contents according to a fourth embodiment of the present invention.

Referring to FIG. 46 and FIG. 47, the controller 180 displays a list 700 including a plurality of contents 711 to 718 on the touchscreen (S410). In this case, the contents 711 to 718 have the same kind of function or can have different kinds of functions. The controller 180 monitors whether a command for grouping the contents 711 to 718 per associated function is inputted (S420). If the grouping command is inputted (S430), the controller 180 obtains functions of the contents 711 to 718 within the list 700 and then groups the contents 711 to 718 based on their functions into content groups (S440). Subsequently, the controller 180 generates summary information 720A to 720D representing the contents 711 to 718 corresponding to the different functions, respectively (S450). The controller 180 then displays the generated summary information 720A to 720D within names 730A to 730D of the corresponding functions, respectively (S460).

In particular, referring to FIG. 47, if the user's pinching-in multi-touch is inputted to the first page 600A as the reduced display command in the step S430, the controller 180 groups the contents 711 to 718 with associating function into content groups, generates summary information 720A to 720D respectively representing the grouped contents 711 to 718, and then displays the generated summary information 720A to 720D within the names 730A to 730D of the corresponding functions, respectively.

In particular, the controller 180 groups the outgoing/incoming message associated contents 711 and 714 into one group in FIG. 47(a) and FIG. 47(b), generates the summary information 720B on the grouped message associated contents 711 and 714, and then enables the summary information 720B on the message associated contents 711 and 714 to be displayed within the name 730B of the message associated function.

The controller 180 groups the missed call associated contents 712 and 713 into one group in FIG. 47(a) and FIG. 47(b), generates the summary information 720A on the missed call associated contents 712 and 713, and then enables the summary information 720A on the missed call associated contents 712 and 713 to be displayed within the name 730A of the missed call associated function.

The controller 180 groups the outgoing/incoming email associated contents 715 and 716 into one group in FIG. 47(a) and FIG. 47(b), generates the summary information 720C on the outgoing/incoming email associated contents 715 and 716, and then enables the summary information 720C on the outgoing/incoming email associated contents 715 and 716 to be displayed within the name 730C of the outgoing/incoming email associated function.

The controller 180 groups the multimedia associated contents 717 and 718 into one group in FIG. 47(a) and FIG. 47(b), generates the summary information 720D on the multimedia associated contents 717 and 718, and then enables the summary information 720D on the multimedia associated contents 717 and 718 to be displayed within the name 730D of the multimedia associated function.

In this case, each of the summary information 720A to 720D includes the total number and names of the contents grouped into the corresponding function.

In the same manner of the second embodiment of the present invention shown in FIG. 25, the controller 180 is able to sequentially scroll and display information indicating the names of the contents and information indicating the total number of the contents within each of the summary information 720A to 720D.

Meanwhile, as mentioned in the foregoing description of the second embodiment of the present invention, the grouping command shown in FIG. 47(a) can include the command corresponding to one of the bar 410, the circle shape 420, the touch gesture and the motion gesture.

And, a position of each of the names 730A to 730D of the functions, in which the summary information 720A to 720D are included, respectively, is shiftable in accordance with a user's drag & drop touch, as mentioned in the foregoing description of the second embodiment of the present invention with reference to FIG. 32.

Moreover, each of the summary information 720A to 720D can be edited by at least one scheme, as mentioned in the foregoing description of the second embodiment of the present invention with reference to FIGS. 33 to 37.

Besides, a user can be provided with a list of applications associated with the contents included in each of the summary information 720A to 720D, as mentioned in the foregoing description of the second embodiment of the present invention with reference to FIG. 38.

Meanwhile, if the controller 180 detects a user's pinching-out multi-touch to the list 700 [FIG. 47(b)], the controller 180 stops displaying the summary information 720A to 720D and then displays the initial list 700 [FIG. 47(a)].

Accordingly, the present invention provides the following effects and/or advantages.

First of all, in a list having a plurality of contents grouped per index name, the present invention reduces and displays the grouped contents, thereby enabling a user to check the whole list quickly. And, the present invention reduces and displays the contents grouped into the index name, which is not desired to search for by a user, within the list, thereby enabling the user to quickly search the list for the contents grouped into a user-desired index name.

Secondly, in a list having a plurality of contents grouped per category name, the present invention displays the category names except the contents only in accordance with a user's manipulation, thereby reducing and displaying the whole list. Therefore, the user is able to quickly check the whole list. And, the present invention reduces and displays the contents grouped into the category name, which is not desired to search for by a user, within the list, thereby enabling the user to quickly search the list for the contents grouped into a user-desired category name.

Thirdly, the present invention groups contents per associated function within a list including a plurality of contents and displays summary information respectively representing the grouped contents within the list only, thereby enabling a user to quickly search the list for the contents grouped into a user-desired function. And, the present invention reduces and displays the contents grouped into the function, which is not desired to search for by a user, within the list, thereby enabling the user to quickly search the list for the contents grouped into a user-desired function name.

Fourthly, the present invention reduces and displays pages, in each of which a plurality of contents are included, thereby enabling a user to quickly search a user-specific page for the contents. And, the present invention reduces and displays a page, which is not desired to search for among total pages, thereby enabling a user to quickly search a user-specific page among the total pages for the contents.

In addition, the above-described methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet). And, the computer can include the control unit 180 of the terminal.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:
1. A mobile terminal comprising:
a touchscreen configured to display a list including a plurality of categories and a plurality of contents grouped for each of the plurality of categories; and
a processor configured to:
gradationally generate, while a first point and a second point within the list are simultaneously touched and when a distance between the simultaneously touched first and second points is gradationally decreased according to a drag signal, summary information for the plurality of contents grouped for each of the plurality of categories between the first and second points according to a decreasing degree of the distance,
divide the distance between the simultaneously touched first and second points into at least a first distance and a second distance,
gradationally hide the plurality of contents grouped for each of the plurality of categories between the first and second points according to the decreasing degree of the distance,
control the touchscreen to gradationally display the generated summary information corresponding to a first percentage of the plurality of contents within the list in response to the distance between the simultaneously touched first and second points becoming less than a first distance according to the decreasing degree of the distance, and gradationally display the generated summary information corresponding to a second percentage of the plurality of contents within the list in response to the distance between the simultaneously touched first and second points becoming less than a second distance according to the decreasing degree of the distance, wherein the second percentage is larger than the first percentage,
generate the summary information for the plurality of contents grouped for each of the plurality of categories according to a pattern depicting a numeral figure corresponding to a specific percentage of the plurality of contents within the list, wherein the pattern is received via a motion sensor or a touch gesture via the touchscreen.,
hide the plurality of contents grouped for each of the plurality of categories corresponding to the specific percentage, and
control the touchscreen to display the generated summary for the hidden plurality of contents corresponding to the specific percentage,
wherein the first distance is greater than the second distance, and wherein the summary information includes text information indicating a total number of the plurality of contents grouped for each of the plurality of categories.

2. The mobile terminal of claim 1, wherein each of the plurality of categories includes one of an index name associated with one of the pluralities of contents and a category name associated with one of the pluralities of contents.

3. The mobile terminal of claim 1, wherein the summary information further includes at least one of a name of each of the plurality of the contents or a thumbnail image indicating each of the plurality of the contents.

4. The mobile terminal of claim 1, wherein if a specific category is selected from the list, the processor is further configured to:
generate the summary information for the specific category, to hide the grouped at least one content corresponding to the specific category, and
display the generated summary information and the selected category.

5. The mobile terminal of claim 1, wherein if first and second categories are selected from the list, the processor is further configured to:
generate the summary information for each of the plurality of categories between the first and second categories,
hide the at least one content corresponding to each of the plurality of categories between the first and second categories, and
display the generated summary information and the plurality of categories between the first and second categories.

6. The mobile terminal of claim 1, wherein if the touchscreen displays the plurality of categories and the corresponding summary information, when a specific category is selected, the processor is further configured to display a substance of the corresponding summary information in a vicinity of the specific category.

7. The mobile terminal of claim 1, wherein if the touchscreen displays the plurality of categories and the corresponding summary information, when a specific category is selected, the processor is further configured to control a substance of the summary information of the specific category to be automatically scrolled and displayed on a display region of the touchscreen in order.

8. The mobile terminal of claim 1, wherein if a specific one of the displayed summary information is selected, the processor is further configured to display at least one content associated with the selected specific summary information.

9. The mobile terminal of claim 1, wherein if a specific one of the displayed summary information is selected, the processor is further configured to display a menu list for editing the specific summary information by at least one scheme.

10. The mobile terminal of claim 1, wherein if the touchscreen displays the plurality of categories and the corresponding summary information, when a specific category is selected, the processor is further configured to display a menu list for editing the selected specific category and a corresponding at least one content by at least one scheme.

11. The mobile terminal of claim 1, wherein if specific summary information is selected from the displayed summary information, the processor is further configured to:
search for a plurality of applications for executing each of the plurality of contents corresponding to the selected specific summary information, and
display a list including the searched applications.

12. The mobile terminal of claim 1, wherein if the touchscreen displays the plurality of categories, when a specific category is selected, the processor is further configured to:
search for a plurality of applications for executing each of the plurality of contents corresponding to the selected category, and
display a list including the searched applications.

13. A method of controlling a mobile terminal, the method comprising:
displaying, on a touchscreen of the mobile terminal, a list including a plurality of categories and a plurality of contents grouped for each of the plurality of categories;
gradationally generating, while a first point and a second point within the list are simultaneously touched and when a distance between the simultaneously touched first and second points is gradationally decreased according to a drag signal, summary information for the plurality of contents grouped for each of the plurality of categories between the first and second points according to a decreasing degree of the distance;
dividing the distance between the simultaneously touched first and second points into at least a first distance and a second distance;
gradationally hiding the plurality of contents grouped for each of the plurality of categories between the first and second points according to the decreasing degree of the distance;
controlling the touchscreen to gradationally display the generated summary information corresponding to a first percentage of the plurality of contents within the list in response to the distance between the simultaneously touched first and second points becoming less than a first distance according to the decreasing degree of the distance, and gradationally display the generated summary information corresponding to a second percentage of the plurality of contents within the list in response to the distance between the simultaneously touched first and second points becoming less than a second distance according to the decreasing degree of the distance, wherein the second percentage is larger than the first percentage;
generating the summary information for the plurality of contents grouped for each of the plurality of categories according to a pattern depicting a numeral figure corresponding to a specific percentage of the plurality of contents within the list, wherein the pattern is received via a motion sensor or a touch gesture via the touchscreen;
hiding the plurality of contents grouped for each of the plurality of categories corresponding to the specific percentage; and
controlling the touchscreen to display the generated summary for the hidden plurality of contents corresponding to the specific percentage,
wherein the first distance is greater than the second distance, and
wherein the summary information includes text information indicating a total number of the plurality of contents grouped for each of the plurality of categories.

* * * * *